(12) United States Patent
Seader

(10) Patent No.: US 11,406,162 B2
(45) Date of Patent: Aug. 9, 2022

(54) SYSTEMS AND METHODS FOR AN IMPROVED RATCHETING DEVICE INCLUDING PIVOTING TOOTH

(71) Applicant: Nite Ize, Inc., Boulder, CO (US)

(72) Inventor: Rex Seader, Florissant, CO (US)

(*) Notice: Subject to any disclaimer, the term of this patent is extended or adjusted under 35 U.S.C. 154(b) by 0 days.

(21) Appl. No.: 17/095,534

(22) Filed: Nov. 11, 2020

(65) Prior Publication Data

US 2022/0142307 A1    May 12, 2022

(51) Int. Cl.
*B60P 7/08*    (2006.01)
*A44B 11/06*    (2006.01)

(52) U.S. Cl.
CPC ........... *A44B 11/065* (2013.01); *B60P 7/083* (2013.01); *Y10T 24/2121* (2015.01); *Y10T 24/2175* (2015.01)

(58) Field of Classification Search
CPC ............ Y10T 24/2175; Y10T 24/2121; Y10T 24/2117; Y10T 24/2113; A44B 11/065; A44B 11/125; B60P 7/083; B60P 7/0823
See application file for complete search history.

(56) References Cited

U.S. PATENT DOCUMENTS

| | | |
|---|---|---|
| 5,271,606 A | 12/1993 | Kamper |
| 5,894,638 A | 4/1999 | Huang |
| 6,799,751 B1* | 10/2004 | Anderson ............... B60P 7/083 24/69 ST |
| 7,444,718 B1 | 11/2008 | Chang |
| 7,845,621 B1* | 12/2010 | Lu ........................... B66F 3/005 254/218 |
| 10,857,930 B1* | 12/2020 | Levi ........................ B60P 7/083 |
| 2003/0000047 A1* | 1/2003 | Mamie ................. B60P 7/0823 24/68 CD |
| 2006/0042052 A1* | 3/2006 | Lu ........................... B60P 7/083 24/68 CD |
| 2008/0104811 A1* | 5/2008 | Burrows ................. B60P 7/083 24/68 CD |
| 2013/0036580 A1* | 2/2013 | Huang .................... B60P 7/083 24/68 CD |

(Continued)

FOREIGN PATENT DOCUMENTS

EP        2799285 A1    11/2014

OTHER PUBLICATIONS

International Search Report and Written Opinion dated Apr. 7, 2022 issued in related PCT App. No. PCT/US2021/072323 (9 pages).

*Primary Examiner* — Victor D Batson
*Assistant Examiner* — Michael S Lee
(74) *Attorney, Agent, or Firm* — Haynes and Boone, LLP

(57) ABSTRACT

A ratchet device includes a ratchet wheel. The ratchet device further includes a first lever, the first lever rotatably interconnected with the ratchet wheel. The ratchet device further includes a second lever, the second lever rotatably interconnected with the ratchet wheel. The ratchet device further includes a first pivoting bracket, the first pivoting bracket pivotally interconnected with the first lever. The ratchet device further includes a second pivoting bracket, the second pivoting bracket pivotally interconnected with the second lever. The first pivoting bracket has a first position where the first pivoting bracket is rotated to engage the ratchet wheel and a second position where the first pivoting bracket is rotated to disengage from the ratchet wheel.

20 Claims, 31 Drawing Sheets

(56) References Cited

U.S. PATENT DOCUMENTS

2014/0008480 A1\* 1/2014 Kingery .................. B60P 7/083
 242/389
2016/0207440 A1\* 7/2016 Kingery ................ B60P 7/0823
2019/0255984 A1\* 8/2019 Kingery ................ B60P 7/0823

\* cited by examiner

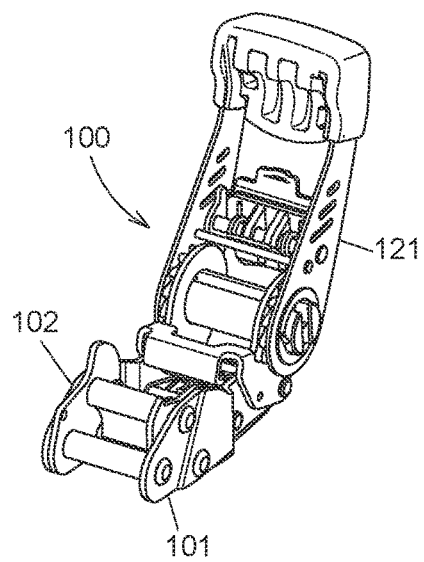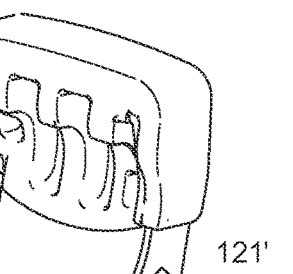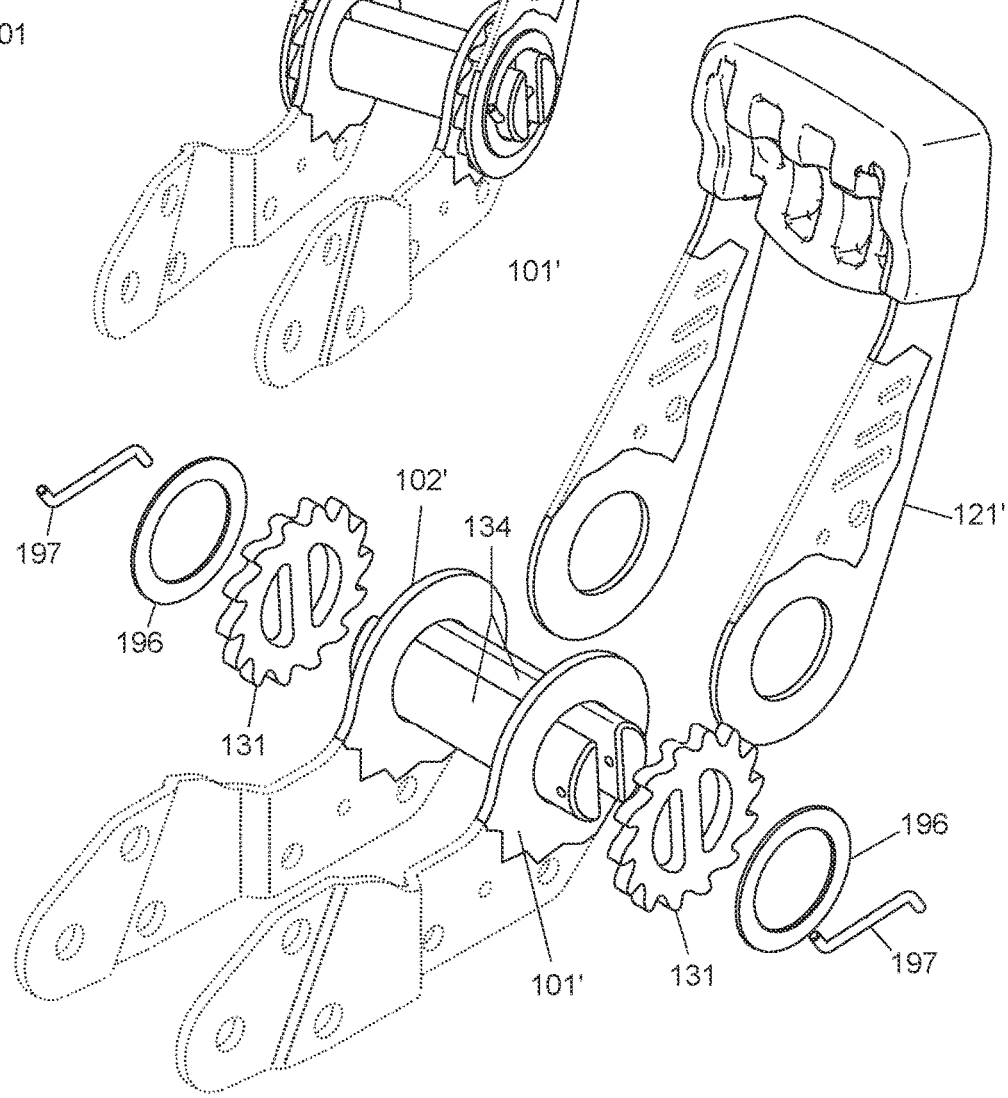

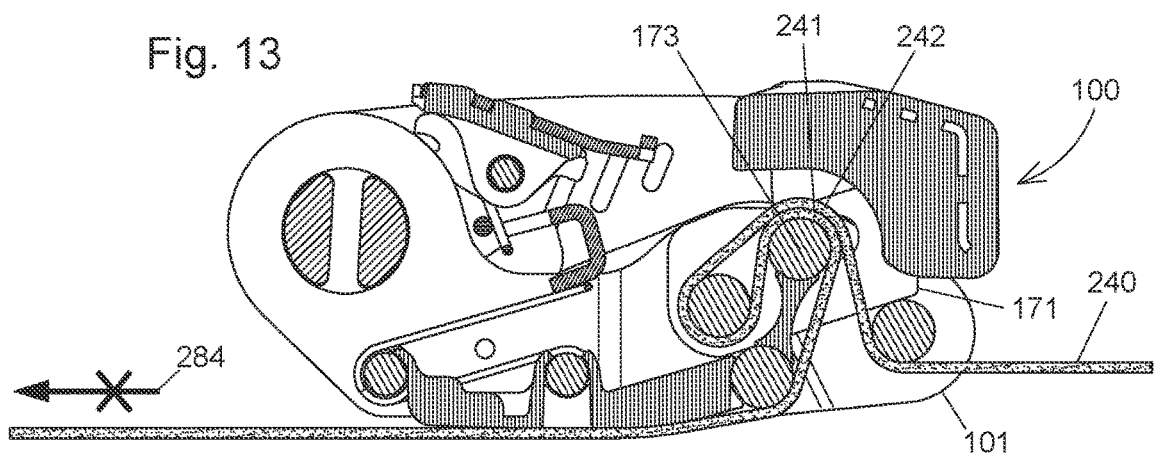
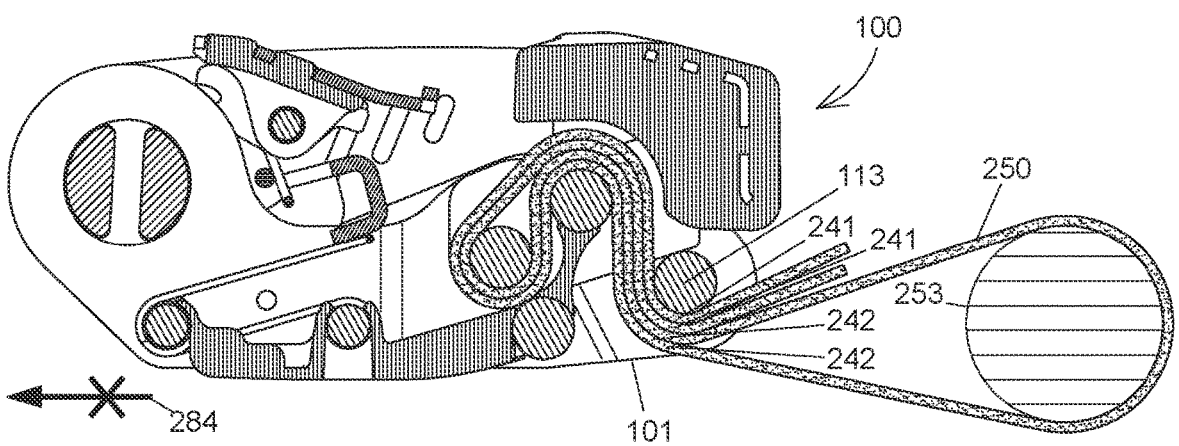
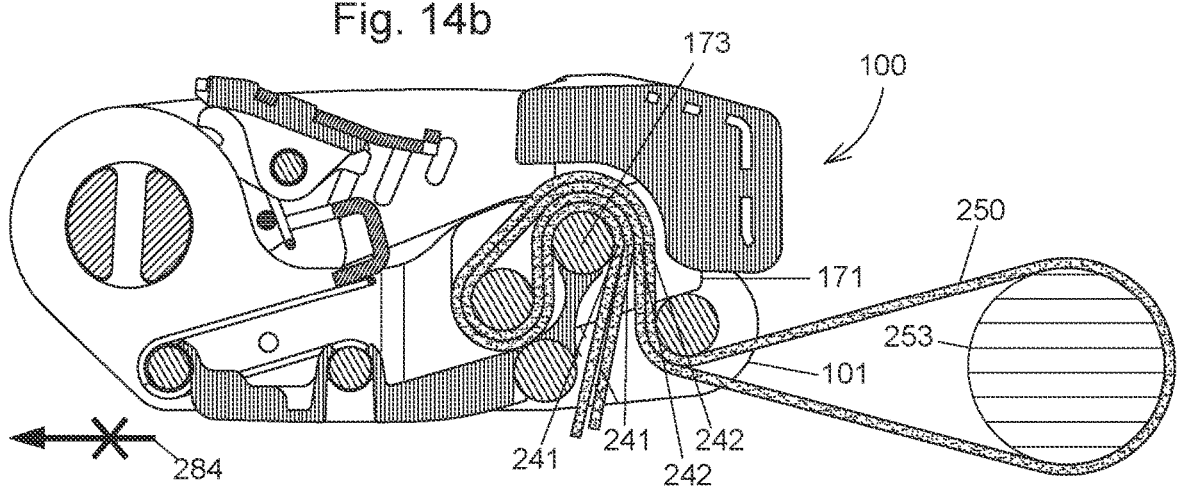

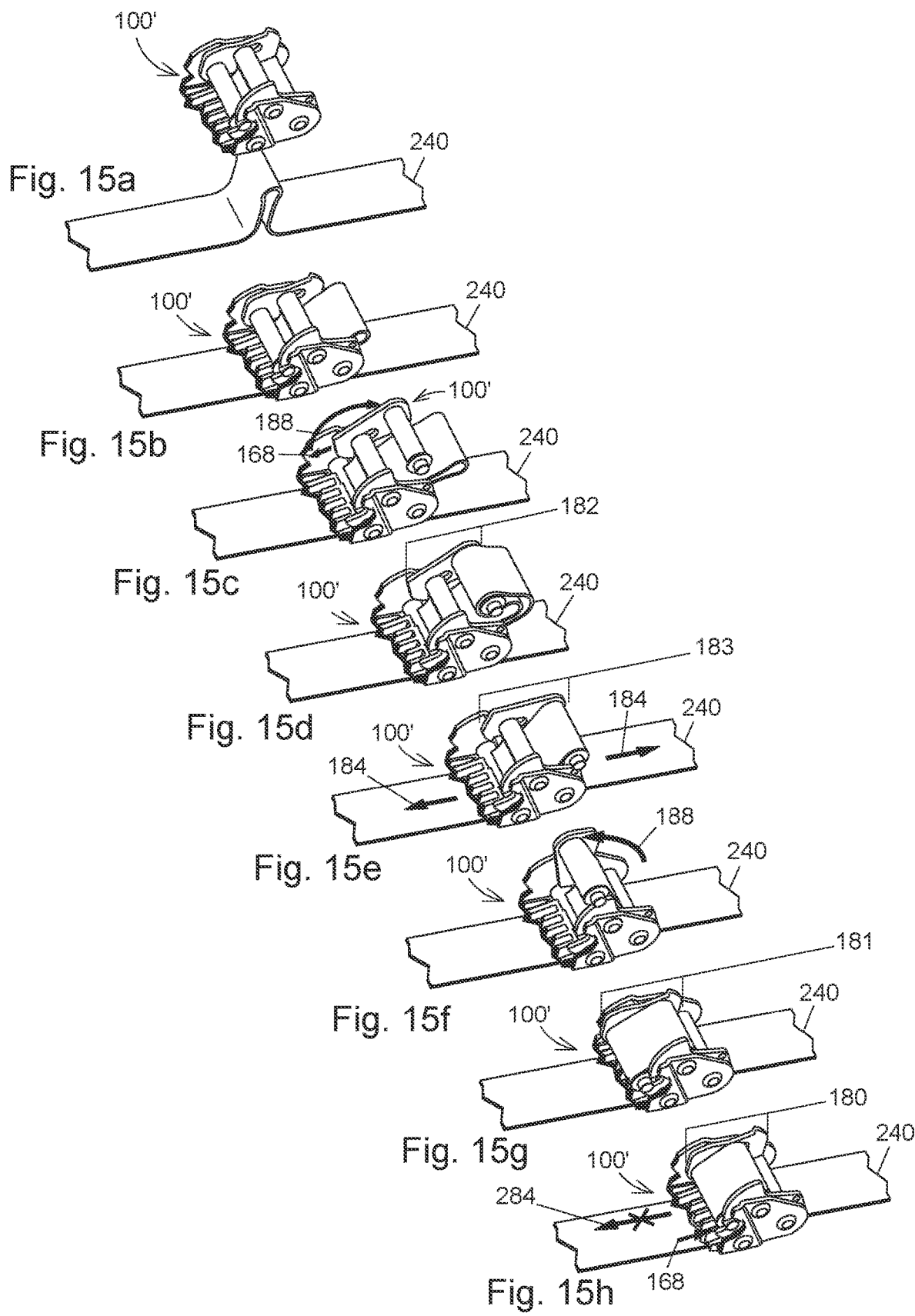

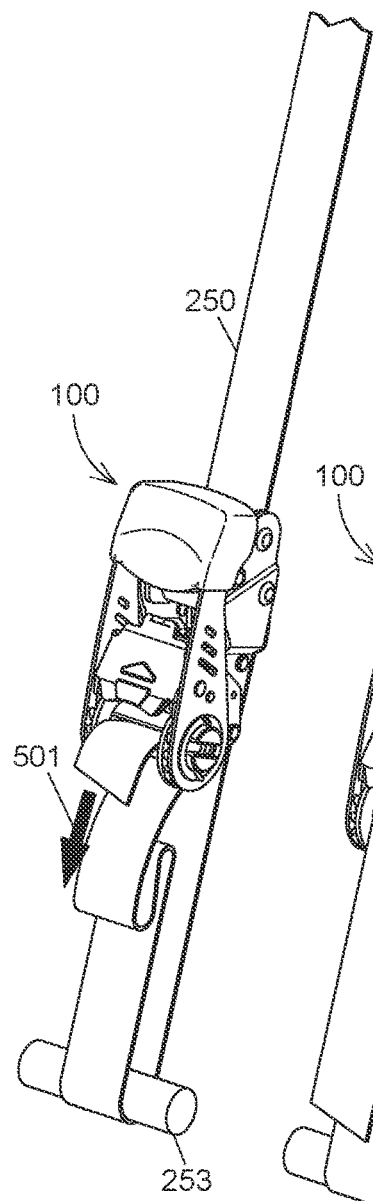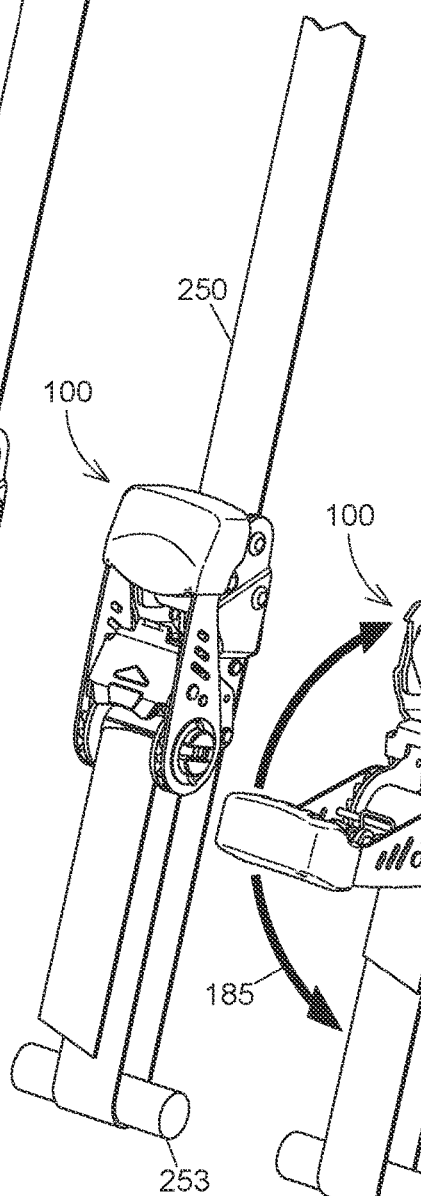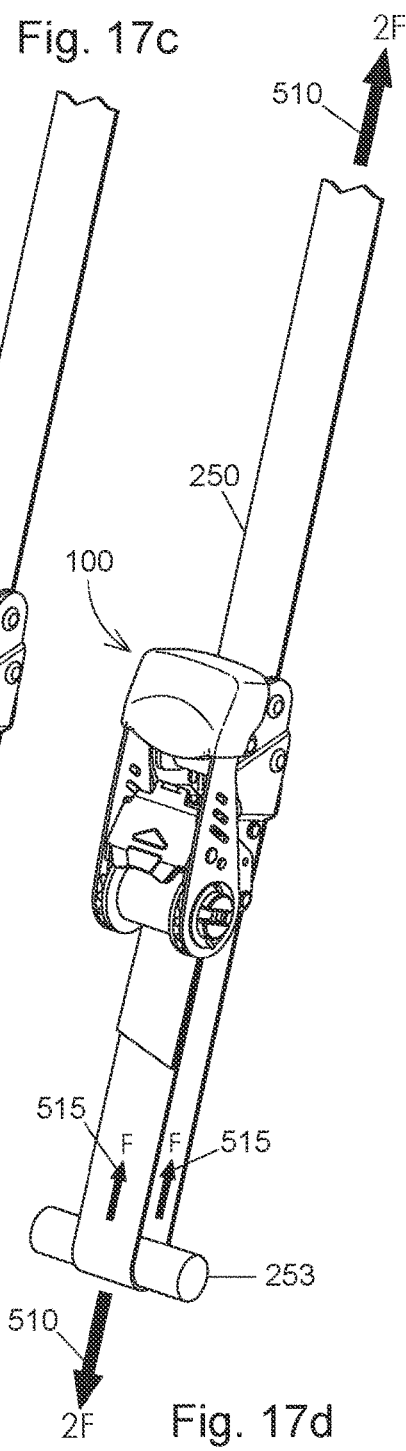

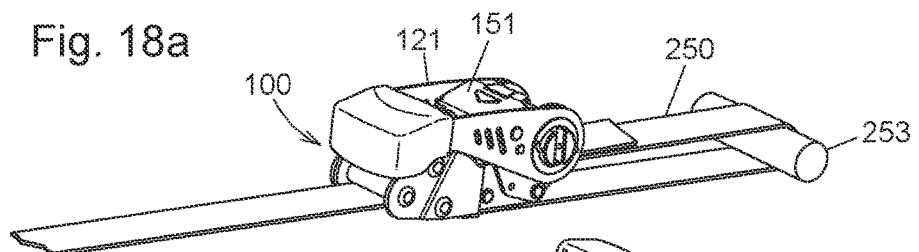
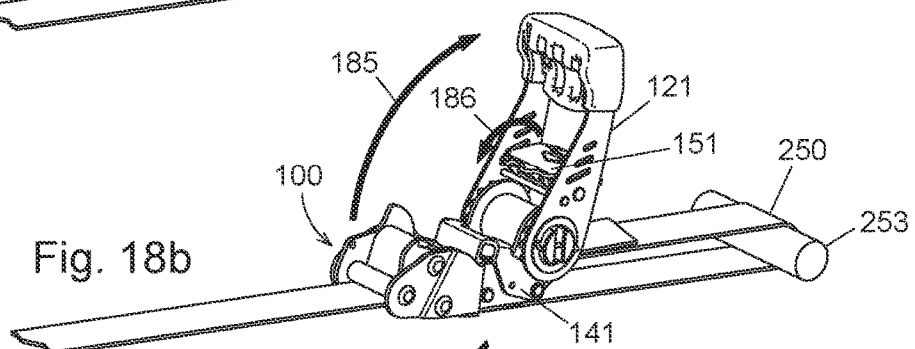
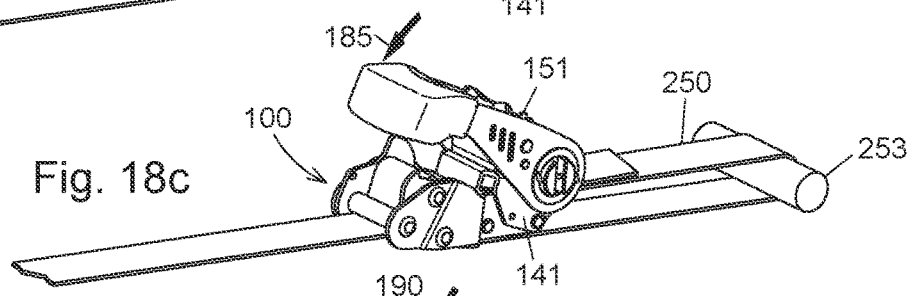
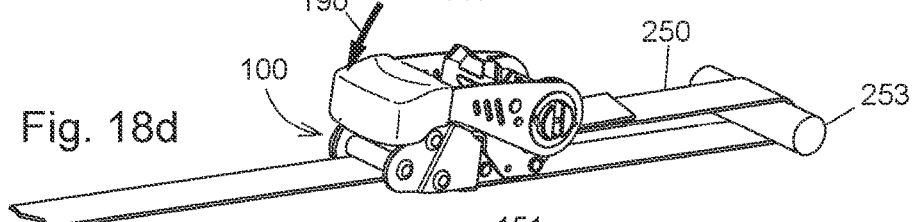
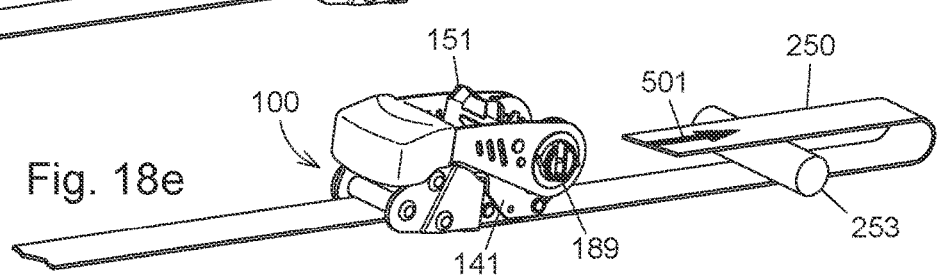

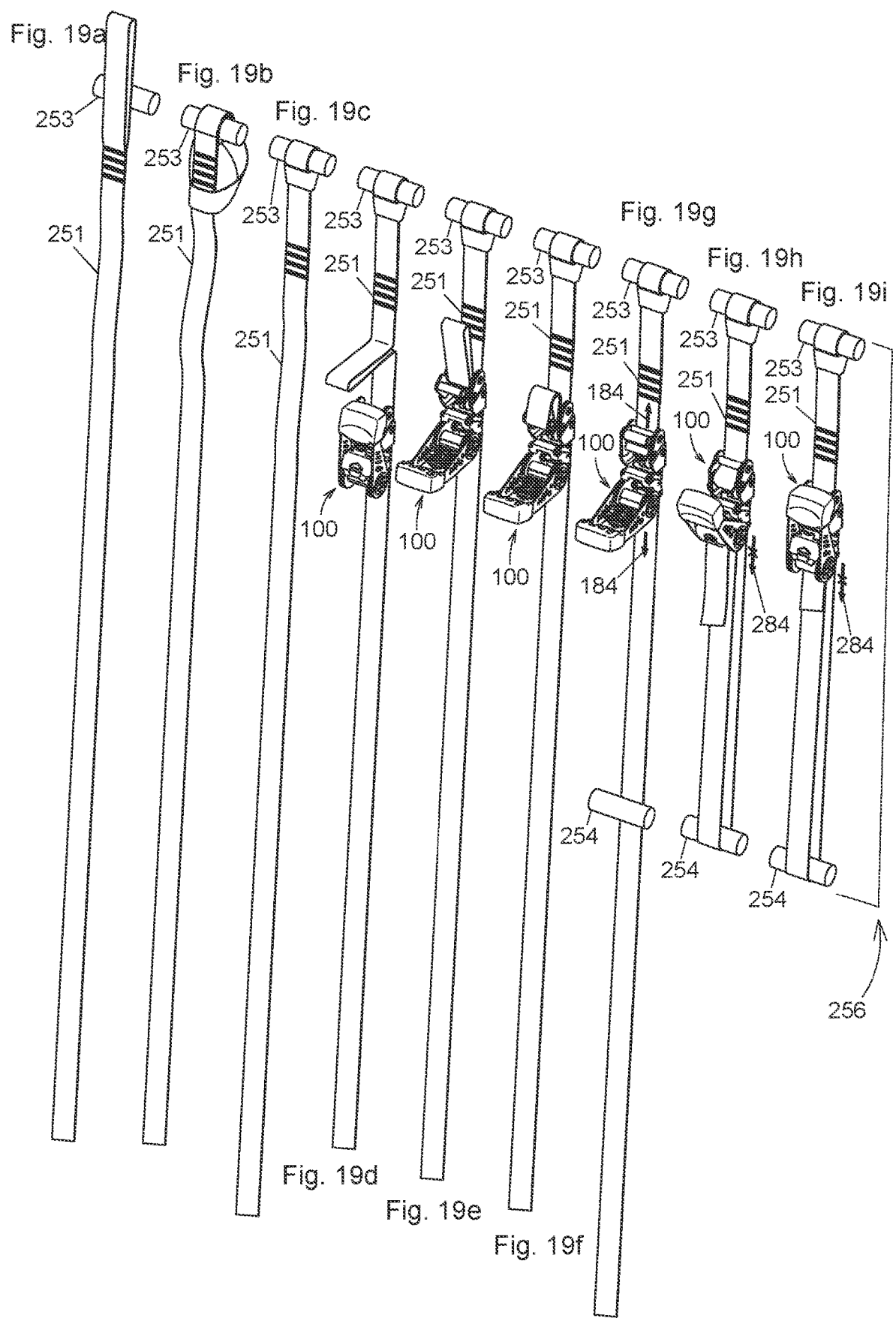

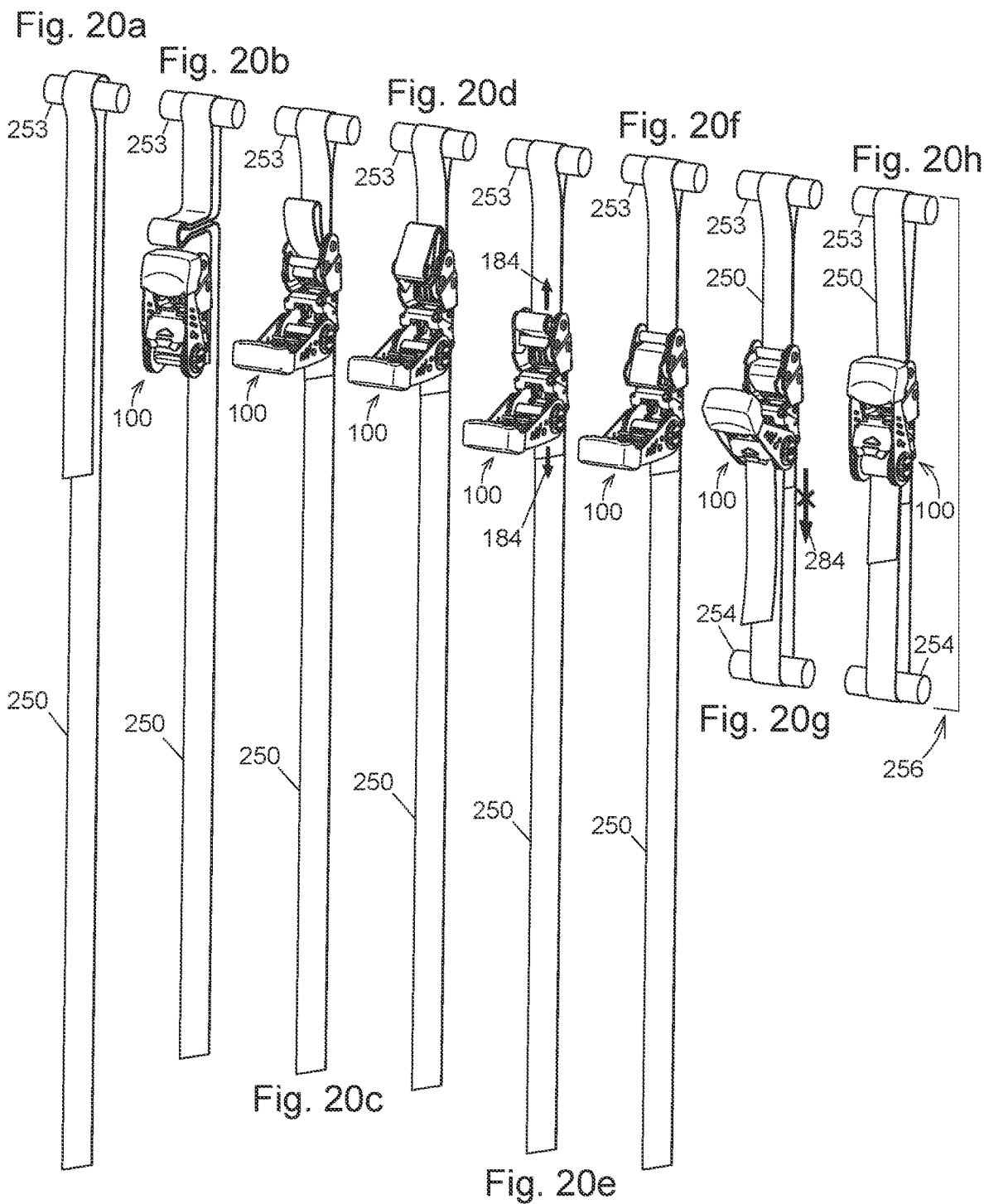

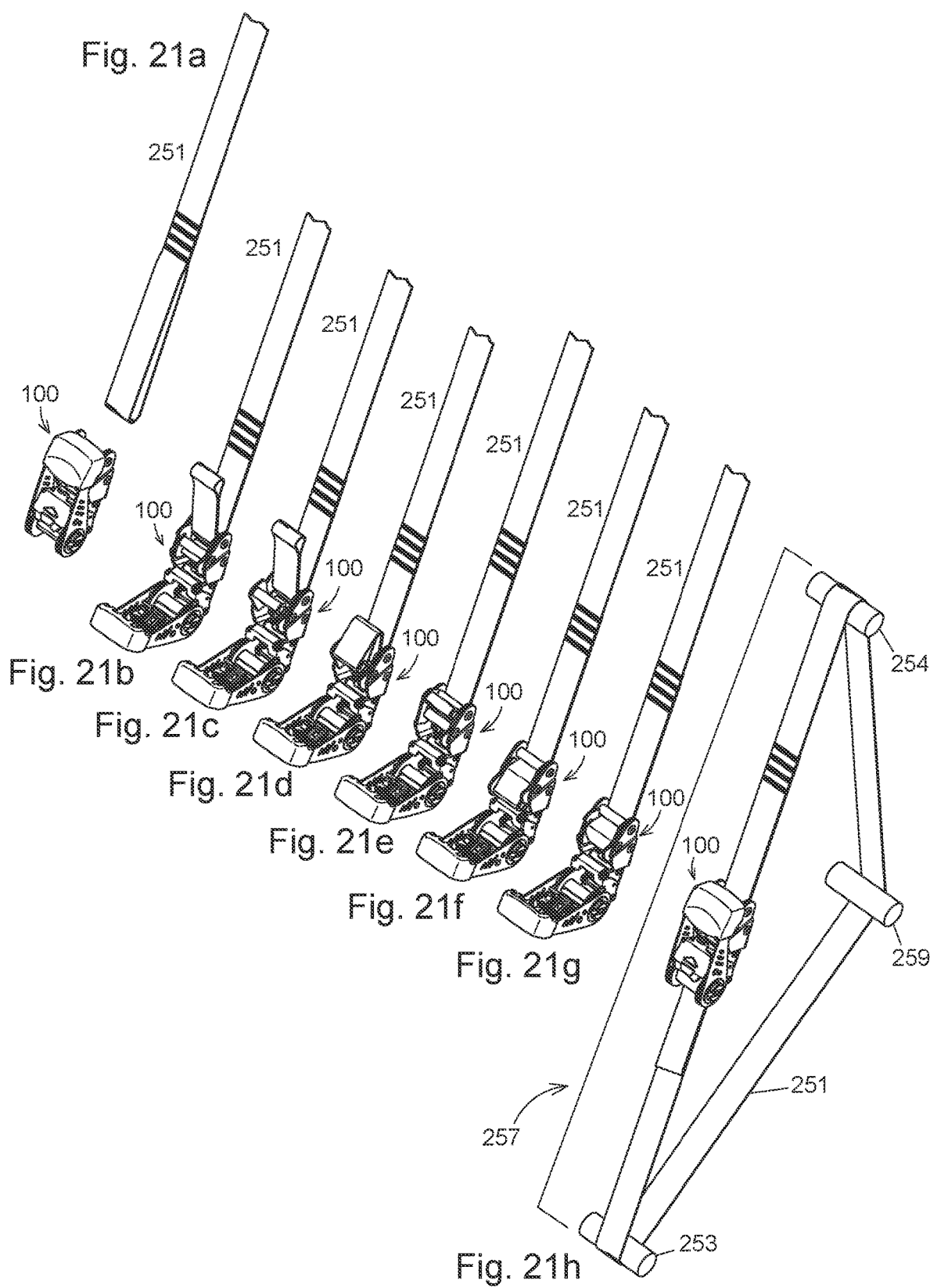

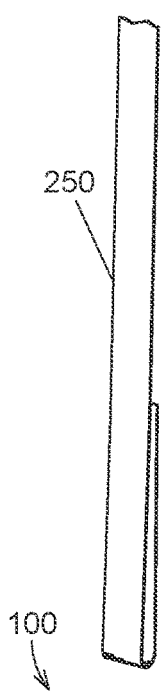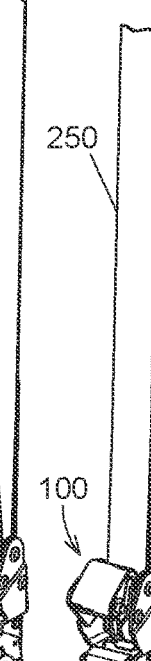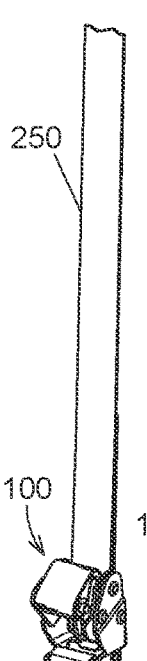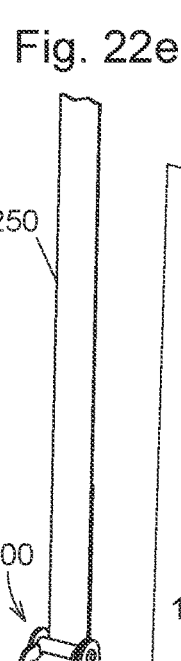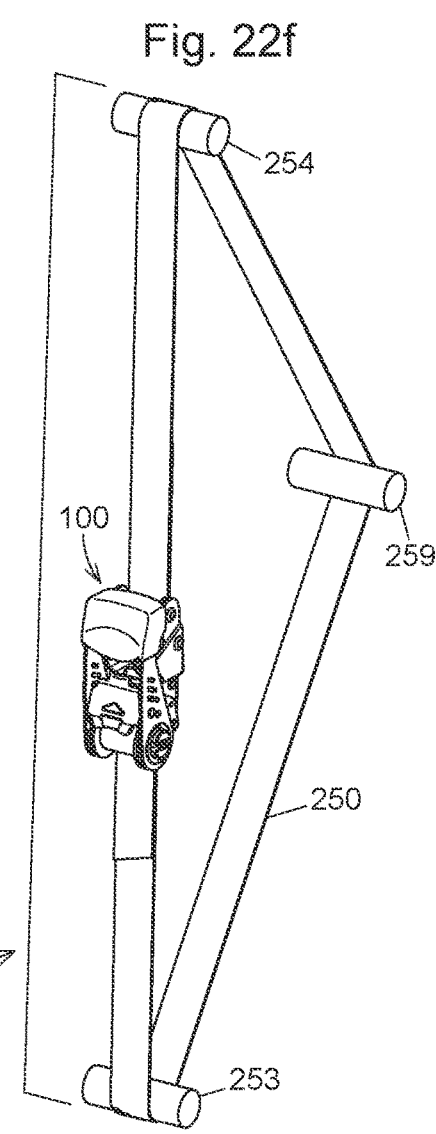

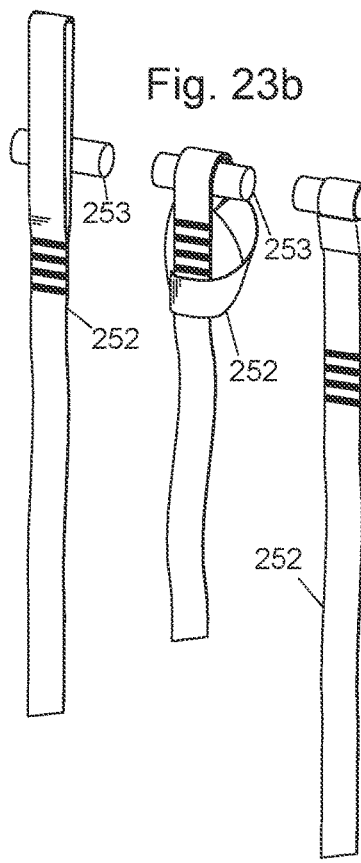

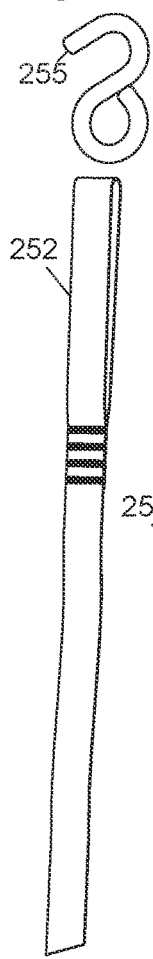
Fig. 24a
Fig. 24b
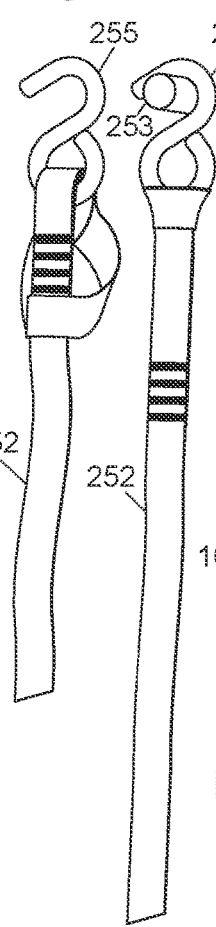
Fig. 24c
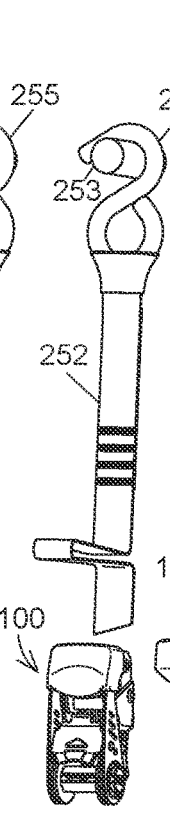
Fig. 24d
Fig. 24e
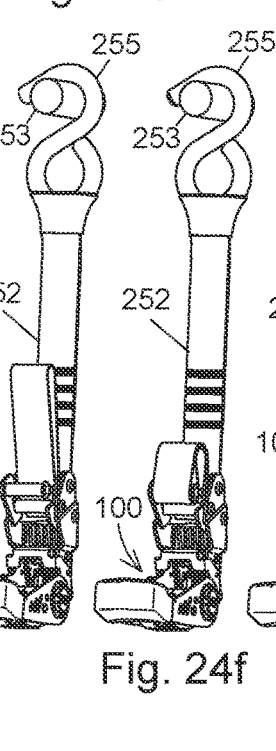
Fig. 24f
Fig. 24g
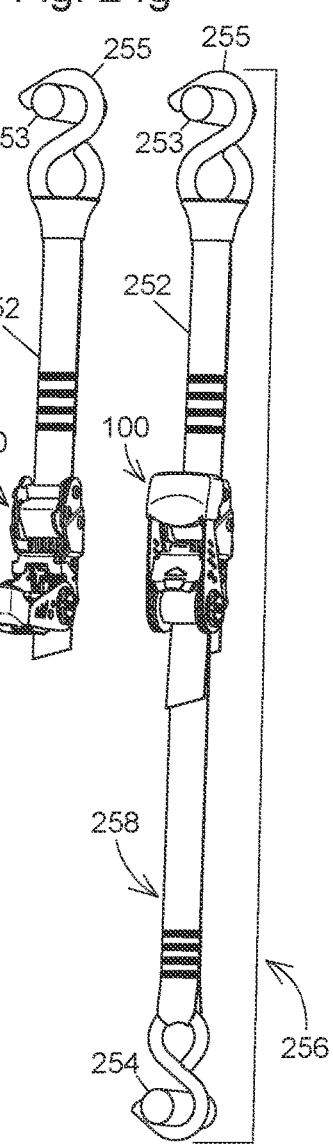
Fig. 24h

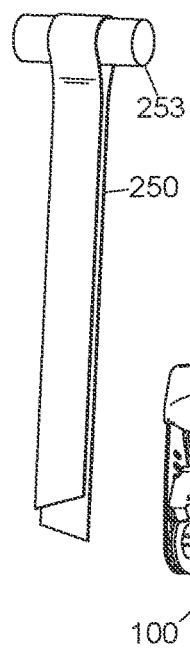
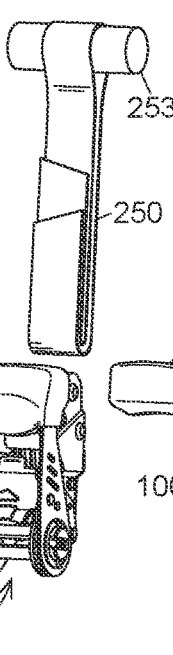
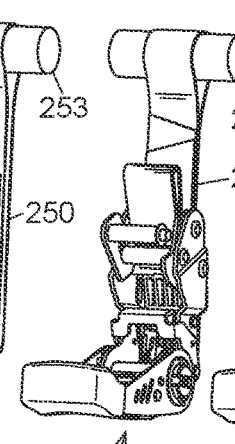
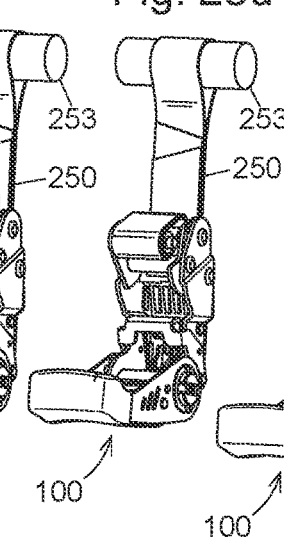
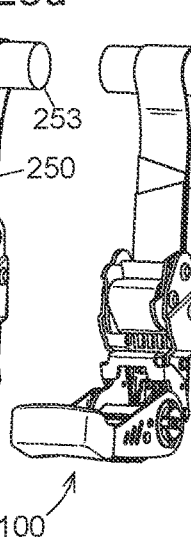
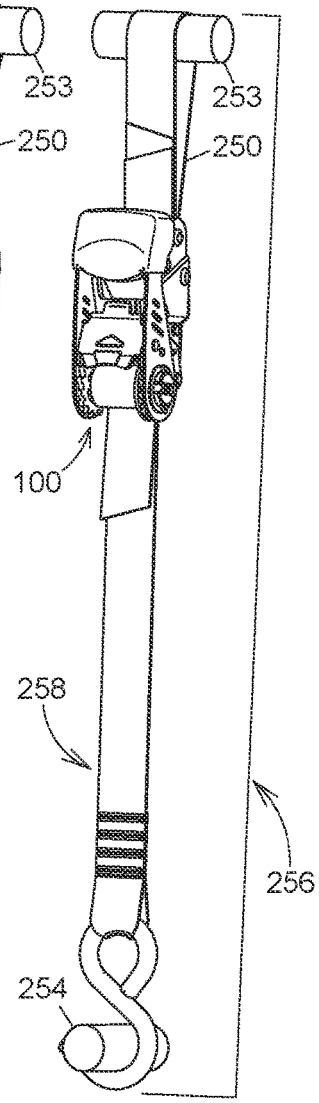

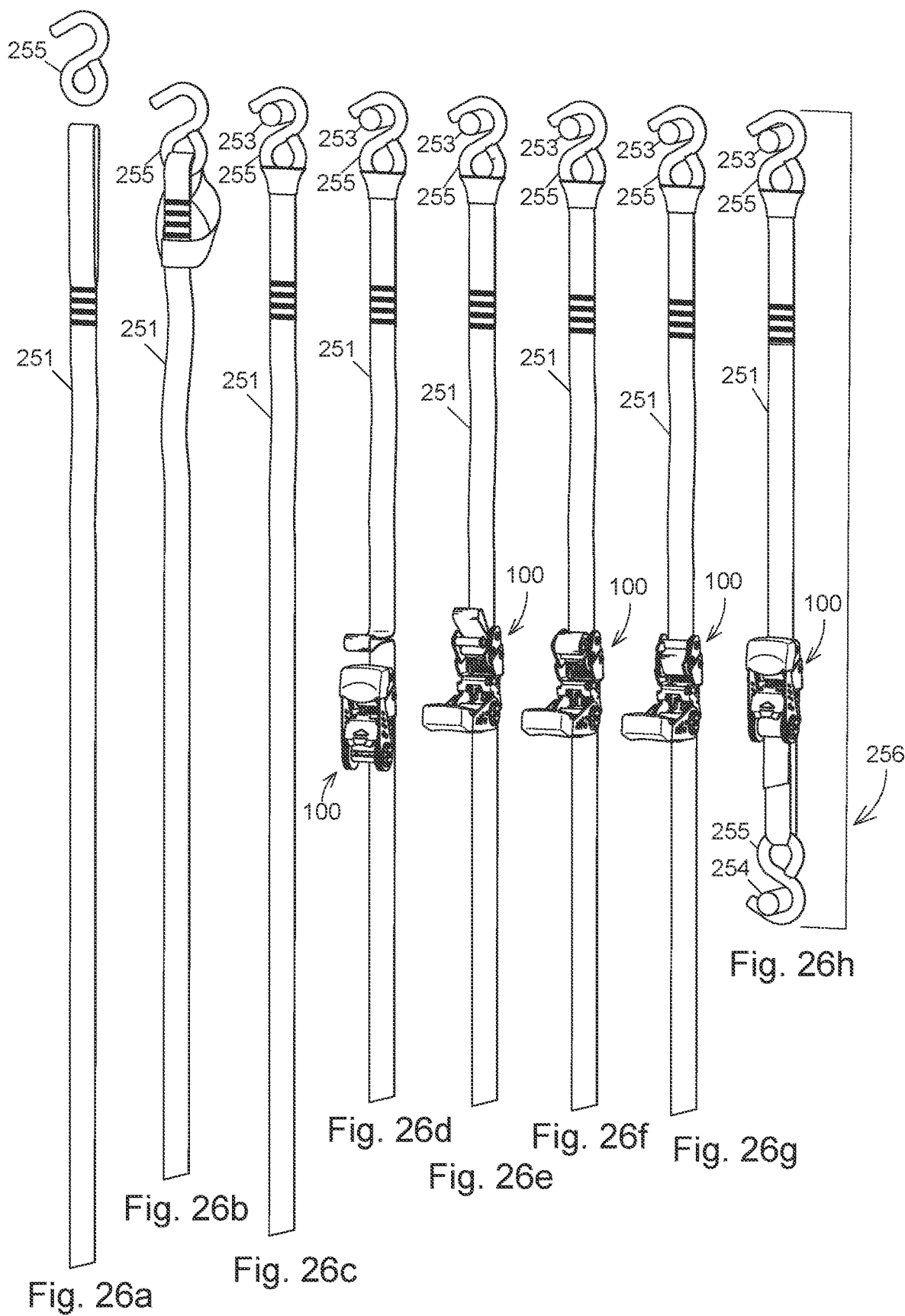

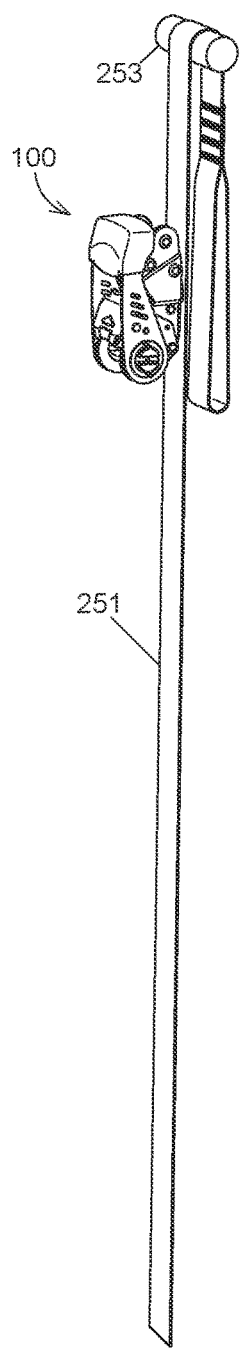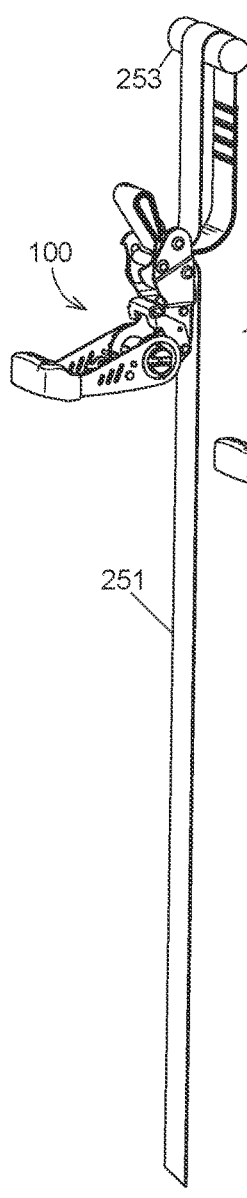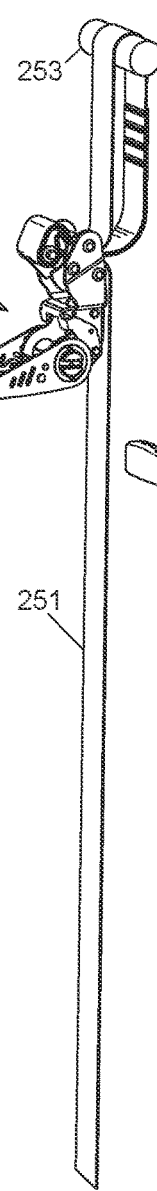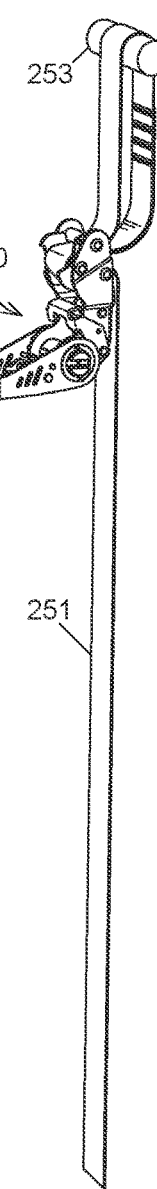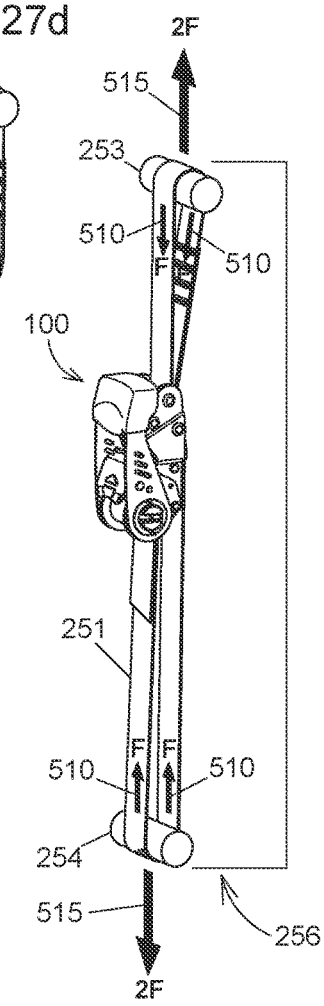

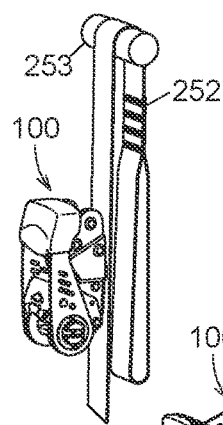
Fig. 28a
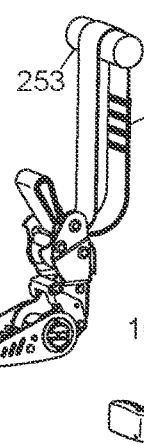
Fig. 28b
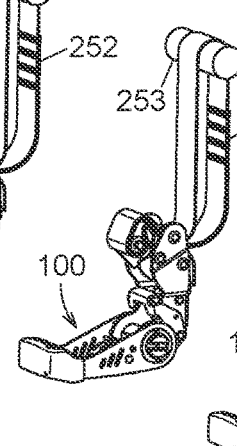
Fig. 28c
Fig. 28d
Fig. 28e
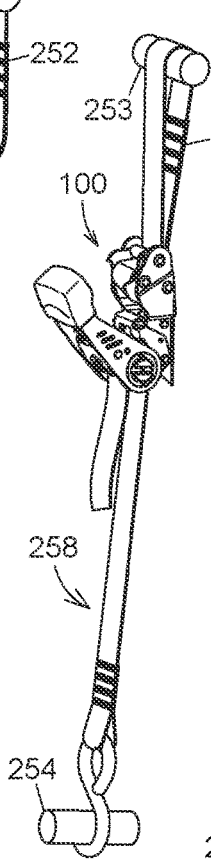
Fig. 28f
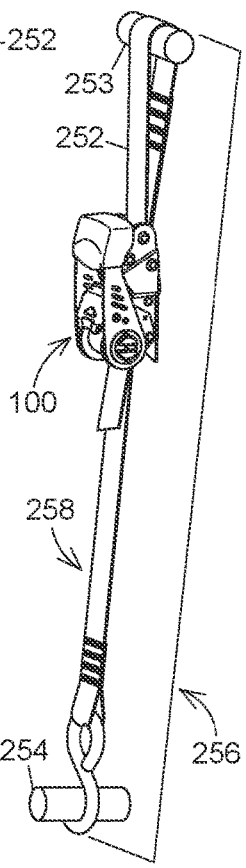

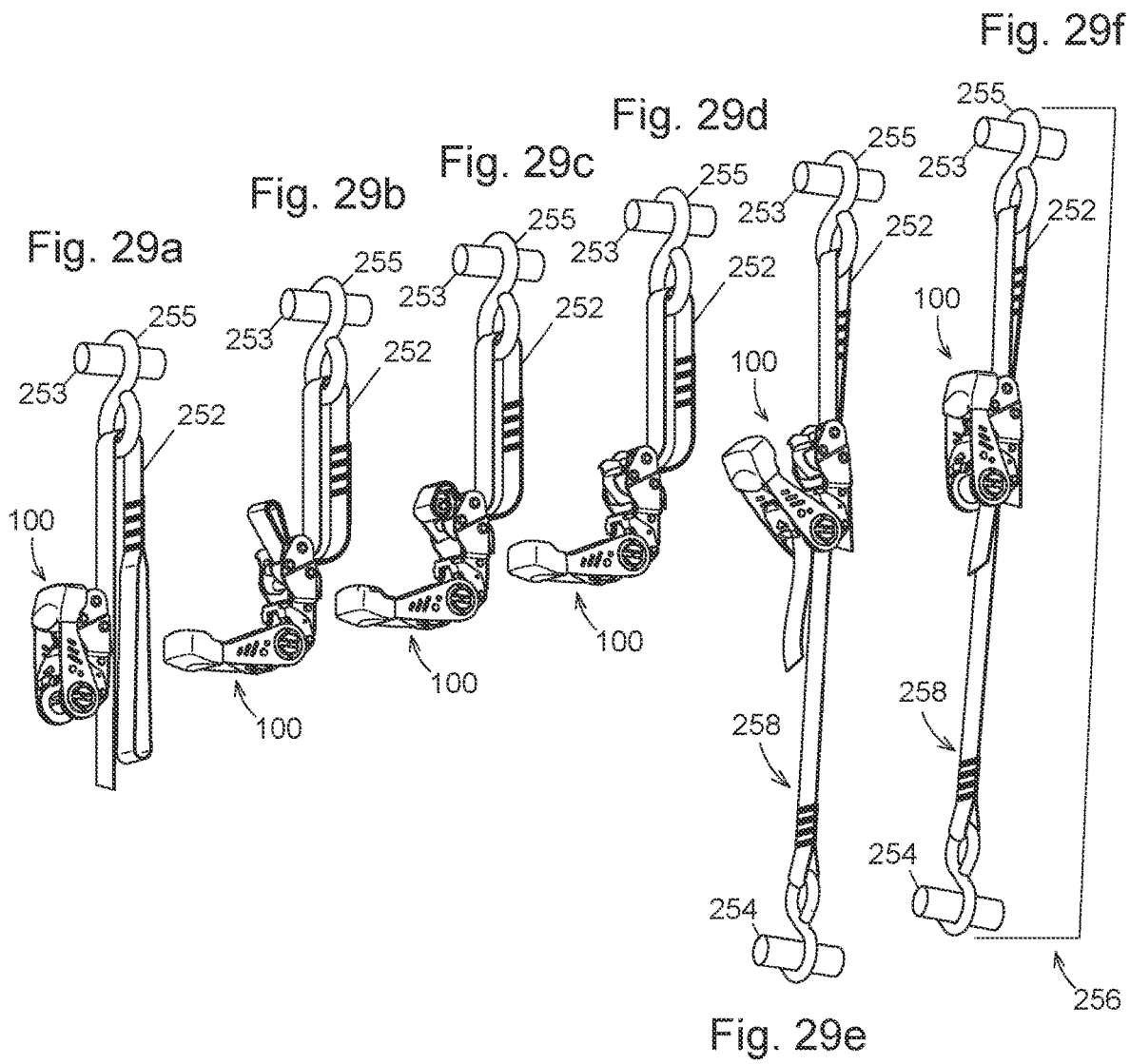

SYSTEMS AND METHODS FOR AN IMPROVED RATCHETING DEVICE INCLUDING PIVOTING TOOTH

BACKGROUND

Many devices that are designed to secure straps and to induce tension in straps exist today. Current art in strap tensioning ratchet devices reveals that a large portion of these devices utilize a singular design. These ratchet designs as such, implemented in various guises and in a multitude of shapes and sizes, suffers several maladies. Issues include that releasing tension from the straps held by the device can be frustratingly difficult, the performance of the device can degrade significantly over time, and the configurability of the device is limited. Furthermore, the size and weight of the device can become a liability, particularly for those devices that incorporate permanently attached hooks.

As shown in FIG. 35 Prior Art and FIG. 36 Prior Art, a typical prior art ratchet device 400 is comprised of a chassis 402 and a rotating lever 404, each having a sliding bracket 412, 414, where the sliding brackets simultaneously engage a pair of ratchet wheels 406, positioned on two matching hub crossbars 410, the hub crossbars having a semicircular shape in cross section. The ratchet wheels are identical in size and shape to each other, that being a disc with teeth 408 positioned around the disc perimeter. The ratchet wheels are located on opposite ends of the hub crossbars with the hub crossbars gapped apart from each other by means of complimentary openings centrally located in the ratchet wheels. The ratchet wheels are also positioned between overlapping chassis and lever sidewalls. The two hub crossbars are constrained within circular openings in the chassis and lever sidewalls such that the hub cross bars are free to rotate about their long axis within the circular openings. Springs 430, either compression or torsion, act on the sliding brackets to induce and maintain contact of the blade portion 416 on each sliding bracket to a complimentary edge face on a singular tooth on each of the ratchet wheels. The ratchet wheels and hub crossbars, in combination, comprise a singular unit and are secured positionally to one another by means of malleable wire-forms inserted through holes located near the ends of the hub crossbars. The ends of the wire-forms being subsequently deformed preventing withdrawal of the hub crossbars from the chassis and lever. Often, large diameter washers are included to provide a barrier between the wire-form parts and the lever side walls.

When the lever of the ratchet device is rotated 185 with respect to the chassis, the sliding bracket secured to the lever engages a tooth on each of the two ratchet wheels causing the ratchet wheels and the hub crossbars to rotate as a unit within the circular openings in the chassis sidewalls. The sliding bracket in the chassis moves back and forth following the toothed profile of the ratchet wheels. When the direction of the lever rotation is reversed, the sliding bracket in the chassis now engages a singular tooth on each of the two ratchet wheels preventing rotation of the ratchet wheels and the hub crossbars, while the sliding bracket of the lever is free to follow the respective edge profile on the two ratchet wheels. This alternating rotational movement of the lever results in a ratchet action that rotates both ratchet wheels and both hub crossbars in a singular direction.

Inserting an end of webbing through the gap formed between the two hub crossbars will cause the webbing to be wound onto the crossbars as the lever is rotated. As webbing is wound onto the hub crossbars, newly wound webbing will overlap the underlying webbing layer preventing the webbing from slipping out of the device. Engagement of the blade portion of the chassis sliding bracket with a singular tooth on each ratchet wheel preserves the tension induced in the webbing and prevents the hub crossbar and ratchet wheel combination from rotating in a direction that would release the tension from the webbing and the webbing from the device.

A typical ratchet device will have one end of a short length of webbing 431 permanently attached to the ratchet device by means of a loop sewn in the webbing capturing a third cross bar 428 permanently secured to the chassis. A hook 432, offered in various shapes and sizes, is permanently affixed to the opposite end of the short webbing. A second separate and typically longer length of webbing, one end also containing a permanently attached hook 258, completes the components required to enable use of the ratchet device. A usable configuration of the device involves attaching each hook to separate anchor locations 253, 254 inserting the free end of the longer length of webbing into the gap between the hub crossbars, drawing the webbing through the bars until the slack is removed from the webbing, and then tensioning the webbing by rotating the lever of the ratchet device in alternating directions 185. Back and forth rotation of the lever is continued until the desired level of tension is induced in the lengths of webbing connecting the two anchor points. The length of the lever provides a mechanical advantage that enables a significant amount of tension to be induced in the webbing as the lever is rotated.

Tension release is more involved. To release tension, the sliding bracket secured to the lever is drawn back toward the free end of the lever using the index finger. This allows the lever to free-spin, to rotate without engaging teeth on the ratchet wheels. After rotating the lever through an angular displacement of approximately 100 degrees, the sliding bracket secured to the lever encounters a radially raised portion on the chassis sidewall 424. Releasing the lever sliding bracket at this position results in the sliding bracket coming into contact with the raised landing on the chassis sidewall, which in turn prevents the sliding bracket on the lever from engaging with the teeth on the two ratchet wheels. As the lever is rotated further, the eccentric shaped ends on the lever arms 418 begin to engage the blade ends 416 of the sliding bracket 412 constrained in the chassis 402, thus moving the sliding bracket outward radially with respect to the hub crossbars and the ratchet wheels. As the lever is rotated approximately 170 degrees, the lever eccentric has rotated far enough to completely disengage the sliding bracket in the chassis from the teeth residing on the perimeter of the ratchet wheels. With the sliding bracket in the lever previously disengaged and now with the sliding bracket in the chassis disengaged, no means remain to prevent rotational movement of the hub crossbars and the ratchet wheels. The existing tension in the strap will cause the hub crossbars and ratchet wheels to rotate in the direction opposite the direction from the prior ratcheting action, thus releasing stored tension from the webbing.

In most ratchet devices there is a notch 403 in the edge profile of the chassis sidewall that will engage the sliding bracket on the lever to lock the lever in place when the lever has been rotated to the full-open position. This creates a rigid configuration between the lever and chassis while the hub crossbars and ratchet wheels remain free to rotate, thus allowing the webbing to be pulled from the device. At lower induced tension levels this mechanism for releasing tension works well enough. However, after repeated use or use near the rated working load limit, the components of most ratchet devices begin to wear and/or deform such that removal of the webbing from the device becomes increasing frustrating to make happen. In close confines with a surrounding structure, such as the bed area of a truck, the locked lever can impede rather than enhance removal of the webbing from the ratchet device.

Additionally, as the lever rotates toward the position for tension release, even though the eccentric is pushing the chassis sliding bracket towards the release point, the force applied to rotate the lever end eccentric is compromised due to the poor mechanical advantage afforded the lever. At levels of high webbing tension, or with excessive device wear, it is not uncommon for the release action to begin to mimic the action like that of pushing on a bow string of a bow and arrow apparatus. Lots of give in the direction perpendicular to the string, in this case the webbing, such that the mechanical advantage gained from the length of the lever and the shape of the eccentric on the lever end is neutralized by the lack of restraint on the device. When releasing webbing tension, this behavior may require the operator provide an additional leverage advantage, by either physically limiting the displacement of the ratchet device, or possibly by inserting a long-shafted screw driver between a hub crossbar and the lever to force rotation of the lever with respect to the chassis. Both methods are commonly used and both methods can pose a safety risk to the operator of the device.

In ratchet devices that incorporate sliding brackets, an area of component deformation that commonly occurs during the webbing tension release action resides at the contact interface 433 between the lever eccentric and the blade end of the chassis sliding bracket. This contact area experiences a high level of localized stress within the device. When releasing tension from the device, the lever eccentric moves the chassis sliding bracket outward to disengage the sliding bracket from the ratchet wheel teeth. This particular part-to-part engagement typically occurs on edge faces of both the sliding bracket and the two eccentric shaped ends on the lever, and as such concentrates a high amount of force into a relatively small area. Inspection of well used current art ratchet devices, particularly those that utilize die-cast levers will show excessive wear and/or deformation at these locations of the device. Over time, the cumulative effect of these deformations will permanently alter the ratchet device. The amount of travel induced in the chassis sliding bracket by the eccentric shape on the lever ends may no longer be sufficient to move the sliding bracket far enough to disengage the sliding bracket from the ratchet wheel teeth. At this point, tension release is accomplished by either cutting the webbing or using a supplemental tool to force release of the chassis sliding bracket from the ratchet wheel teeth.

This failure mode occurs in ratchet devices that utilize sliding brackets to actuate the ratcheting action. Attempts over the years by various manufactures to mitigate this concern has led to a proliferation of design solutions. For the most part however, these devices remain essentially the same, as does the failure behavior.

Typically, both lever and chassis side walls contain slots 420, 422 which constrain the sliding brackets. These slots allow the sliding brackets to move fore and aft within the slots. Also enabled in the sliding brackets, yet not relevant to the intended function of the device, is a side-to-side displacement and a rotational displacement, both occurring within the planes 426, 427 defined by opposing sidewall slots.

When the lever is rotated to induce webbing tension, the ends of the blade portion 416 of the sliding bracket constrained in the lever engage the teeth on the ratchet wheels, rotating the ratchet wheels and the hub crossbars. The blade ends of the sliding brackets in both the lever and the chassis may be sufficiently sized to ensure contact with the ratchet wheel teeth, the chassis sidewall slots, the chassis sidewall edge profiles, and the lever sidewall slots. Furthermore, to accommodate possible side-to-side and in-plane rotational movement of the sliding brackets, the width of the sliding brackets may be increased accordingly.

Induced tension, resident in the webbing, forces the edge face of a ratchet wheel tooth into the blade end portion of the sliding bracket while the sliding bracket is simultaneously pressed into the slot edge of either the lever bracket or the chassis bracket. This action is like cutting a piece of paper with scissors, the paper in this case being the blade portions of the sliding brackets. This contact force is concentrated into a small area on the blade face, making blade integrity solely dependent on the material properties and thickness of the blade material at the blade end. The width requirements previously noted, in combination with the added burden to provide sufficient clearance around webbing configured in the device, precludes introducing blade stiffening geometries where they would help in preventing blade end deformation at higher force loads.

The possibility for both side-to-side translational movement and in-plane rotational movement of the sliding brackets creates another crippling disadvantage for current art ratchet devices. One that will result in only one tooth on one ratchet wheel engaging the sliding bracket, or one tooth engaging fully and the one on the opposite side engaging only partially. In either case, both ratchet wheels are no longer fully engaged. Despite creating an unsafe condition, the imbalance in load sharing can easily deform the blade portion of the sliding bracket where it engages the ratchet wheel tooth. Subsequent use of the device is made difficult by the now deformed blade on the sliding bracket.

Another source for this misalignment, particularly in lower quality, lower load rated devices, is the chassis itself will twist about its long axis while tension is being ratcheted into the webbing. This behavior, analogous to the wringing of water from a wet towel, will result in the chassis sliding bracket landing in an imbalanced load sharing position with respect to the ratchet wheel teeth.

To mitigate misalignments in the sliding brackets, some manufacturers add embossments 429 to the sliding brackets to keep the brackets centered between the side walls of the lever or the sidewalls of the chassis. However, if the embossments are located too close to the chassis and lever sidewalls, the sliding brackets will bind, not close enough and the sliding brackets rotate out of parallel as described above. Both effects are observed in current offerings of ratchet devices. This is a design limitation of the sidewall slot/sliding bracket interaction of current art ratchet devices and is a source of frustration to those who use such devices.

To minimize device weight and create a distinctive appearance, some manufacturers utilize aluminum or zinc alloy die-cast levers. These types of levers may, in lieu of open slots, incorporate specific geometries to serve as channels or guides for the sliding bracket. However, the blade ends of the harder sliding bracket material tend to gull and/or scrape away the softer die-cast material on the lever eccentric located at the end of the lever. Repeated use at or near working load limits will compromise and eventually break the die-cast eccentric surface, disabling the device and preventing release of the ratcheted tension. In this condition, the means available to release tension from the webbing is to either cut the webbing or force release of the chassis sliding bracket using a supplementary tool, often a dangerous proposition.

Finally, when the compete configuration—device, straps, hooks (FIG. 35 Prior Art)—is taken into consideration, additional disadvantages arise that limit the overall effectiveness of the current art of ratchet devices. As previously described, the ratchet device has as one anchor point, an attachment of a short length of webbing sewn to the device and to a hook. Such an arrangement limits where the ratchet device can be positioned. Often less than ideal access is afforded the user either in tensioning or in releasing tension from the ratchet device. Additionally, ratchet devices with permanently attached straps and hooks can be heavy, requiring special care to prevent damage to surrounding objects when initially configuring the ratchet device, straps, and hooks.

BRIEF SUMMARY

The embodiments described herein provide means to induce and release tension in webbing that avoid the disadvantages incurred with current art ratchet devices. Additionally, features incorporated in the embodiments provide new means that enable multiple configurations of straps and hooks unavailable in the current art. Additionally, some of these features can be incorporated in other strap tensioning devices, such as cam-locks, providing similar new features in those devices as well.

In one embodiment, a ratchet device includes a ratchet wheel. The ratchet device further includes a first lever, the first lever rotatably interconnected with the ratchet wheel. The ratchet device further includes a second lever, the second lever rotatably interconnected with the ratchet wheel. The ratchet device further includes a first pivoting bracket, the first pivoting bracket pivotally interconnected with the first lever. The ratchet device further includes a second pivoting bracket, the second pivoting bracket pivotally interconnected with the second lever. The first pivoting bracket has a first position where the first pivoting bracket is rotated to engage the ratchet wheel and a second position where the first pivoting bracket is rotated to disengage from the ratchet wheel. Alternatively, the second pivoting bracket has a third position where the second pivoting bracket is rotated to engage the ratchet wheel and a fourth position where the second pivoting bracket is rotated to disengage from the ratchet wheel. Optionally, when the first pivoting bracket is in the second position and the second pivoting bracket is in the fourth position, the ratchet wheel freely rotates. In one alternative, the first pivoting bracket is configured to engage the second pivoting bracket and when the first pivoting bracket and the second pivoting bracket are engaged, the first pivoting bracket is held in the second position and the second pivoting bracket is held in the fourth position. In another alternative, the ratchet wheel includes a plurality of teeth and the first pivoting bracket includes a first tooth that is shaped to interface with the plurality of teeth. Alternatively, the second pivoting bracket includes a second tooth and the second tooth is shaped to interface with the plurality of teeth. In another alternative, the first tooth is shaped to fit between a third and fourth tooth of the plurality of teeth, such that the first tooth entirely fills the void between the third and fourth tooth. Alternatively, the first pivoting bracket includes a tab on a first end opposite the second end, the second end engaging the ratchet wheel, the tab shaped to engage an area in the second pivoting bracket such that the first and second pivoting bracket hold together when the ratchet wheel freely rotates. In one alternative, the ratchet device further includes a capture assembly, the capture assembly configured to capture a flat strap in a secure fashion. Alternatively, the second lever includes a first and second side plate, the capture assembly located between the first and second side plate. In another alternative, the capture assembly includes a third side plate and a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate. Alternatively, the fourth side plate is interconnected to the second pin via a slotted opening allowing the fourth side plate to rotate and slide about the second pin. In another alternative, the third side plate includes a slotted capture area, the slotted capture area configured to removably capture the third pin when the fourth side plate is slid to a first end of the slotted opening. Alternatively, the third side plate further includes a curved area, adjacent to the slotted capture area, oriented to guide the third pin. In another alternative, a flat strap oriented in a first gap between the first and second pin, around the third pin, and back through the first gap is held when the third pin is in the slotted capture area.

In one embodiment, ratchet device includes a ratchet wheel and a first lever, the first lever rotatably interconnected with the ratchet wheel. The ratchet device further includes a second lever, the second lever rotatably interconnected with the ratchet wheel. The ratchet device further includes a first pivoting bracket, the first pivoting bracket pivotally interconnected with the first lever. The ratchet device further includes a second pivoting bracket, the second pivoting bracket pivotally interconnected with the second lever. The first pivoting bracket has a first position where the first pivoting bracket is rotated to engage the ratchet wheel and a second position where the first pivoting bracket is rotated to disengage from the ratchet wheel. The second pivoting bracket has a third position where the second pivoting bracket is rotated to engage the ratchet wheel and a fourth position where the second pivoting bracket is rotated to disengage from the ratchet wheel. Alternatively, the ratchet device further includes a capture assembly, the capture assembly configured to capture a flat strap in a secure fashion, wherein the second lever includes a first and second side plate, the capture assembly located between the first and second side plate and the capture assembly includes a third side plate, a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate, the fourth side plate is interconnected to the second pin via a slotted opening allowing the fourth side plate to rotate and slide about the second pin. In another alternative, the third side plate includes a slotted capture area, the slotted capture area configured to removably capture the third pin when the fourth side plate is slid to a first end of the slotted opening and the third side plate further includes a curved area, adjacent to the slotted capture area, oriented to guide the third pin.

In one embodiment, a method of using a ratchet device includes providing a ratchet device. The ratchet device includes a ratchet wheel. The ratchet device further includes a first lever, the first lever rotatably interconnected with the ratchet wheel. The ratchet device further includes a second lever, the second lever rotatably interconnected with the ratchet wheel. The ratchet device further includes a first pivoting bracket, the first pivoting bracket pivotally interconnected with the first lever. The ratchet device further includes a second pivoting bracket, the second pivoting bracket pivotally interconnected with the second lever. The first pivoting bracket has a first position where the first pivoting bracket is rotated to engage the ratchet wheel and a second position where the first pivoting bracket is rotated to disengage from the ratchet wheel. Alternatively, the second pivoting bracket has a third position where the second pivoting bracket is rotated to engage the ratchet wheel and a fourth position where the second pivoting bracket is rotated to disengage from the ratchet wheel. The method further includes inserting a flat strap to the ratchet device. The method further includes ratcheting the ratchet device to increase tension by moving at least one of the first and second lever. The method further includes pivoting the first and second pivoting bracket to release tension on the flat strap and removing the flat strap. Alternatively, the ratchet device further includes a capture assembly, the capture assembly configured to capture a flat strap in a secure fashion, wherein the second lever includes a first and second side plate, the capture assembly located between the first and second side plate and the capture assembly includes a third side plate, a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate, the fourth side plate is interconnected to the second pin via a slotted opening allowing the fourth side plate to rotate and slide about the second pin.

BRIEF DESCRIPTION OF THE DRAWINGS

FIG. 4a shows an isometric view of the Enhanced Ratchet of FIG. 1 with the lever in an open position;

FIG. 4b shows the ratchet wheels, hub crossbars, two shim washers, two wire-from locks, and portions of the lever and the chassis sidewalls of the Enhanced Ratchet of FIG. 1;

FIG. 4c shows an exploded view of FIG. 4b from a different viewing angle;

FIG. 13 shows a section view of the Enhanced Ratchet of FIG. 1 through the longitudinal plane AA as defined in FIG. 1;

FIG. 14a shows a section view of the Enhanced Ratchet of FIG. 1 through the longitudinal plane AA as defined in FIG. 1;

FIG. 14b shows a section view of the Enhanced Ratchet of FIG. 1 through the longitudinal plane AA as defined in FIG. 1;

FIG. 15a through FIG. 15h show a sequence of isometric views depicting a step-wise progression removably securing the Enhanced Ratchet of FIG. 1 to a section of webbing by means of the capture-frame assembly;

FIG. 17a through FIG. 17d show a sequence of isometric views depicting a step-wise progression for configuring webbing in the ratchet tensioning portion of the Enhanced Ratchet of FIG. 1, and subsequently using the lever of Enhanced Ratchet to induce tension into the webbing;

FIG. 18a through FIG. 18e show a sequence of isometric views depicting a step-wise progression for releasing tension from webbing configured in the Enhanced Ratchet of FIG. 1;

FIG. 19a through FIG. 19i show a sequence of isometric views depicting a step-wise progression for securing the Enhanced Ratchet of FIG. 1 on a strap, said strap having one end containing a sewn loop;

FIG. 20a through FIG. 20h show a sequence of isometric views depicting a step-wise progression for securing the Enhanced Ratchet of FIG. 1 on a length of webbing;

FIG. 21a through FIG. 21h show a sequence of isometric views depicting a step-wise progression for securing the Enhanced Ratchet of FIG. 1 on the end of a strap containing a sewn end-loop;

FIG. 22a through FIG. 22f show a sequence of isometric views depicting a step-wise progression for securing the Enhanced Ratchet of FIG. 1 on the end of a length of webbing;

FIG. 23a through FIG. 23h show a sequence of isometric views depicting a step-wise progression for securing the Enhanced Ratchet of FIG. 1 to a short strap containing a sewn end-loop secured to an anchor location, and subsequently forming a fixed-end configuration between two anchor locations using a second length of webbing containing a permanently affixed hook;

FIG. 24a through FIG. 24h show the same sequence from FIG. 23 with the short strap being removably secured to a hook;

FIG. 25a through FIG. 25f show a sequence of isometric views depicting a step-wise progression for securing the Enhanced Ratchet of FIG. 1 to a short length of webbing tethered to an anchor location, and subsequently forming a fixed-end configuration between two anchor locations using a second length of webbing containing a permanently affixed hook;

FIG. 26a through FIG. 26h show a sequence of isometric views depicting a step-wise progression for securing an embodiment of an Enhanced Ratchet;

FIG. 27a through FIG. 27e show a sequence of isometric views depicting a step-wise progression for securing the Enhanced Ratchet of FIG. 1 to a strap containing a sewn end-loop;

FIG. 28a through FIG. 28f show a sequence of isometric views depicting a step-wise progression for securing the Enhanced Ratchet of FIG. 1 to a strap containing a sewn end-loop, and subsequently forming a fixed-end configuration between two anchor locations using a second strap containing a permanently affixed hook;

FIG. 29a through FIG. 29f show the same sequence from FIG. 28 with the short strap removably securing a hook;

DETAILED DESCRIPTION

Figure 1:
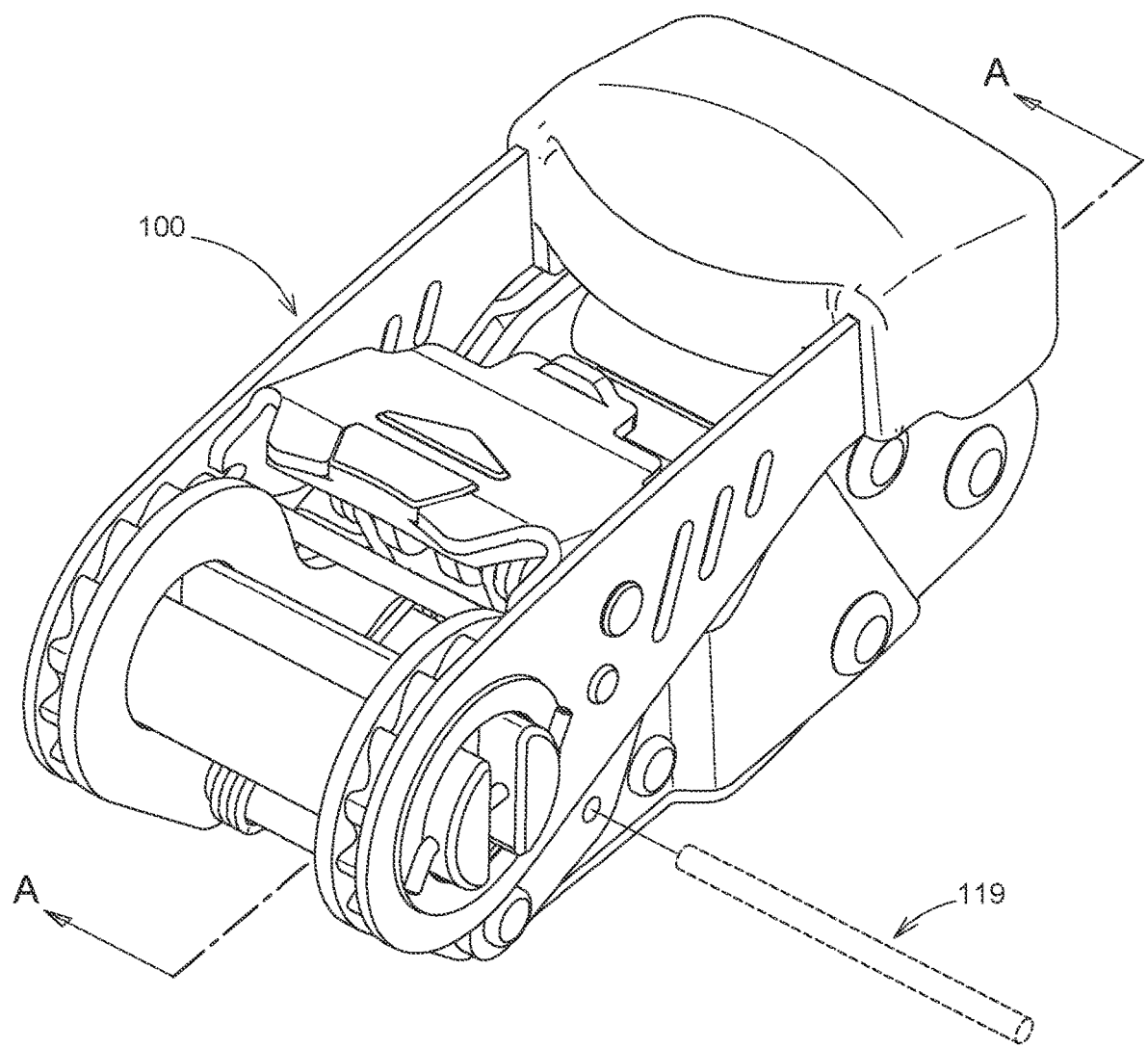
FIG. 1 shows an isometric view of one embodiment of an Enhanced Ratchet.

In the various figures and description, the parts and aspects are labeled as follows, for purely exemplary purposes.

Drawing Reference Numerals
100 Enhanced Ratchet
100' Enhanced Ratchet 100
101 chassis sidewall A
101' portion of chassis sidewall A 101 in common with a Prior Art ratchet device chassis
102 chassis sidewall B
102' portion of chassis sidewall B 102 in common with a Prior Art ratchet device chassis
103 circular opening, chassis sidewall A and B
104 circular opening, chassis sidewall A and B
105 circular opening, chassis sidewall A and B
106 circular opening, chassis sidewall A and B
107 circular opening, chassis sidewall A and B
108 circular opening, chassis sidewall A and B
109 alternate chassis for Enhanced Ratchet 100
110 chassis for alternative chassis configuration 360
111 swaged lower shoulder pin
112 swaged lower shoulder pin
113 swaged lower shoulder pin
114 gap between the two swaged lower shoulder pins, 112 and 113
115 gap between the swaged lower shoulder pin 113 and the center swaged shoulder pin 173
117 circular opening, chassis sidewall A and B
118 circular opening, chassis pivoting pawl bracket sidewall
119 pin or length of wire that prevents operation of Enhanced Ratchet
121 lever
121' portion of lever 121 in common with a Prior Art ratchet device lever
122 lever sidewall
123 circular opening, lever sidewall
124 circular opening, lever sidewall
125 circular opening, lever sidewall
127 recess in lever handle
128 circular embossment on side-plate B
129 lever handle
131 ratchet wheel
132 ratchet wheel tooth
133 opening through ratchet wheel
134 hub crossbar
135 transverse opening
136 long axis of hub crossbar
137 gap between constrained hub crossbars
138 center cross member
139 edge face
141 chassis pivoting pawl bracket
142 sidewall
143 tooth
144 circular opening
147 cutout
148 relief edge
149 chassis pivoting pawl bracket for alternative chassis configuration 360
151 lever pivoting pawl bracket
152 sidewall
153 tooth
154 circular opening
155 tab
156 semi-pierced embossment
158 opening along edge
159 opening
161 liner
162 standing support
163 circular opening
164 thumb edge
165 raised area
166 raised area
168 direction of travel, side-plate A
169 arm support
170 capture-frame assembly
171 side-plate A
172 side-plate B
1172 curved edge of side-plate B
173 swaged center shoulder pin
174 circular opening side-plate B
175 free-standing post
176 slotted opening, side-plate A
1176 end of slotted opening
177 open slot, side-plate B
178 circular opening, side-plate A
179 circular opening, side-plate B
180 locked position, capture-frame assembly
181 unlocked position, capture-frame assembly 182 open position, capture-frame assembly
183 non-restrained position, capture-frame assembly
184 direction of travel, embodiment
185 direction of travel, lever
186 direction of travel, lever pivoting pawl bracket
187 direction of travel, chassis pivoting pawl bracket
188 direction of travel, side-plate A
189 direction of travel, ratchet wheels/hub crossbars
190 direction of travel, lever, to execute release of ratchet induced webbing tension
191 swaged pivot pin, chassis pawl bracket
192 swaged pivot pin, lever pawl bracket
193 swaged pin, spring stop
194 torsion spring, chassis pivoting pawl bracket
195 torsion spring, lever pivoting pawl bracket
196 shim washer
197 wire-form lock
198 bottom shield
199 webbing guide
201 coil spring for alternative chassis configuration 360
240 section of webbing
241 lower tensioned underlying section of webbing
242 higher tensioned overlying section of webbing
250 length of webbing
251 length of webbing with sewn end loop
252 short length of webbing with sewn end loop
253 section of a cylinder representing a fixed anchor location
254 section of a cylinder representing a fixed anchor location
255 S-hook
256 fixed-end configuration
257 loop configuration
258 long length of webbing with sewn-on S-hook
259 section of a cylinder representing a fixed anchor location
284 direction of travel prevented, embodiment
300 Alternative Embodiment
320 Alternative Enhanced Ratchet with alternative chassis configuration
360 alternative chassis configuration
380 Camlock device incorporating a capture frame assembly 170
400 Current Art generic style ratchet device
402 chassis
403 notch in chassis sidewall
404 lever
406 ratchet wheel
408 ratchet wheel teeth
410 hub crossbar
412 chassis sliding bracket
414 lever sliding bracket
416 flat blade portion of sliding bracket
418 eccentric shaped end of the lever
420 chassis sidewall slot
422 lever sidewall slot
424 radially raise edge on the chassis sidewall
426 plane formed between slots on opposing chassis sidewalls
427 plane formed between slots on opposing lever sidewalls
428 third cross bar
429 embossment
430 spring
431 sewn-on webbing length
432 sewn-on hook
433 contact area between lever end eccentric and blade end of sliding bracket
435 hybrid chassis
434 sewn on strap, Prior Art device
501 direction arrow
510 symbol indicating direction and relative magnitude of a reaction force F arising from induced ratchet tension, being one half the magnitude of the force labeled 515
515 symbol indicating direction and relative magnitude of a reaction force 2F arising from induced ratchet tension, being twice the magnitude of the force labeled 51
3000 Alternative capture frame
3010 s-shaped capture bar
3020 first capture notch
3030 second capture notch
3110 sidewall embossments
3175 floating post
3220 separate capture ring
3210 cross bar
3310 camlock
3320 press area Certain terminology is used herein for convenience only and is not to be taken as a limitation on the embodiments of Systems and Methods for an Improved Ratcheting Device Including Pivoting Tooth (Enhanced Ratchet). In many embodiments of an Enhanced Ratchet, the device includes a first pivoting tooth that interfaces with a ratchet wheel. This is in sharp contrast to many prior art devices that utilize sliding brackets to interface with the ratchet wheel. In many embodiments, the first pivoting tooth is mounted on a first pivoting bracket. This first pivoting bracket allows for the first pivoting tooth to pivot away from the ratchet wheel, resulting in increased performance and wear to the Enhanced Ratchet. In many embodiments, the device additionally includes a second pivoting tooth that interfaces with the ratchet wheel. In many embodiments, the second pivoting tooth is mounted on a second pivoting bracket. This second pivoting bracket allows for the second pivoting tooth to pivot away from the ratchet wheel. The pivoting brackets are mounted on corresponding lever arms, allowing the brackets and therefore the teeth to rotate away from the ratchet wheel and therefore turn, providing for a strap to be tensioned. Additionally, in many embodiments the teeth of the ratchet wheel have a rounded and complementary shape to the first and second pivoting tooth, such that when the levers arms are moved in a first rotational direction, a first one of the first and second pivoting tooth flexes back and ratchets and when the levers arms are moved in a second rotational direction, a second one of the first and second pivoting tooth flexes back and ratchets. This methodology of ratcheting follows the curved surfaces of the ratchet wheel, such that when the first or second tooth ratchets, it slides smoothly on the ratchet wheel and approximately moves along the shape of the ratchet wheel.

Embodiments of the Enhanced Ratchet have many advantages and features. Some embodiments herein provide a ratchet device that effectively doubles the tension inducing capability of the device when compared to similar sized current art ratchet devices. Some embodiments enable device attachment and detachment anywhere along a strap without requiring access to either end of the strap. Some embodiments permit routing of the strap prior to attaching and positioning the ratchet device on the strap. Some embodiments enable but do not require the use of anchor hooks at the strap ends. In using materials similar to those found in current art ratchet devices, some embodiments provide a more durable and less damage prone interface at the load bearing locations of the device. Some embodiments afford a reliable tension release action suitable for releasing high tension levels while providing convenient access to the strap to aid in removal of the strap. These and other benefits of one or more aspects will become apparent from a consideration of the ensuing description and accompanying drawings.

FIG. 1 shows one embodiment of Enhanced Ratchet 100. FIG. 1 shows an isometric view of the Enhanced Ratchet 100 in a closed position. In FIG. 1, cross section line A is shown. Additionally, pin 119 is shown. Pin 119 may be used to lock Enhanced Ratchet in an inoperable position for sale or transport. Essentially, Pin 119 locks pawl bracket 141 in place which prevents ratchet wheel 131 from turning, locking pawl bracket 141 to the rest of the body of the device.

Figure 2A:
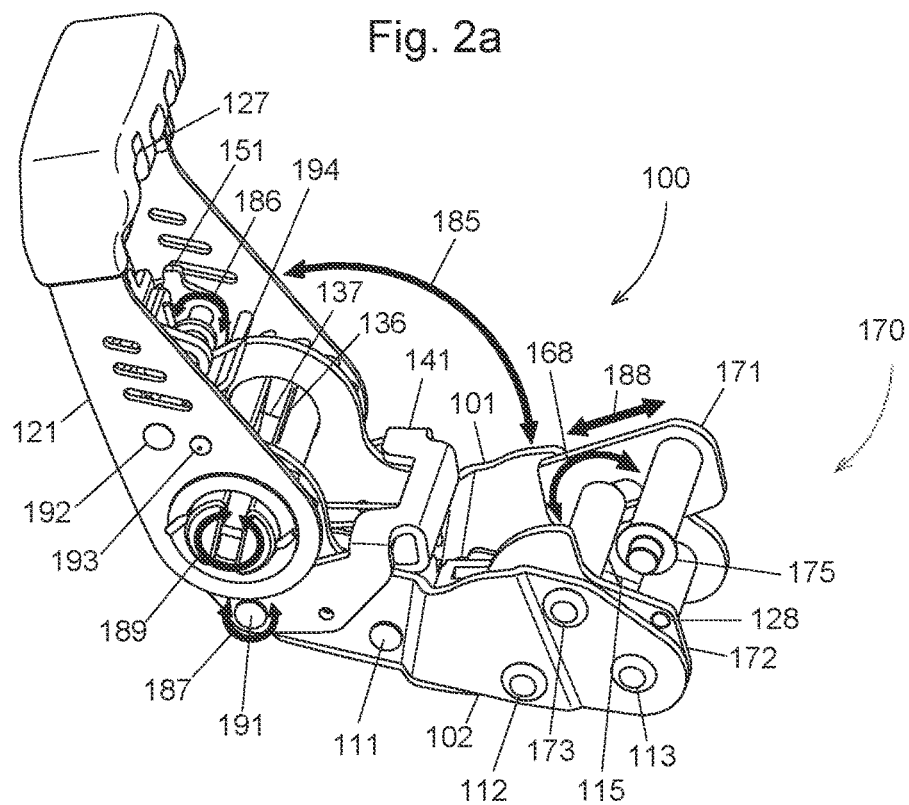
FIG. 2a shows an isometric view of the Enhanced Ratchet of FIG. 1.
Figure 2B:
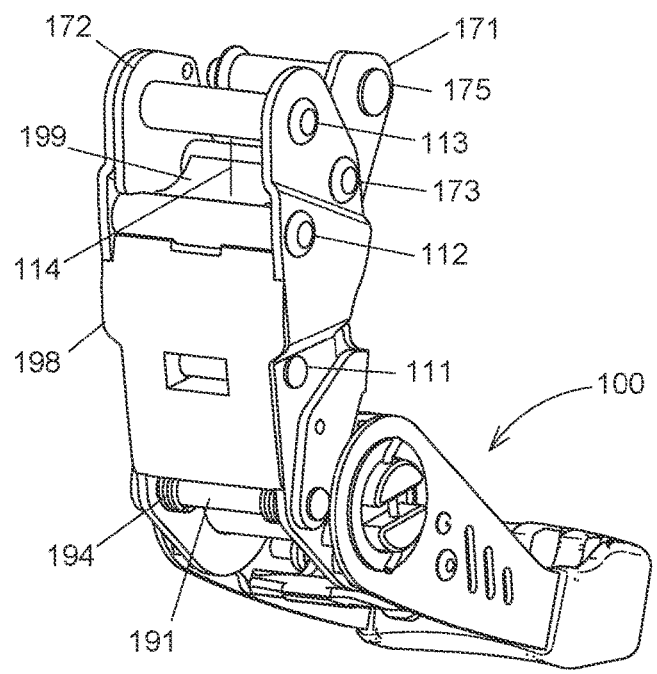
FIG. 2b shows an isometric view of the Enhanced Ratchet of FIG. 1.

FIG. 2a shows an isometric view of Enhanced Ratchet 100 with a capture-frame assembly and a lever in open positions. Arrows indicate relative directions of movement for the lever, capture-frame assembly, a lever pivoting pawl bracket, a chassis pivoting pawl bracket, two ratchet wheels, and two hub crossbars. In this view numerous important features are visible. First, it is visible in this view that the ratchet system has two pivoting/rotating brackets, one which rotates in the direction of travel 186 and one that rotates in the direction of travel 187. The rotation of these two brackets, chassis pivoting pawl bracket 141 and lever pivoting pawl bracket 151 greatly enhance the operation of the device. This is because their rotation provides for a smooth ratcheting along and/or release from ratchet wheel 131. This greatly increases the usability and performance of the device. Also, visible here is the capture-frame assembly 170. This part of Enhanced Ratchet is important to the operation of the device, since it offers an attachment area that allows for fixed and releasable interconnection to the end of a flat strap or along a flat strap, providing the user the opportunity to use the device without any need to tie the flat strap. FIG. 2b shows another view of Enhanced Ratchet 100 in an open position.

Figure 3:
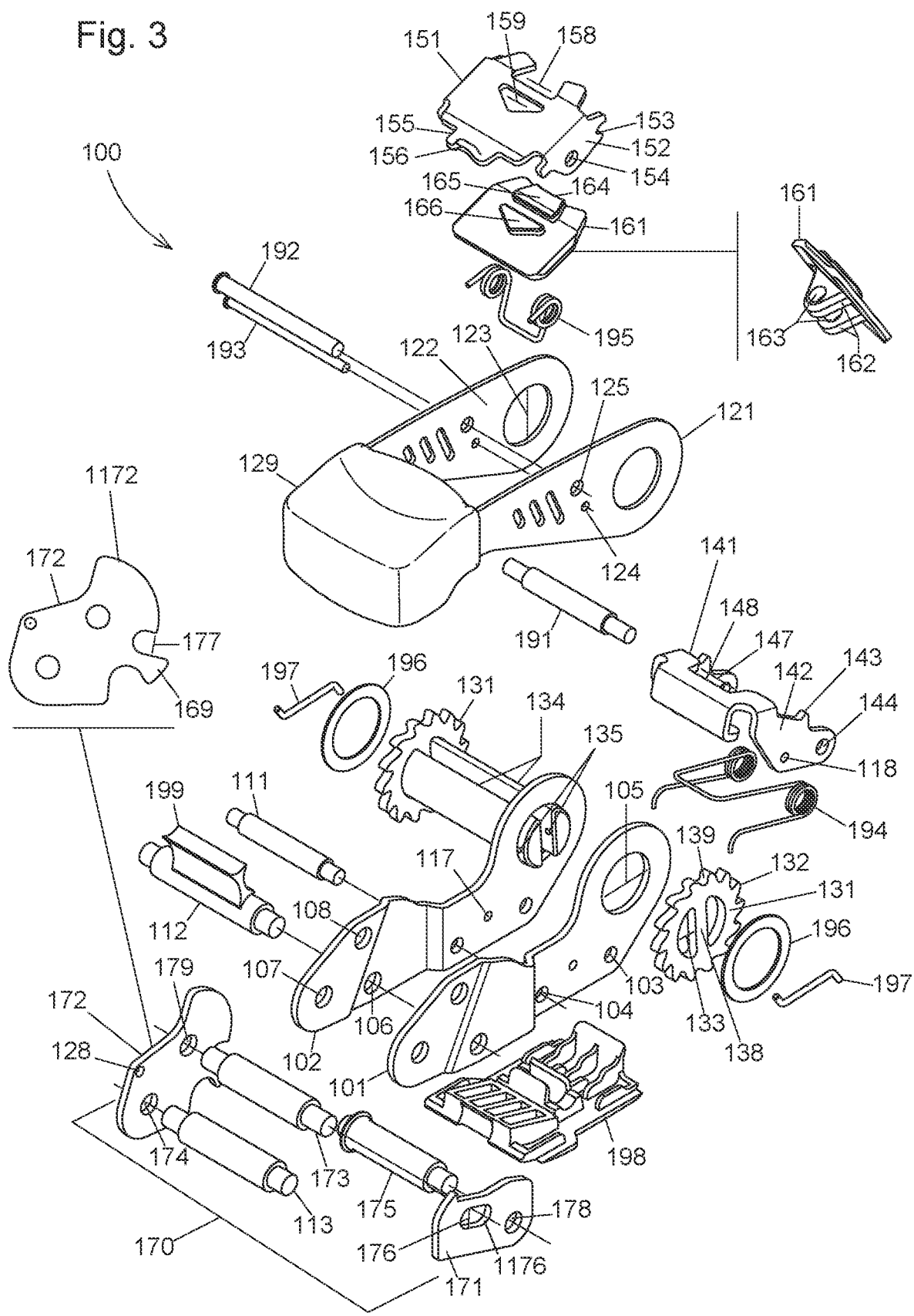
FIG. 3 shows an exploded assembly view of the Enhanced Ratchet of FIG. 1.

FIG. 3 shows an exploded view of Enhanced Ratchet 100. In this view, various details of the device are visible. Many things in this view are important, some of which will be explained in more detail below. One of many important aspects, is the shape of the ratchet wheel teeth 132 in relation to the shape of the teeth 153 of the lever pivoting pawl bracket 151 and the teeth 143 of the pivoting pawl bracket 141. The teeth have a smooth and complementary shape, enabling them to slide smoothly over each other. Additionally, it is important to note that the torsion spring 194, 195 are used to provide rotational tension and force to the lever pivoting pawl bracket 151 and the pivoting pawl bracket 141. These springs are only exemplary of course and other types and locations of springs may be utilized. For instance, a coil spring may be located between the pivoting brackets and braced against the frame to provide rotational force. This is only one example, and many will occur to those skilled in the art. In addition, the form factors shown here, and their relative sizes are only exemplary, and many different embodiments may utilize different size pieces and configurations.

Figure 36:
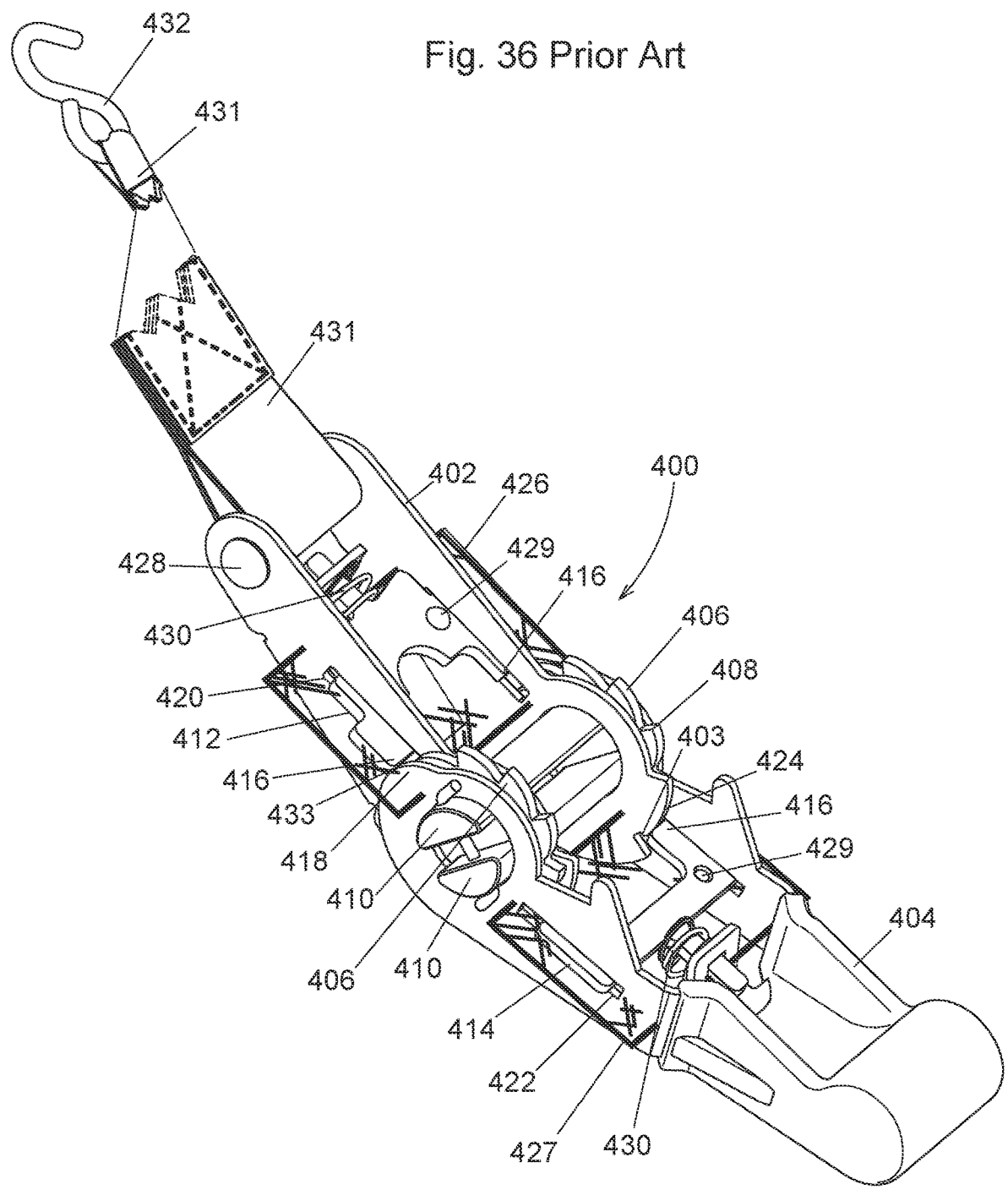
Figure 37:
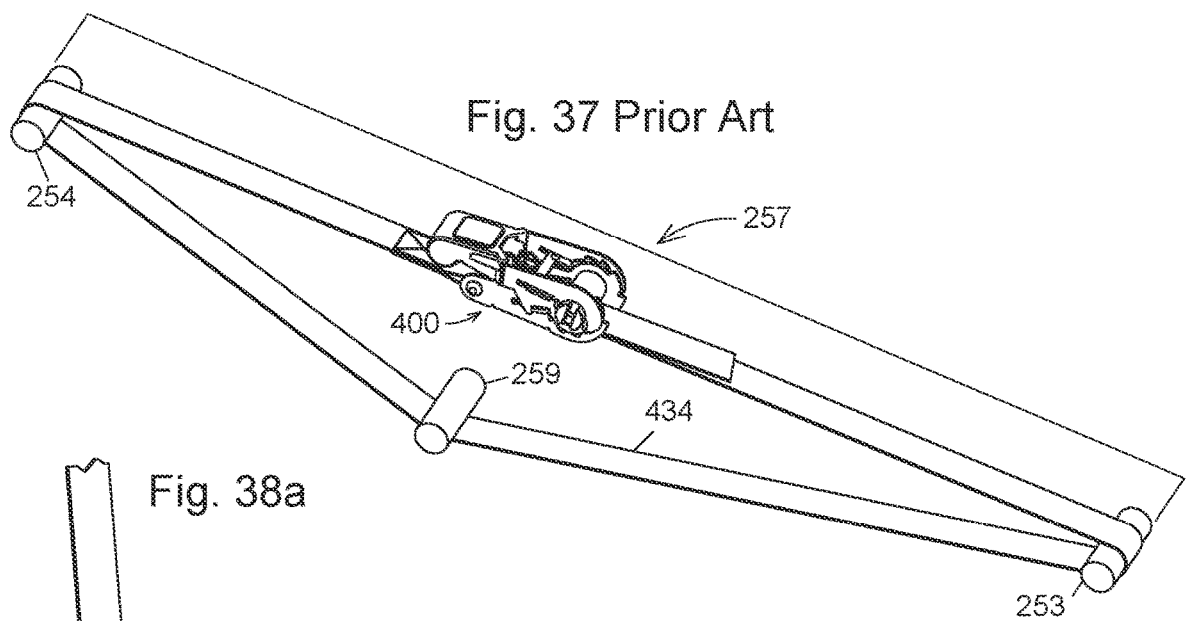

FIG. 4a shows an open view of Enhanced Ratchet 100. FIG. 4b shows the ratchet wheels 131, hub crossbars 134, two shim washers 196, two wire-form locks 197, and portions of the lever and the chassis sidewalls from FIG. 4a that the Enhanced Ratchet 100 would be similar with a prior art ratchet device FIG. 36 Prior Art. Note that front portion 101' and 102' do not really exist in Enhanced Ratchet 100, since these areas form part of the sidewalls of the chassis. Additionally, although the Enhanced Ratchet 100 may have ratchet wheels like prior art devices, the shape of the gearing/teeth may not be found in prior art devices. Note that the broken line areas are shown to depict parts not in common. FIG. 4c shows an exploded view of FIG. 4b from a different viewing angle.

Figure 5:
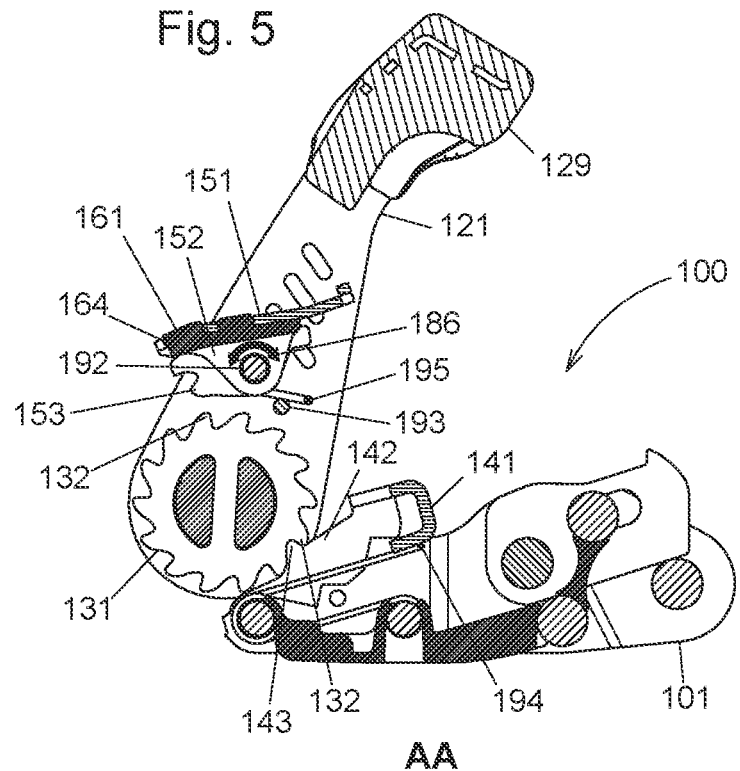
FIG. 5 shows a section view of the Enhanced Ratchet of FIG. 1 through the longitudinal plane AA as defined in FIG. 1.

FIG. 5 shows a section view of Enhanced Ratchet 100 through the longitudinal plane AA as defined in FIG. 1. The lever pivoting pawl bracket 151 is partially opened and enables lever 121 to free-spin. This makes it clear, in the embodiment shown, lever 121 is braced against ratchet wheel via lever pivoting pawl bracket 151. When lever pivoting pawl bracket 151 is pivoted away, lever 121 may free spin in relation to ratchet wheel 131. Additionally, to improve visibility of the ratchet wheel details, part of the chassis sidewall has been cut away near the ratchet wheels. The position of the chassis pivoting pawl bracket 141 as shown preserves ratchet tension induced in the webbing. Chassis pivoting pawl bracket 141 prevents chassis sidewall 101, 102 from free spinning in respect to ratchet wheel 131. No webbing is shown in FIG. 5.

Figure 6:
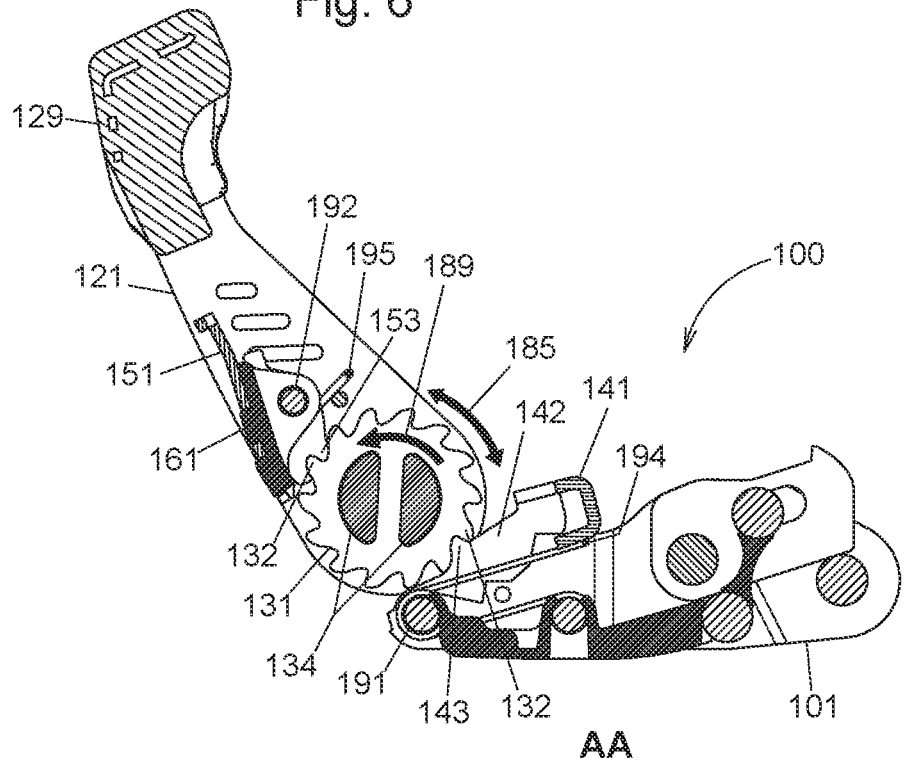
FIG. 6 shows a section view of the Enhanced Ratchet of FIG. 1 through the longitudinal plane AA as defined in FIG. 1.

FIG. 6 shows a section view of Enhanced Ratchet 100 through the longitudinal plane AA as defined in FIG. 1. The lever pivoting pawl bracket 151 is positioned to induce tension in webbing as the lever is rotated. A tooth 153 on the lever pivoting pawl bracket engages a tooth 132 residing on the perimeter on the ratchet wheel 131. Additionally, to improve visibility of the ratchet wheel 131 details, part of the chassis sidewall has been cut away near the ratchet wheels. The position of the chassis pivoting pawl bracket 141 as shown preserves ratchet tension induced in the webbing. No webbing is shown in FIG. 6.

Figure 7A:
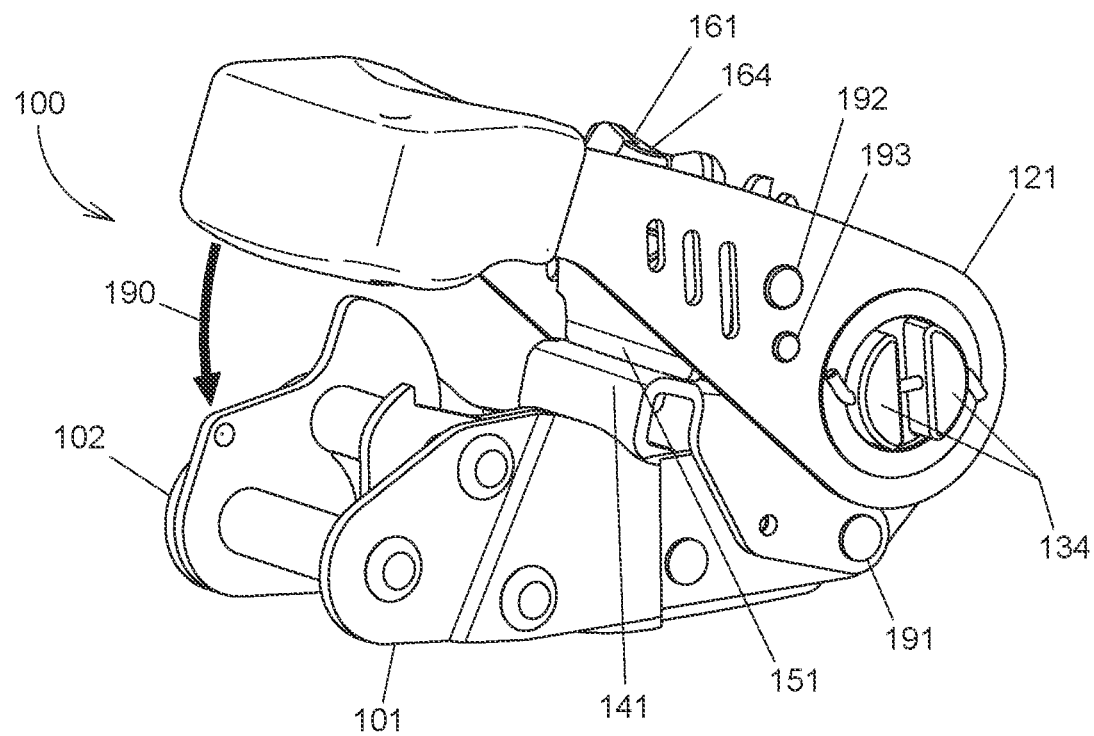
FIG. 7a and FIG. 7b show isometric views the Enhanced Ratchet of FIG. 1 positioned to initiate tension release from webbing configured in the embodiment.
Figure 7B:
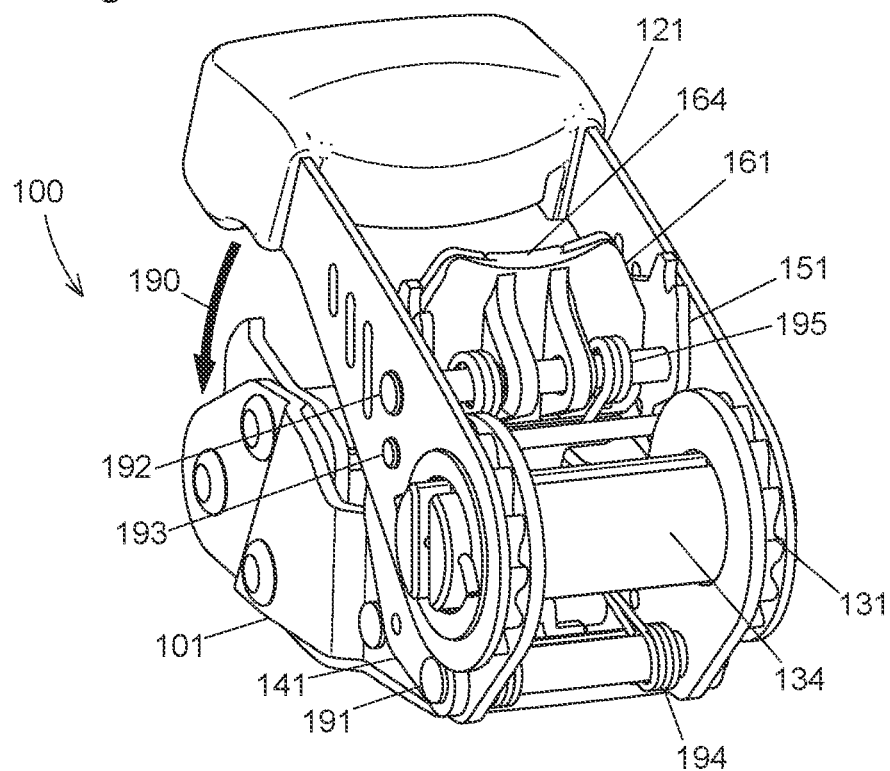

FIG. 7a and FIG. 7b show isometric views of Enhanced Ratchet 100 positioned to initiate tension release from webbing configured in the embodiment. Direction of lever travel to execute tension release is also shown. No webbing is shown in FIG. 7a or FIG. 7b. In these configurations, lever pivoting pawl bracket 151 is rotated and engaged with chassis pivoting pawl bracket 141, such that lever pivoting pawl bracket 151 pushes chassis pivoting pawl bracket 141 into a position rotated away from ratchet wheel 131 and chassis pivoting pawl bracket 141 holds lever pivoting pawl bracket 151 in a rotated position. In such a configuration, neither bracket is engaged with ratchet wheel 131 and ratchet wheel 131 may rotate freely.

Figure 8A:
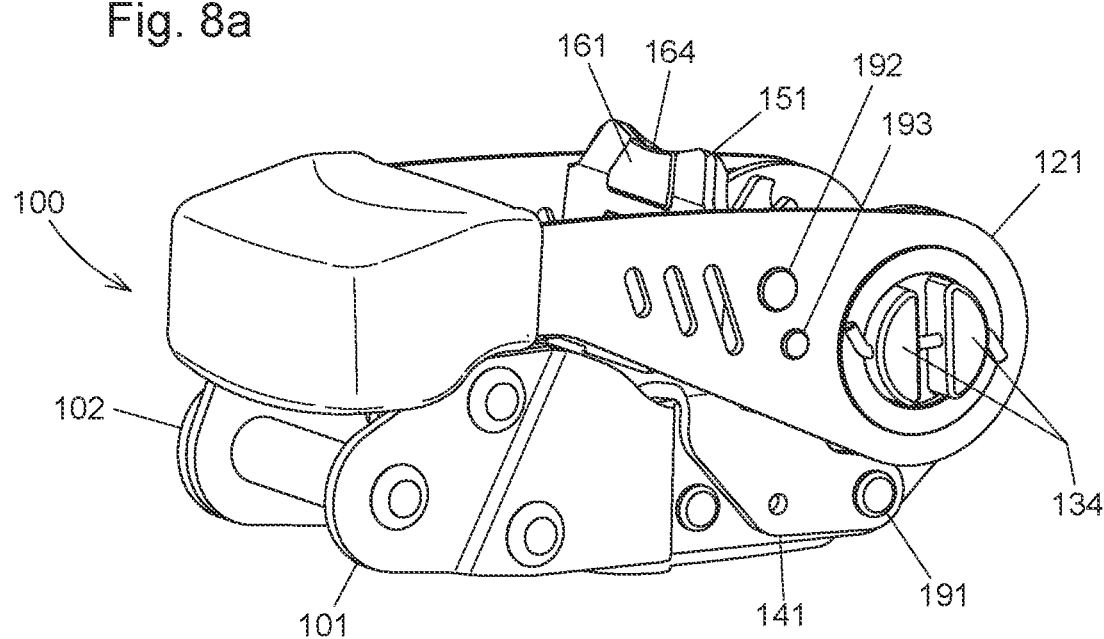
FIG. 8a and FIG. 8b show isometric views Enhanced Ratchet of FIG. 1 at the end of the tension release action.
Figure 8B:
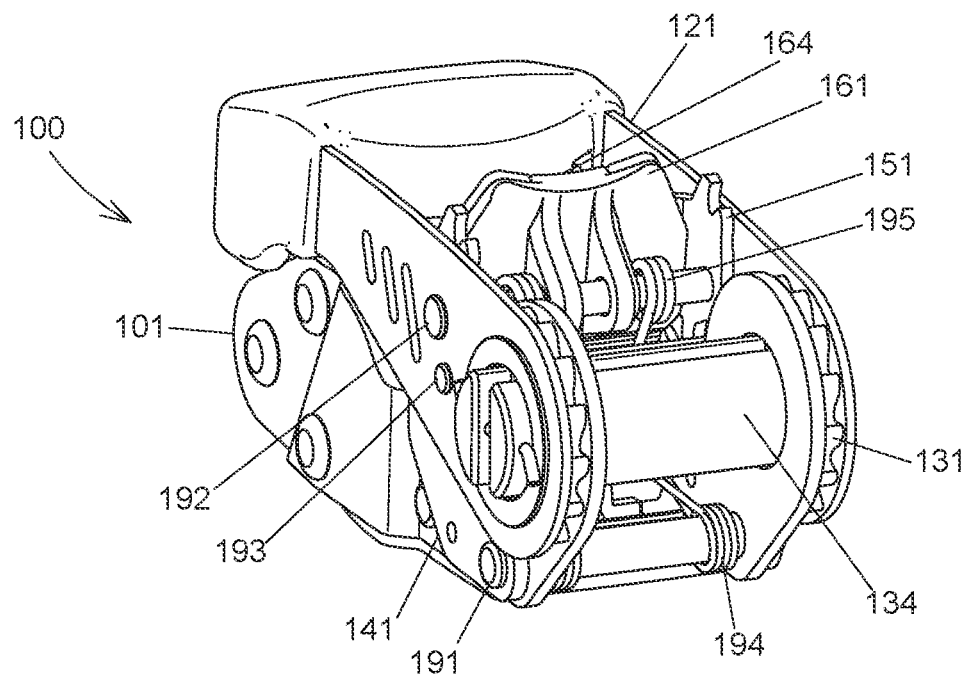

FIG. 8a and FIG. 8b show isometric views of Enhanced Ratchet 100 at the end of the tension release action. Note relative positions of the lever, chassis, and lever pivoting pawl bracket. In this position, the lever pivoting pawl bracket 151 has moved the chassis pivoting pawl bracket 141 away from the ratchet wheels 131, disengaging the chassis pivoting pawl bracket 141 from the ratchet wheels. The hub crossbars 134 are now free to rotate in either direction allowing webbing configured in the embodiment to be easily withdrawn from the hub crossbars 134. No webbing is shown in FIG. 8a or FIG. 8b.

Figure 9A:
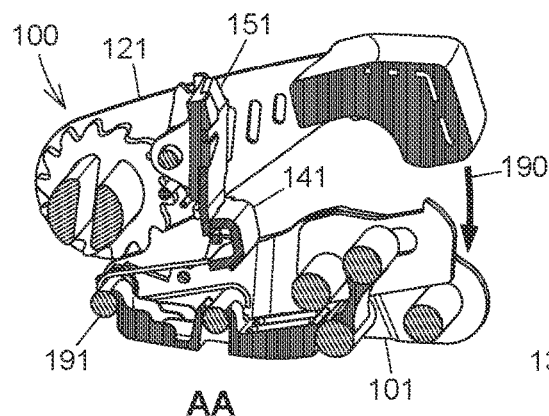
FIG. 9a and FIG. 9b show an isometric view and a section view of the longitudinal plane AA as defined in FIG. 1, with Enhanced Ratchet of FIG. 1 positioned as in FIG. 7a and FIG. 7b.
Figure 9B:
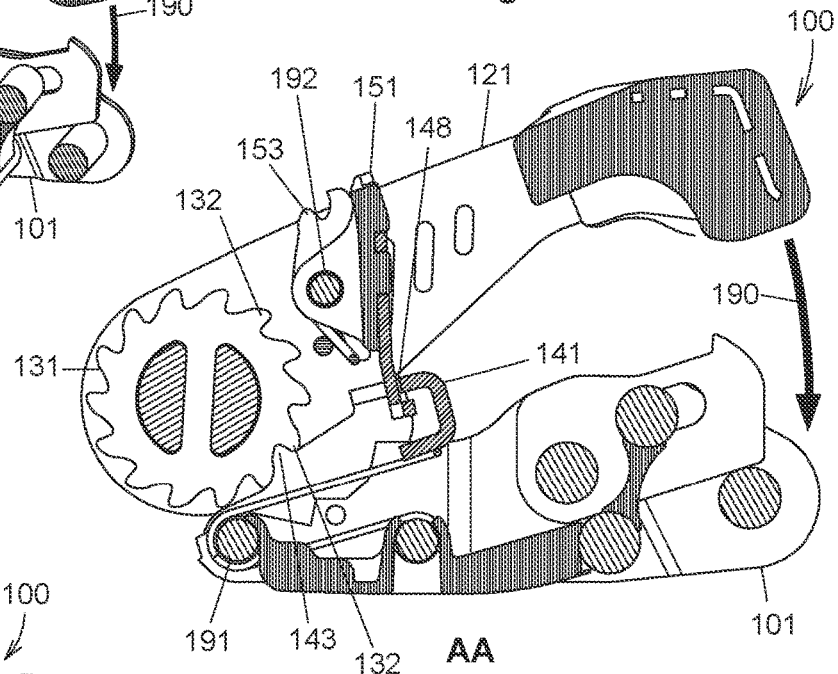

FIG. 9a and FIG. 9b show an isometric view and a section view of the longitudinal plane AA as defined in FIG. 1, with Enhanced Ratchet 100 positioned as in FIG. 7a and FIG. 7b. Note the engagement of the chassis pivoting pawl bracket tooth 143 with the ratchet wheel tooth 132. Also note the complementary structure of the teeth, where the void of the tooth 132 is completely filled by tooth 143. No webbing is shown in FIG. 9a or FIG. 9b.

Figure 10A:
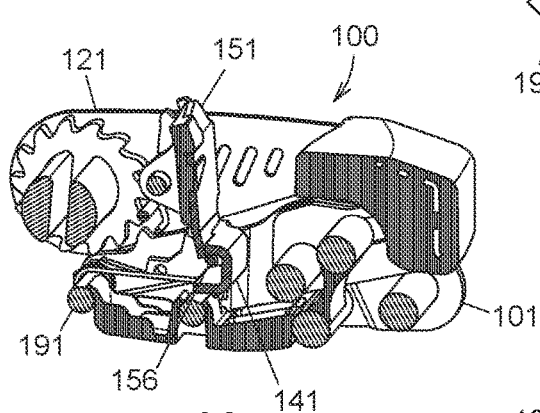
FIG. 10a and FIG. 10b show an isometric view and a section view of the longitudinal plane AA as defined in FIG. 1, with Enhanced Ratchet of FIG. 1 positioned as in FIG. 8a and FIG. 8b.
Figure 10B:
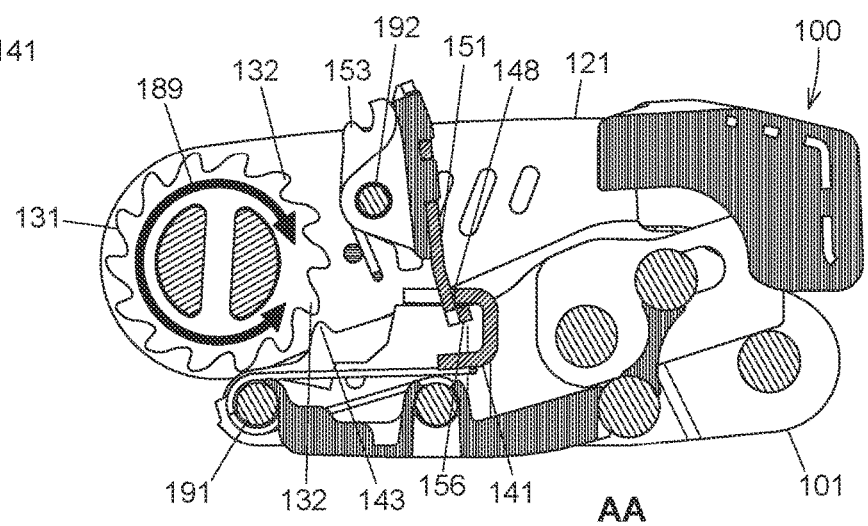

FIG. 10a and FIG. 10b show an isometric view and a section view of the longitudinal plane AA as defined in FIG. 1, with Enhanced Ratchet 100 positioned as in FIG. 8a and FIG. 8b. Note the complete disengagement of both the chassis pivoting pawl bracket tooth 143 and the lever pivoting pawl bracket tooth 153 from the ratchet wheel teeth 132. The lever pivoting pawl bracket 151 is disengaged from the ratchet wheels 131 before the chassis pivoting pawl bracket 141 is disengaged. Using the back end of the lever pivoting pawl bracket 151 (tab 155) as the mechanism to disengage the chassis pivoting pawl bracket 141 from the ratchet wheels 131 ensures the lever pivoting pawl bracket 151 will disengage first. No webbing is shown in FIG. 10a or FIG. 10b.

FIG. 11a through FIG. 11d show the capture-frame assembly in four unique positions; locked, unlocked, open, and non-restrained, respectively. The Figures represent section views of Enhanced Ratchet 100 through the longitudinal plane AA as defined in FIG. 1. No webbing is shown configured in the capture-frame assembly.

FIG. 12a through FIG. 12d repeats FIG. 11a through FIG. 11d shown as isometric views with the addition of a single layer of webbing 240 configured in the capture-frame assembly. This would be representative of single strap, fixed end configuration (FIG. 19). Note the capture-frame assembly in FIG. 12d allows free movement of Enhanced Ratchet 100 along the webbing in either direction.

FIG. 13 shows a section view of Enhanced Ratchet 100 through the longitudinal plane AA as defined in FIG. 1. The embodiment is removably secured to a section of webbing. The capture-frame assembly is shown in a locked position. Enhanced Ratchet 100 is prevented from moving along the webbing in the direction indicated by the arrow whenever tension in an overlying section of webbing configured in the embodiment is greater than the tension in an underlying section of webbing. In this instance, the higher tensioned webbing overlying the lower tensioned webbing occurs at the center shoulder pin of the capture-frame assembly.

Enhanced Ratchet is not prevented from movement along the webbing in the opposite direction. Movement, or lack of movement, in the opposite direction is inconsequential to the proper operation of the embodiment. If thick or stiff webbing is used with the embodiment, movement in the opposite direction may be hindered.

FIG. 14a shows a section view of Enhanced Ratchet 100 through the longitudinal plane AA as defined in FIG. 1. The embodiment is removably secured to the webbing. The capture-frame assembly is shown in a locked position with webbing configured in Enhanced Ratchet in a tethered anchor configuration (FIG. 25). The free ends of the webbing are trapped between the load bearing sections of webbing and the forward positioned swaged lower shoulder pin. Is this configuration, the embodiment is prevented from moving in the direction indicated by the arrow. The higher tensioned webbing overlying the lower tensioned webbing occurs at the swaged lower shoulder pin where the tethered anchor webbing enters and exits Enhanced Ratchet through the gap formed between the two swaged lower shoulder pins.

FIG. 14b shows a section view of Enhanced Ratchet 100 through the longitudinal plane AA as defined in FIG. 1. The embodiment is removably secured to the webbing. The capture-frame assembly is shown in a locked position with webbing configured in the embodiment in a tethered anchor configuration where the free ends of the webbing are not trapped between the load bearing sections of webbing and the forward positioned swaged lower shoulder pin. In this configuration, the embodiment is prevented from moving along the webbing in the direction indicated by the arrow. The higher tensioned webbing overlying the lower tensioned webbing occurs at the center shoulder pin of the capture-frame assembly.

FIG. 15a through FIG. 15h show a sequence of isometric views depicting a step-wise progression removably securing Enhanced Ratchet 100 to a section of webbing by means of the capture-frame assembly. Only the capture-frame portion of the embodiment and the front end of the chassis sidewalls A and B are shown. When the capture-frame assembly is in the locked position, as shown in FIG. 15h and FIG. 13, movement of Enhanced Ratchet along the webbing in the direction indicated by the arrow is prevented. When the capture-frame assembly is in the non-restricted position, as shown in FIG. 15e and FIG. 12d, movement of the embodiment in either direction along the webbing is enabled.

Figure 16A:
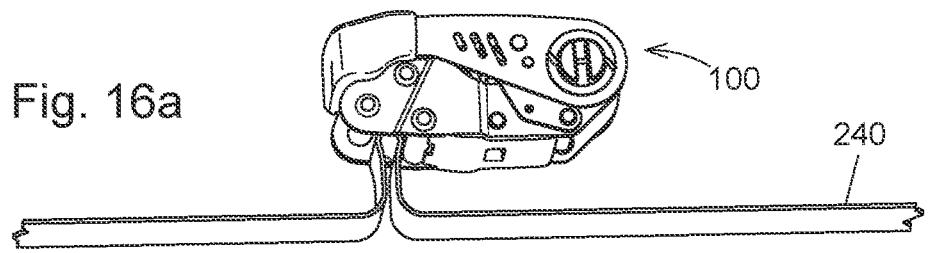
FIG. 16a through FIG. 16g show a sequence of isometric views depicting a step-wise progression removably securing the Enhanced Ratchet of FIG. 1 to a section of webbing.
Figure 16B:
Figure 16C:
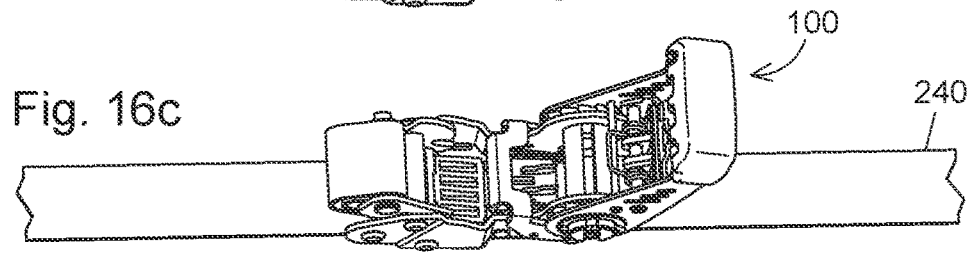
Figure 16D:
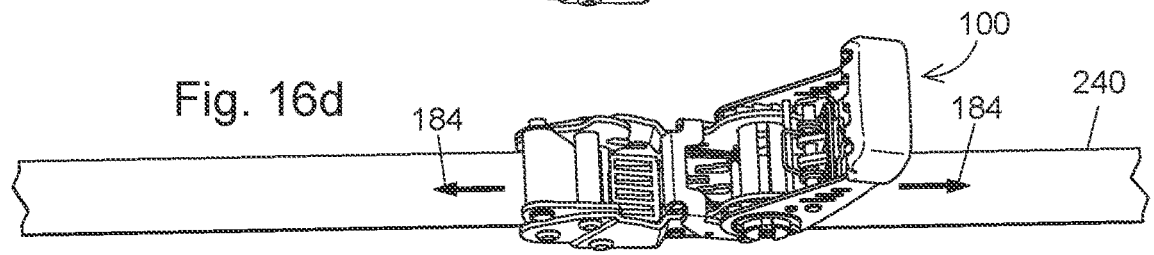
Figure 16E:
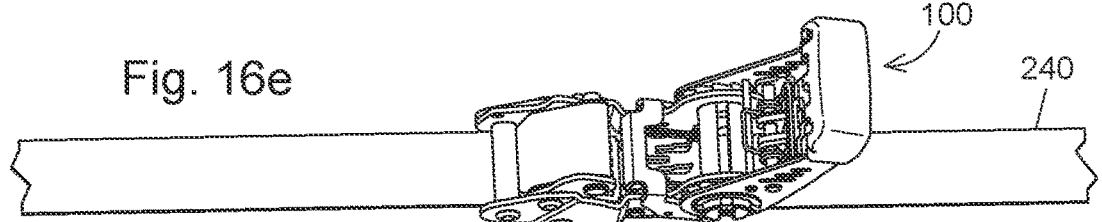
Figure 16F:
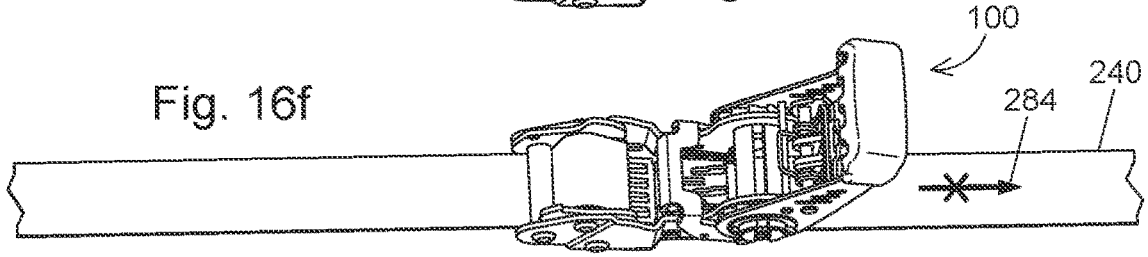
Figure 16G:
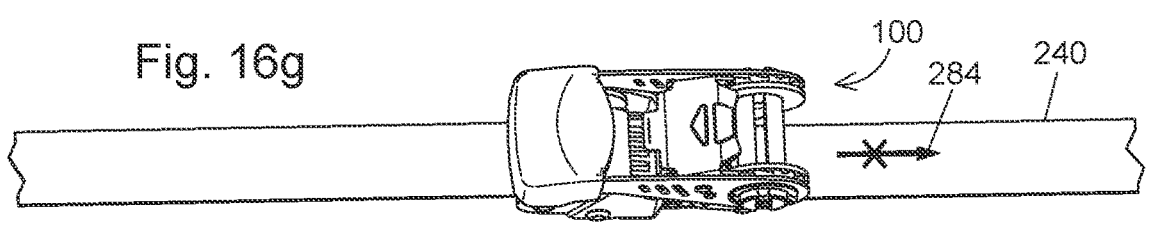

FIG. 16a through FIG. 16g show a sequence of isometric views depicting a step-wise progression removably securing Enhanced Ratchet 100 to a section of webbing. Access to the ends of the webbing is not required in securing the Enhanced Ratchet to the webbing. The Enhanced Ratchet is secured to the webbing by means of the capture-frame assembly. The Enhanced Ratchet is removed from the webbing by reversing the progression shown. To remove the Enhanced Ratchet from the webbing, tension in the webbing must first be released. FIG. 16g shows the Enhanced Ratchet secured to the webbing and the capture-frame assembly in the locked position, thus preventing movement of the embodiment along the webbing in the direction indicated by the arrow.

FIG. 17a through FIG. 17d show a sequence of isometric views depicting a step-wise progression for configuring webbing in the ratchet tensioning portion of Enhanced Ratchet 100, and subsequently using the lever of Enhanced Ratchet to induce tension into the webbing. Reaction forces at the anchor locations 2F are twice the tension force F induced by the ratchet portion of Enhanced Ratchet 100.

FIG. 18a through FIG. 18e show a sequence of isometric views depicting a step-wise progression for releasing tension from webbing configured in Enhanced Ratchet 100. The tension release action requires one-hand, simultaneously thumb-flipping the lever pivoting pawl bracket while positioning the lever and lever pivoting pawl bracket into a mated position with the chassis pivoting pawl bracket. Webbing tension release is then accomplished by drawing the lever and chassis together. The mechanical advantage afforded by the lever and the two pivoting pawl bracket geometries require only a modest input of force to release hundreds of pounds of induced webbing tension, all easily accomplished using a single hand.

FIG. 19a through FIG. 19i show a sequence of isometric views depicting a step-wise progression for securing Enhanced Ratchet 100 on a strap, said strap having one end containing a sewn loop. The progression depicts a fixed-end configuration, subsequently tensioned by means of Enhanced Ratchet 100. A fixed-end configuration is comprised of a strap spanning a distance between two anchor locations, with the strap affixed in some manner at each anchor location. Unlike current art ratchet devices, a single removably attached strap is used, allowing Enhanced Ratchet 100 to be positioned anywhere along the length of the strap.

FIG. 20a through FIG. 20h show a sequence of isometric views depicting a step-wise progression for securing Enhanced Ratchet 100 on a length of webbing. Neither end of the webbing contains any type of treatment; sewn-on hook, sewn end-loop, or otherwise. The progression depicts a fixed-end configuration with Enhanced Ratchet 100 used to draw tension into webbing spanning the distance between two anchor locations. This configuration, using a single detachable strap without end treatments, is not possible using current art ratchet devices. Enhanced Ratchet 100 can be attached anywhere along the length of the webbing.

FIG. 21a through FIG. 21h show a sequence of isometric views depicting a step-wise progression for securing Enhanced Ratchet 100 on the end of a strap containing a sewn end-loop. The embodiment with the attached strap is then configured in a loop configuration spanning three anchor locations. The embodiment and strap are the same as used in FIG. 19, thus illustrating the versatility of the embodiment in creating multiple configurations. Current art ratchet devices are typically manufactured to function solely in either a fixed-end or a loop configuration.

FIG. 22a through FIG. 22f show a sequence of isometric views depicting a step-wise progression for securing Enhanced Ratchet 100 on the end of a length of webbing. The end of the webbing does not contain end treatments. The embodiment with the attached webbing is then configured in a loop configuration spanning three anchor locations. The embodiment and webbing are the same as used in FIG. 20, thus illustrating the versatility of the embodiment in creating multiple configurations using interchangeable straps of varying lengths. Current art ratchet devices cannot be used independent of the permanently attached strap with which they are manufactured.

FIG. 23a through FIG. 23h show a sequence of isometric views depicting a step-wise progression for securing Enhanced Ratchet 100 to a short strap containing a sewn end-loop secured to an anchor location, and subsequently forming a fixed-end configuration between two anchor locations using a second length of webbing containing a permanently affixed hook. The short strap can be sized to an appropriate length best suited to the application. Enhanced Ratchet 100 can be attached to the short strap at any location along the strap. Note, the use of a removably attached strap enables the strap and first embodiment combination to be secured to a variety of anchor locations that otherwise could prove unsuitable for a sewn-on strap containing a sewn-on hook. This type of connection is referred to as a tethered anchor.

FIG. 24a through FIG. 24h show the same sequence from FIG. 23 with the short strap being removably secured to a hook. The configuration shown replicates the configuration predominantly used by prior art ratchet devices (FIG. 35 Prior Art), the primary difference being Enhanced Ratchet 100 is not permanently attached to either the hook or the shorter strap, thus preserving its ability to be used in other configurations.

FIG. 25a through FIG. 25f show a sequence of isometric views depicting a step-wise progression for securing Enhanced Ratchet 100 to a short length of webbing tethered to an anchor location, and subsequently forming a fixed-end configuration between two anchor locations using a second length of webbing containing a permanently affixed hook. The tethered anchor attachment affords a high degree of versatility when securing to an anchor location. Such anchoring options are unavailable in the current art of ratchet devices which utilize a permanently affixed anchor strap.

FIG. 26a through FIG. 26h show a sequence of isometric views depicting a step-wise progression for securing Enhanced Ratchet 100 to a length of webbing containing a sewn end-loop and two removably affixed S-hooks, subsequently anchored between two fixed positions forming a fixed-end configuration. The sequence shown is similar to the sequence depicted in FIG. 24, the difference being, instead of two straps, a single strap is used. The induced stress in the ratchet portion of the embodiment 100 is comparable to that of a current art device, yet the magnitude of the reaction force at the anchor locations is effectively doubled (FIG. 17d, FIG. 35d Prior Art). This represents a significant advantage over the current art.

FIG. 27a through FIG. 27e show a sequence of isometric views depicting a step-wise progression for securing Enhanced Ratchet 100 to a strap containing a sewn end-loop. Before the strap is secured to Enhanced Ratchet, the end containing a sewn end-loop is routed around an anchor point then doubled back onto itself. Both the sewn end-loop and overlying strap are then secured by the capture-frame assembly. The free end of the strap exiting the bottom of Enhanced Ratchet 100 is routed around a second distant anchor point before being reintroduced into the ratchet portion of Enhanced Ratchet. Compared to FIG. 19, this configuration effectively doubles the load bearing capacity of the strap configured in the device. Enhanced Ratchet 100 can be attached anywhere along the length of the strap.

FIG. 28a through FIG. 28f show a sequence of isometric views depicting a step-wise progression for securing Enhanced Ratchet 100 to a strap containing a sewn end-loop, and subsequently forming a fixed-end configuration between two anchor locations using a second strap containing a permanently affixed hook. The initial steps of the progression are similar to that of FIG. 27, the difference being the short strap forms a tethered anchor. This affords the user an option of using lighter weight webbing for the tethered anchor strap without sacrificing load bearing capacity at the tethered anchor. Note however, the doubling effect of the ratchet action as described in other Figures (FIG. 27) is not operative in this configuration. The configuration is functionally similar to the typical configuration used by current art devices.

Figure 35:
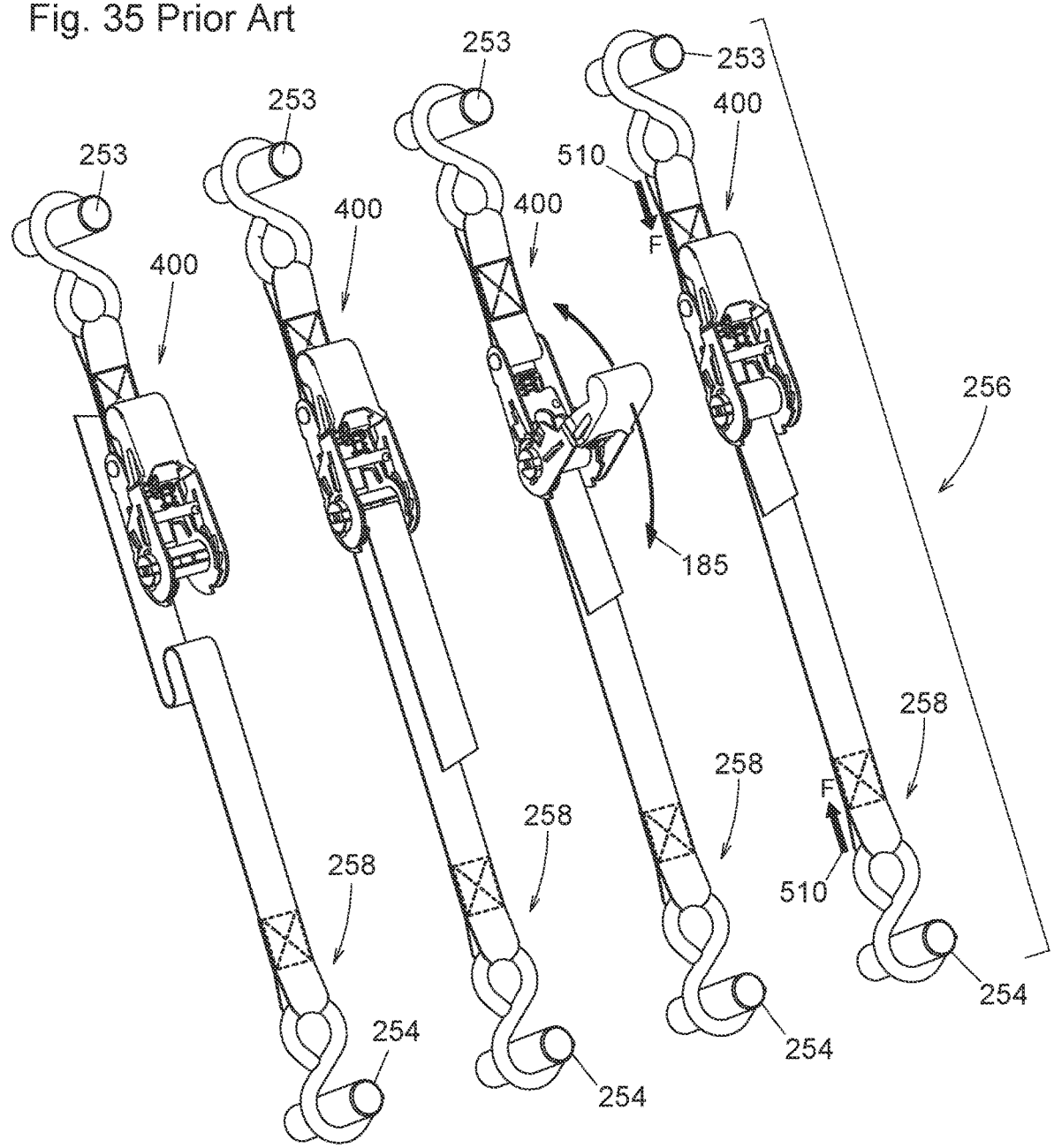
FIG. 35-38b show prior art ratchets.

FIG. 29a through FIG. 29f show the same sequence from FIG. 28 with the short strap removably securing a hook. This configuration closely matches the ratchet tensioning capacity and anchor configuration of current art devices (FIG. 35 Prior Art). However, in contrast to current art devices that are constrained to a single position, the tethered anchor provides additional versatility in allowing selective placement of the embodiment along the strap. By configuring a flat strap with a sewn loop at one end through and form a loop on one end of the Enhanced Ratchet 100 hooks can be used to provide tension via two hooks.

Figure 30A:
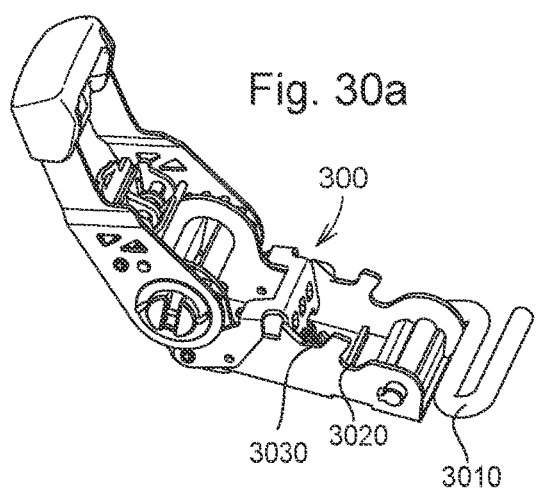
FIG. 30a and FIG. 30b show an alternative embodiment in both an open and webbing locked position where the capture-frame assembly of the Enhanced Ratchet of FIG. 1 is replaced with an 's-shaped' wire-form to lock the embodiment to the webbing.
Figure 30B:
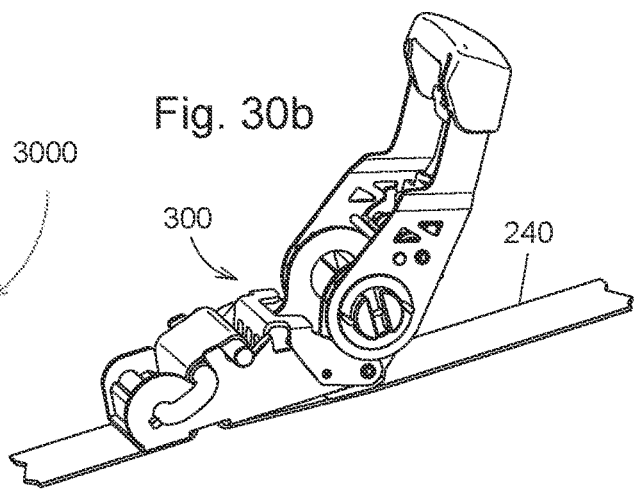

FIG. 30a and FIG. 30b show an alternative embodiment in both an open and webbing locked position where the capture-frame assembly of embodiment 100 is replaced with an 's-shaped' wire-form to lock the embodiment to the webbing. The capture-frame assembly of embodiment 100 is replaced with an alternative capture assembly 3000 with an 's-shaped' capture bar 3010 (or wire-form) to lock the embodiment to the webbing. In the embodiment shown wire-form 3000 is oriented to receive a flat strap (webbing— note that herein the terms webbing, flat strap, flat strap webbing may all be used to describe materials used with embodiments of the Enhanced Ratchet) and subsequently rotate into position with s-shaped capture bar 3010 bracing against first capture notch 3020 and second capture notch 3030 with an interference fit arrangement, providing securing of the s-shaped capture bar 3010. Additionally, when the flat strap is applied, tension on the flat strap will hold the s-shaped capture bar 3010 in the notches.

Figure 31A:
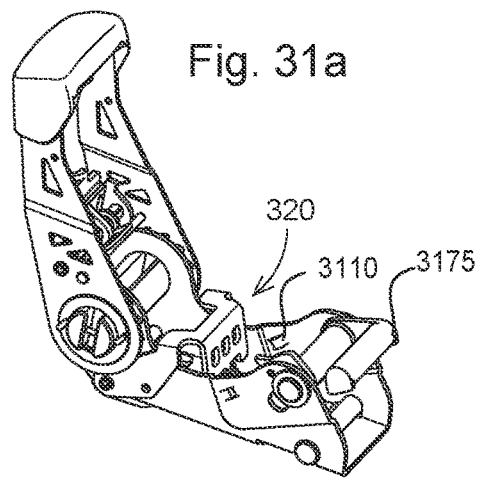
FIG. 31a and FIG. 31b show an alternative embodiment in both an open and webbing locked position where the capture-frame assembly of the Enhanced Ratchet of FIG. 1 is replaced with a die-cast component utilizing a separate capture ring and sidewall embossments to lock the embodiment to the webbing.
Figure 31B:
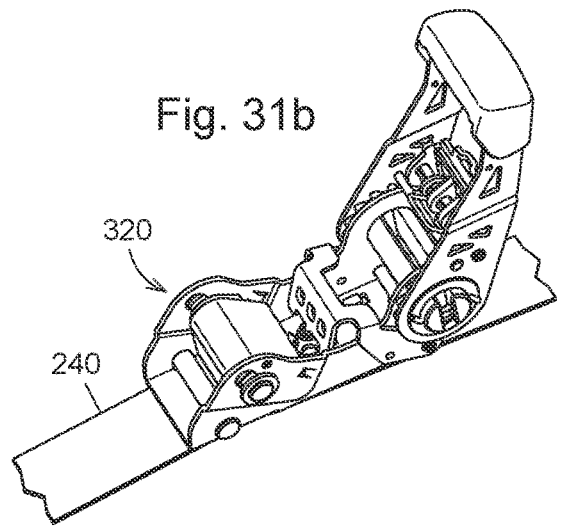
Figure 32A:
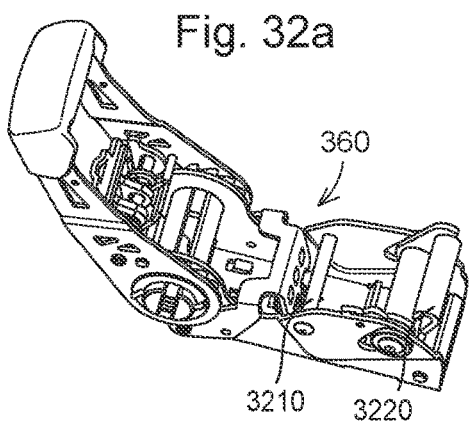
FIG. 32a and FIG. 32b show an alternative embodiment in both an open and webbing locked position where the capture-frame assembly of the Enhanced Ratchet of FIG. 1 is replaced with a formed sheet metal part utilizing a separate capture ring and cross bar to lock the embodiment to the webbing.
Figure 32B:
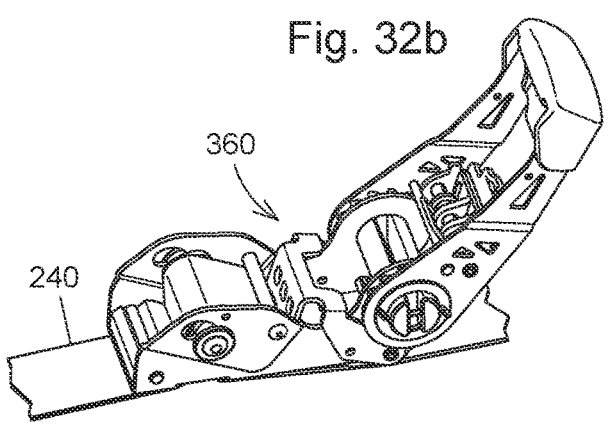

FIG. 31a and FIG. 31b show an alternative embodiment in both an open and webbing locked position where the capture-frame assembly of embodiment 100 is replaced with a die-cast component utilizing a separate capture ring and sidewall embossments 3110 to lock the embodiment to the webbing and hold floating post 3175 in place. FIG. 32a and FIG. 32b show an alternative embodiment in both an open and webbing locked position where the capture-frame assembly of embodiment 100 is replaced with a formed sheet metal part utilizing a separate capture ring 3220 and cross bar 3210 to lock the embodiment to the webbing.

Figure 33:
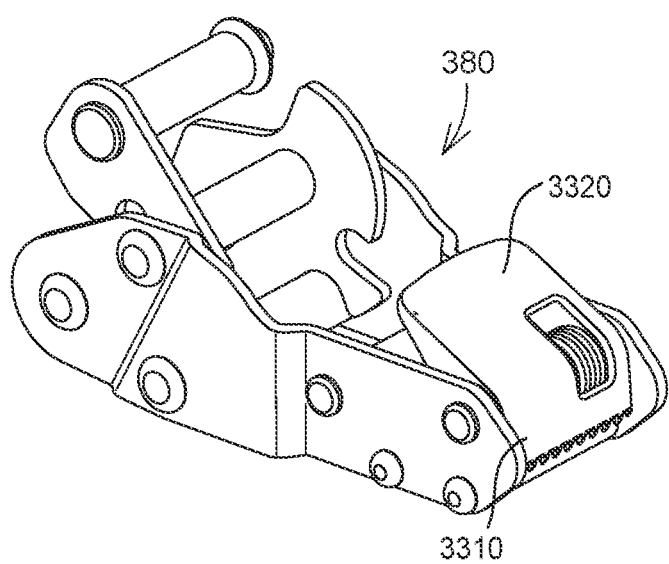
FIG. 33 shows an isometric view of an alternative embodiment that incorporates a camlock with the capture-frame assembly in lieu of the ratchet portion of Enhanced Ratchet.
Figure 34:
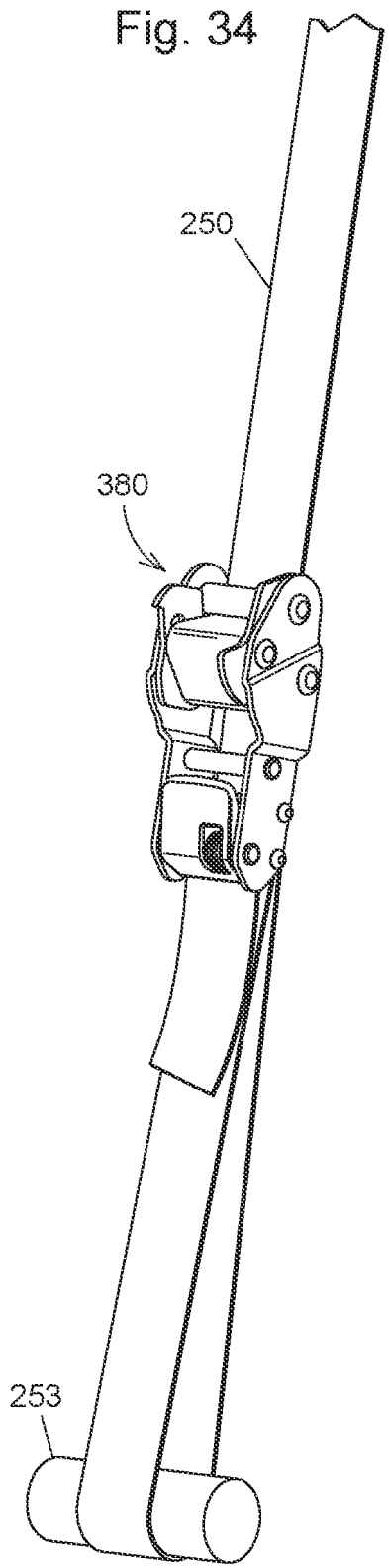
FIG. 34 shows an isometric view of the alternative embodiment from FIG. 33 configured with webbing to form a fixed-end configuration.

FIG. 33 shows an isometric view of an alternative embodiment that incorporates a camlock 3310 with the capture-frame assembly in lieu of the ratchet portion of Enhanced Ratchet. Camlock 3310 is a spring loaded camlock, where a pulling force on a flat strap away from the alternative embodiment of the Enhanced Ratchet causes the camlock 3310 to rotate and clamp. The camlock 3310 is releasable via press area 3320. FIG. 34 shows an isometric view of the alternative embodiment from FIG. 33 configured with webbing to form a fixed-end configuration.

Figure 39A:
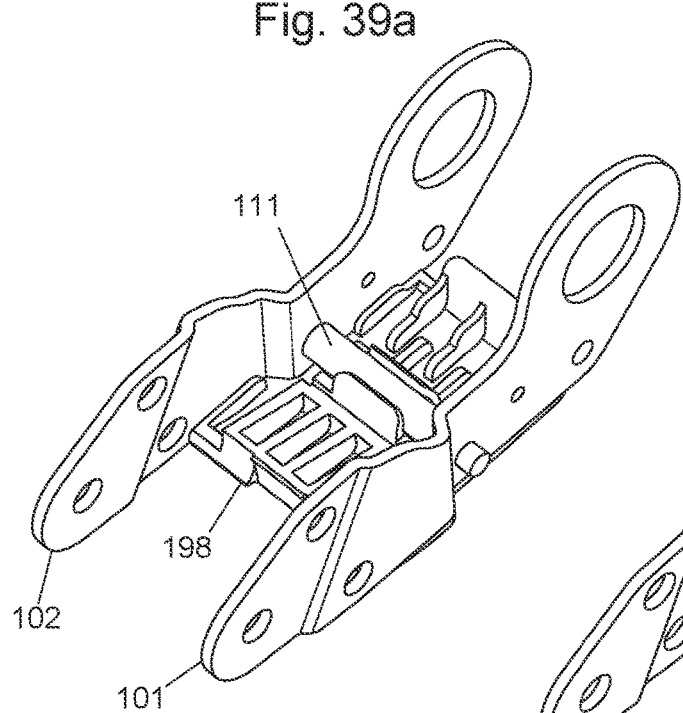
FIGS. 39a, 39b, and 40 show another embodiment of a chassis pivoting pawl bracket.
Figure 39B:
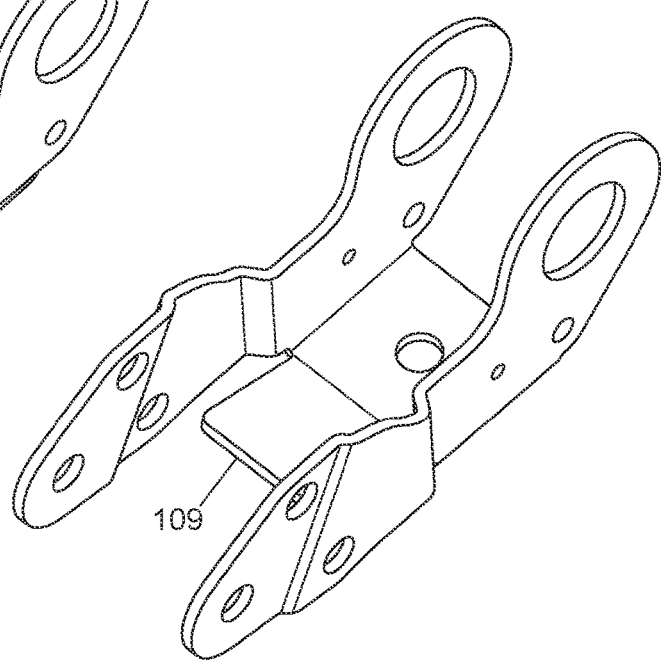
Figure 40:
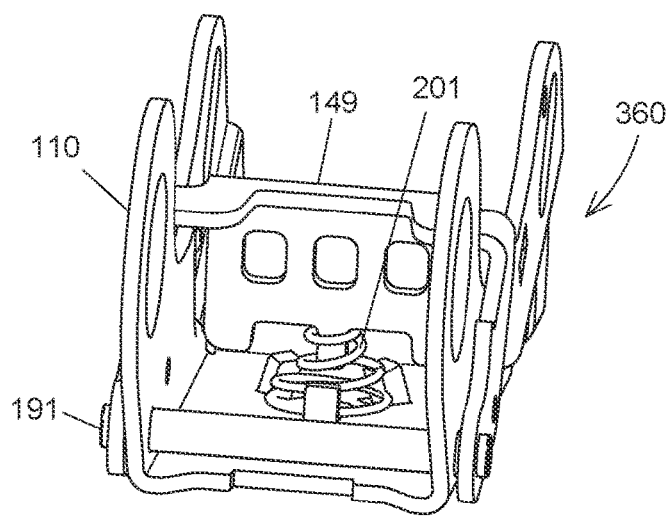

FIG. 39a shows chassis parts from previously shown Enhanced Ratchet 100. FIG. 39b shows possible replacement of existing chassis parts from Enhanced Ratchet 100 with a single chassis part 109. FIG. 40 shows chassis 110, chassis pawl bracket 149, and chassis pawl bracket pivot pin 11, the coil spring 201 from alternative chassis configuration 360. This configuration provides for a different way to connect the sides of the chassis.

In one embodiment, Enhanced Ratchet 100 contains a chassis sidewall A 101, a chassis sidewall B 102, held parallel affixed to each other by means of swaged lower shoulder pins 111 and 112, a lever 121, two ratchet wheels 131, the ratchet wheels containing a plurality of teeth 132 located peripherally and having a center cross member 138, two hub crossbars 134 having a semi-circular shape in cross section, two shim washers 196, two wire-form locks 197, a chassis pivoting pawl bracket 141 attached to the chassis sidewalls by means of a swaged pivot pin 191, a lever pivoting pawl bracket 151 attached to the lever by means of a swaged pivot pin 192, and a capture-frame assembly 170, consisting of two side-plates, A 171 and B 172 (including curved area 1172, for guiding shoulder pin 173), a swaged center shoulder pin 173, and a swaged lower shoulder pin 113, together securing side-plate A to chassis sidewall A and side-plate B to chassis sidewall B respectively. In some places, pin 173 is referred to as a second pin. Additionally, to side-plate A is swaged a free-standing post 175. In some descriptions herein, free-standing post 175 may be referred to as a third pin. These aspects are shown in FIGS. 1, 2a, 2b, 3. It is important to note that all of these aspects are exemplary and may be arranged differently with different parts (or omitted parts) as will occur to one of ordinary skill in the art. For example, in alternatives, the ratchet wheels may not be identical; different teeth may be utilized on each one or different size wheels may be utilized, in most cases the wheels interface in a useful way with the teeth and the brackets carrying the teeth.

Side-plate A contains a slotted opening 176 allowing both rotational and translational displacement of the side-plate about the centered swaged shoulder pin 173. Side-plate B is rigidly secured to chassis sidewall B by means of the centered swaged shoulder pin 173 and one of the swaged lower shoulder pins 113. Side-plate B contains an open slot 177 along an edge of the plate and an arm support 169.

A torsion spring 194 positionally biases the chassis pivoting pawl bracket 141 to maintain contact with perimeter edge faces 139 of the ratchet wheels 131. A torsion spring 195 positionally biases the lever pivoting pawl bracket 151 to maintain contact with perimeter edge faces 139 of the ratchet wheels 131. A swaged pivot pin 191 provides attachment and pivot means for the chassis pivoting pawl bracket 141. A swaged pivot pin 192 provides attachment and pivot means for the lever pivoting pawl bracket 151. An additional pin 193, serves as a hard stop for the lever pivoting pawl bracket 151 and as a spring stop for the spring 195 that positionally biases the lever pivoting pawl bracket. Additionally, a liner 161 resides under the lever pivoting pawl bracket 151, constrained by the lever pivoting pawl bracket and the pin 192 that secures the lever pivoting pawl bracket to the lever 121. The liner 161 centers the spring 195 along the pivot pin 192, side-to-side, within the lever pivoting pawl bracket sidewalls 152. A handle 129 permanently attaches to the free end of the lever 121. FIGS. 1, 2a, 2b, 3. Note that in these descriptions, the chassis pivoting pawl bracket 141 and the lever pivoting pawl bracket 151 are described as pivoting brackets. In many cases a pivoting bracket may be an effective technique for the Enhanced Ratchet. However, it is not necessary in all cases that these pivoting brackets be such. To achieve the function for many forms of operation of the Enhanced Ratchet, it is necessary to pivot the teeth on each side of the Enhanced Ratchet, from a position that engages the wheel, to a position that does not engage the wheel. When ratcheting to provide tension, the teeth on one side of the ratchet slip over the teeth of the wheel while on the other side of the ratchet the teeth hold position. Then the operation flips, once the lever arms are extended apart, whereby the teeth on the other side of the ratchet slip over the teeth of the wheel while on the first side of the ratchet the teeth hold position. Therefore, the mechanism carrying the teeth need not absolutely be a rotating bracket, but simply a structure that allows the teeth of each side of the ratchet to rotate in and out of engagement from the wheel. In many configurations, it is useful to have two sets of teeth that move in unison, however, various configurations of teeth and wheels may be used, including but not limited to varying the number of teeth, the size of teeth, the number of wheels, and the size of wheels.

Additionally, a webbing guide 199 and a bottom shield 198 snap-fit between selected swaged shoulder pins to aid in directing webbing through the embodiment. FIGS. 1, 2a, 2b, 3.

The chassis pivoting pawl bracket 141 is secured to the chassis sidewalls A and B 101, 102 by means of a pivot pin 191 end swaged or press-fit or into a circular opening 144 in each of the chassis pivoting pawl bracket sidewalls 142 and extending through a circular opening 103 in each of the chassis sidewalls A and B 101, 102. The pivot action of the chassis pivoting pawl bracket is actuated by a compressed torsion spring 194, positioned on the swaged pivot pin 191, with the spring legs pressing against a swaged lower shoulder pin 111, and the spring center section pressing against the bottom of the chassis pivoting pawl bracket 141. Within the confines bounded by the ratchet wheels 131 and the chassis sidewalls A and B 101, 102, the chassis pivoting pawl bracket 141 is free to rotate in either direction 187. FIGS. 1, 2a, 2b, 3.

Constrained within the chassis is a capture-frame assembly 170. The capture-frame assembly consists of two side plates, A 171 and B 172, a swaged center shoulder pin 173 movably securing side-plate A through a slot opening 176 in side-plate A to chassis sidewall A 101, and rigidly securing side-plate B through circular opening 179 in side-plate B to chassis sidewall B 102. A swaged lower shoulder pin 113 also rigidly secures side-plate B through a circular opening 174 in side-plate B to chassis sidewall B. Circular openings 107, 108 in each chassis sidewall A and B, positionally locate the swaged shoulder pins. Additionally, a free-standing post 175 is permanently affixed to side-plate A through a circular opening 178 in the side-plate. FIGS. 1, 2a, 2b, 3.

Figure 11A:
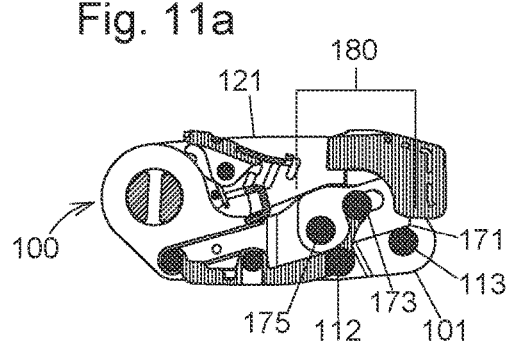
FIG. 11a through FIG. 11d show the capture-frame assembly in four unique positions; locked, unlocked, open, and non-restrained, respectively.

When side-plate A 171 resides in a forward position with respect to the chassis sidewalls A and B, side-plate A rests on top of the swaged lower shoulder pin 113. The swaged lower shoulder pin prevents rotation of side-plate A whenever side-plate A remains in this position. Concurrent with the swaged lower shoulder pin preventing rotation of side-plate A, a slot opening 177 in side-plate B constrains the free end of the free-standing post 175 swaged to side-plate A, providing mechanical support to and preventing forward movement of the free-standing post. This particular configuration of the components comprising the capture-frame assembly 170 would be considered a closed or locked position 180 of the capture-frame assembly (FIG. 11a).

Figure 11B:
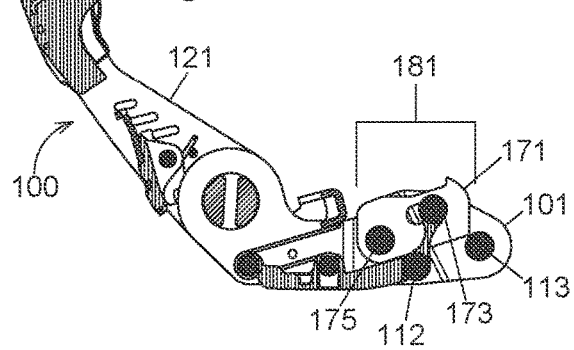

When side-plate A 171 resides in a rearward position with respect to the chassis sidewalls A and B, the bottom edge of the side plate is disengaged from the swaged lower shoulder pin 113, thus permitting rotation of side-plate A. Concurrent with side-plate A disengaging from the swaged shoulder pin, the free-standing post 175 swaged to side-plate A disengages from the slotted opening 177 in side-plate B. This particular configuration of the components comprising the capture-frame assembly would be considered an unlocked position 181 of the capture-frame assembly (FIG. 11b).

In this rearward position, side-plate A, movably secured to the chassis sidewall A by means of the swaged center shoulder pin 173, is free to rotate about the swaged pin through a displacement approximating 180 degrees.

Figure 11C:
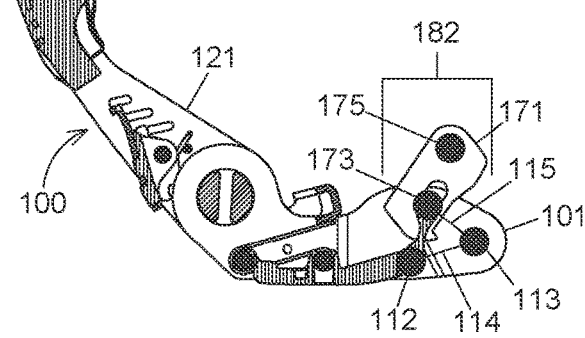

When, from the unlocked position 181, side-plate A 171 is rotated 168 approximately 140 degrees, webbing can be inserted through the gap 114 formed between the two forward positioned swaged lower shoulder pins 112, 113, then through gap 115 formed between one of two swaged lower shoulder pins 113 and subsequently positioned around the free-standing post 175 swaged to side-plate A. This particular configuration of the components comprising the capture-frame assembly would be considered an open position 182 of the capture-frame assembly (FIG. 11c, FIG. 12c).

Figure 11D:
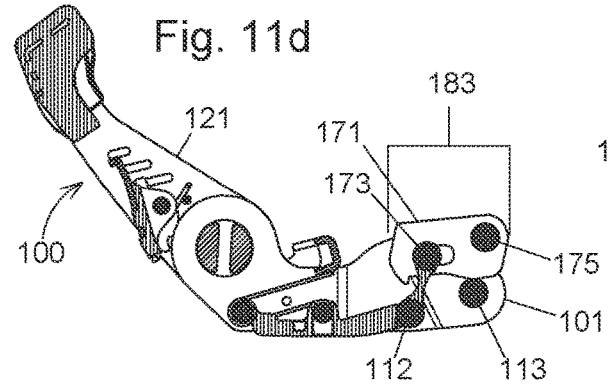

When side-plate A 171 is rotated 168 further to approximately 200 degrees, Enhanced Ratchet can now move in either direction 184 along the length of webbing configured in the embodiment, the webbing freely moving around the free-standing post 175 swaged to side-plate A. This particular configuration of the components comprising the capture-frame assembly would be considered a non-restrained position 183 of the capture-frame assembly (FIG. 11d, FIG. 12d).

Figure 12A:
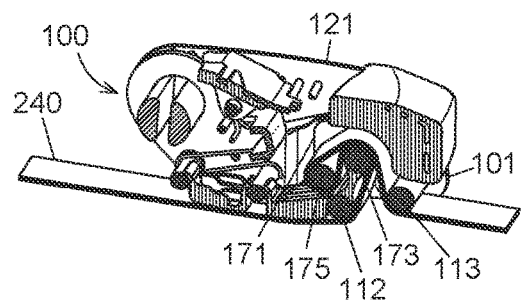
FIG. 12a through FIG. 12d repeats FIG. 11a through FIG. 11d shown as isometric views with the addition of a single layer of web.

After webbing has been configured in the capture-frame assembly 170, per the proceeding descriptions (FIG. 12c, FIG. 12d), Enhanced Ratchet 100 can be positionally constrained on the webbing configured in Enhanced Ratchet by moving the capture-frame assembly to a locked position 180 (FIG. 12a). This involves drawing side plate A 171 in a direction 188 away from Enhanced Ratchet until the slot opening 176 in side-plate A stops against the swaged center shoulder pin 173, then rotating 168 side-plate A about the swaged center shoulder pin in a direction towards the ratchet end of Enhanced Ratchet. The free-standing post 175 swaged to side-plate A will stop the rotation of side-plate A when it makes contact with the extended arm 169 on side-plate B 172. At this point, side-plate A is then slid toward the front of Enhanced Ratchet, in a direction away from the ratchet end of Enhanced Ratchet, until the slot 176 in side-plate A once again is stopped by the swaged center shoulder pin 173. With the side plate A 171 slid to the end 1176 of the slotted opening, the flat straps are locked in place. Concurrent with this action, the free-standing post 175 swaged to side-plate A will stop against the end of the open slot 177 in side-plate B 172. The action of moving the capture-frame assembly to a locked position 180 is aided by the arm support 169 extending outward from the open slot 177 on side-plate B. The arm support acts as a physical stop to the free-standing post 175 swaged to side-plate A 171. This stop limits the rotational travel of side-plate A.

Note that in the locked or near-locked position, any tension subsequently induced in the webbing configured in Enhanced Ratchet, will further induce the capture-frame assembly 170 to move to, and/or be held against hard stops. These hard stops being the free-standing post swaged to side-plate A stopped against the end of the slot in side-plate B, the end of the slot in side-plate A stopped against the swaged center shoulder pin. (FIG. 12a, FIG. 15a through FIG. 15f).

Figure 12B:
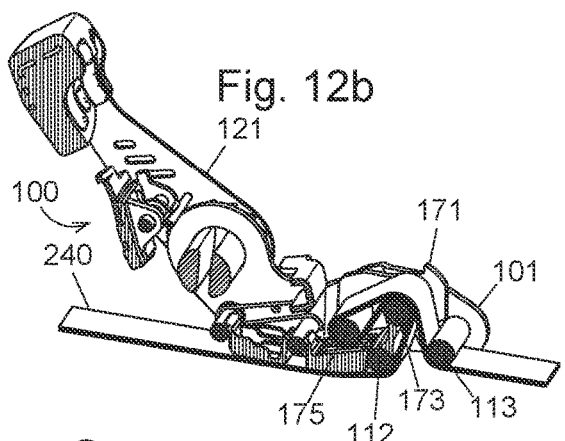
Figure 12C:
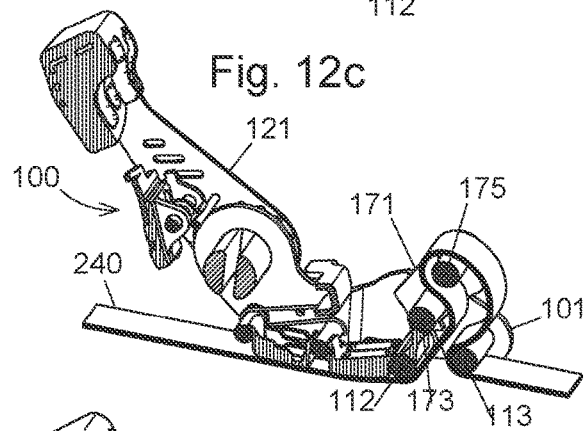
Figure 12D:
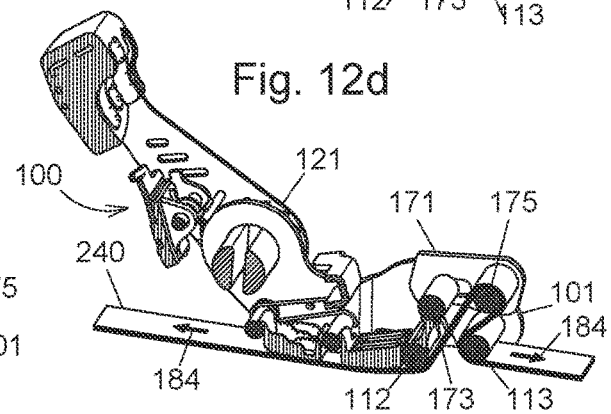

With webbing configured in Enhanced Ratchet, and side-plate A residing in a locked position 180 (FIG. 12a), movement of Enhanced Ratchet along the webbing in the direction indicated by the arrow 284 (FIG. 13, FIG. 16g is prevented. Tension induced in the webbing by means of the ratcheting action will constrain the capture-frame assembly 170 to the locked position, thus preventing inadvertent or intentional attempts to move side-plate A to an unlocked 181 position (FIG. 11b, FIG. 12b). Unless tension is released from webbing configured in Enhanced Ratchet, the capture-frame assembly cannot be moved to an unlocked position 181 or to an open position 182 (FIG. 11c, FIG. 12c). Note that in many embodiments, some of which are shown herein, alternative structures may be substituted for capture-frame assembly 170. Moreover, capture-frame assembly can be deployed outside of the context of ratcheting devices, in any scenario where it is desirable to hold flat strap webbing.

The lever 121 is rotatably secured to the chassis sidewalls A and B 101, 102 by means of two hub crossbars 134 extending through opposing openings 123 in the lever sidewalls 122 and opposing openings 105 in the chassis sidewalls A and B 101, 102. The lever sidewalls overlap the chassis sidewalls A and B positioning both chassis sidewalls inward with respect to the lever sidewalls 122. The two hub crossbars 134 also constrain two ratchet wheels 131, each ratchet wheel positioned on an opposing end of a hub crossbar by means of two centrally located openings 133 in the ratchet wheel 131. The hub crossbars 134 are positionally separated from each other by means of a center cross member 138 on the ratchet wheel 131. Each ratchet wheel 131 is positioned internal to the lever sidewalls and external to the chassis sidewall A and chassis sidewall B, respectively. FIGS. 1, 2a, 2b, 3.

The lever 121, the two hub crossbars 134, and the two ratchet wheels 131, are secured positionally to one another and to the chassis sidewalls A and B 101, 102 by means of two shim washers 196 and two wire-form locks 197. The shim washers 196 are positioned over opposing ends of both hub crossbars 134, next to exterior surfaces of each of the lever sidewalls 122. The wire-form locks 197 are then positioned through a traverse opening 135 located in each end of the hub crossbars 134 and subsequently deformed to prevent dislodgement from the hub crossbars. FIGS. 1, 2a, 2b, 3.

The grouping comprised of the two hub crossbars 134, the two ratchets wheels 131, and the two wire-form locks 197, while concurrently held within the confines of sidewall openings 123 of the lever 121, and sidewall openings 105 of the chassis sidewalls A and B 101, 102, form a singular unit that is free to rotate in either direction 189 about the long axes of the hub crossbars 136. The lever 121 also rotates in either direction 185 about the long axes 136 of the hub cross bars. FIGS. 1, 2*a*, 2*b*, 3.

A lever handle 129 is permanently affixed to the end of the lever 121 opposite the end secured to the chassis sidewalls A and B 101, 102. The lever pivoting pawl bracket 151 is rotatably secured to the lever 121, by means of a pivot pin 192 end swaged or press-fit into a circular opening 125 in each lever sidewall 122 and extending through a circular opening 154 in each lever pivoting pawl bracket sidewall 152. Residing directly underneath the lever pivoting pawl bracket is a liner 161. Raised areas 165, 166 on the top surface of the liner 161 positionally locate the liner by means of a complimentary opening 159, and an opening along the edge 158, located in the top surface of the lever pivoting pawl bracket 151. The liner 161 is also constrained by the pivot pin 192 by means of a circular opening 163 located in each of two standing supports 162 residing on the underside of the liner. The raised areas 165, 166 on the liner 161, extending through the top surface of the lever pivoting pawl bracket 151, also serve as visual indicators in positioning the lever pivoting pawl bracket to initiate webbing tension release. A torsion spring 195 fits over the pivot pin 192 and is centered on the pin by the standing supports 162 of the liner 161. The legs of the torsion spring press against the underside surface of the liner. A pin 193, permanently affixed to the lever 121 through an opening 124 in each of the two lever sidewalls 122, serves as a hard stop for the center portion of the torsion spring 195. The torsion spring biases a tooth detail 153, residing on each lever pivoting pawl bracket sidewall 152, to contact the perimeter edge faces 139 on the two ratchet wheels 131. The pin 193 also serves as a hard stop for the lever pivoting pawl bracket 151, limiting rotational travel available to the pawl bracket and positioning the lever pivoting pawl bracket rotationally to enable subsequent engagement with the chassis pivoting pawl bracket 141. This engagement between the two pawl brackets is required to initiate the release of tension from webbing configured in Enhanced Ratchet 100. Within the limits determined by the ratchet wheels 131 and the hard stop set by pin 193, the lever pivoting pawl bracket 151 is free to rotate in either direction 186. FIGS. 1, 2*a*, 2*b*, 3.

Positioning the chassis pawl bracket pivot pin 191 below the hub crossbars 134 by means of a circular opening 103 in each of the chassis sidewalls A and B 101, 102, assures the necessary force required to disengage the chassis pivoting pawl bracket 141 from the ratchet wheels 131 at high webbing tensions is easily attainable. This affords a significant advantage during webbing tension release resulting in an easily manageable angular separation between the lever 121 and chassis sidewalls A and B 101, 102. FIG. 7*a* through FIG. 10*b*.

Finally, with Enhanced Ratchet 100 in a closed position (FIG. 1), a wire or rigid pin of sufficient length 119 could be inserted through aligned openings 118 in the chassis pivoting pawl bracket sidewalls 142 and openings 117 in the chassis sidewalls A and B 101, 102 to prevent movement of the chassis pivoting pawl bracket 141 with respect to the chassis sidewalls A and B. This serves as a means to lock the ratchet wheels 131, preventing inadvertent tension release or unwanted tampering of a ratchet tensioned configuration.

In many embodiments, chassis sidewall A, chassis sidewall B, lever, ratchet wheels, side-plate A, side-plate B, chassis pivoting pawl bracket, and the lever pivoting pawl bracket are parts that could be fabricated from metal sheet, die stamped, and subsequently formed using conventional tooling practices. Various steel alloys and tempers could be utilized, depending on cost and performance parameters determined appropriate for any given embodiment size. Enhanced Ratchet 100 depicted herein is intended to utilize 1-inch wide webbing materials. However, Enhanced Ratchet could be scaled larger or smaller to accommodate other webbing sizes and other loading requirements.

The lever handle 129, liner, and bottom shield would appropriately be fabricated from molded thermoplastic materials. For the lever handle, tooling to produce an insert mold to encapsulate the end of the lever would be a feasible means to produce a highly durable and cost-effective part. The webbing guide could be fabricated by means of inexpensive extrusion tooling and cut to length.

In many embodiments, the two torsion springs 194, 195 are commonly manufactured components and could be fabricated from either tempered music wire or stainless-steel wire.

In many embodiments, swaged shoulder pins, free-standing post, the swaged-end pivot pins, and pins stops could be machined or forged from various steel alloys and tempers. The intention here would be to swage the ends on each shoulder pin after assembling the various components. Fixtures or tooling jigs could be utilized in positioning the parts to aid in the swaging operation. Not shown, but easily accomplished would be to replace the single piece swaged shoulder pins with two-piece arrangements, a non-shouldered straight shafted pin slid into a secondary hollow sleeve. Various options exist for both material selections and fabrication techniques.

Additionally, the pivot pins 191, 192 depicted in Enhanced Ratchet could be roll pins, the ends of which could be flared after assembly to prevent dislodgement during field use. This would be appropriate for embodiments targeted for use at higher webbing tensions utilizing lower cost materials. Flaring the ends on the roll pins would accommodate a degree of hole distortion in the mating parts, where holes in both the lever sidewalls and the chassis pivot pawl bracket sidewalls could possibly deform under higher loading. This would also be appropriate if lower cost metal alloys were utilized in the fabrication of the lever and the pivoting pawl brackets.

Operation of Specific Embodiments

FIG. 6, FIG. 17. When the lever 121 of Enhanced Ratchet 100 is rotated 185 with respect to the chassis sidewalls A and B 101, 102, in a direction increasing the angular separation between the lever and the chassis sidewalls A and B, the lever pivoting pawl bracket 151 secured to the lever engages a tooth 132 on each of the two ratchet wheels 131, causing the ratchet wheels and the hub crossbars 134 to rotate as a unit within a circular opening 105 in each chassis sidewall A and B. The chassis pivoting pawl bracket 141, secured to the chassis sidewalls A and B, pivots back and forth following the toothed profile of the rotating ratchet wheels 131. When the direction of the lever rotation 185 is reversed, the chassis pivoting pawl bracket 141 now engages a singular tooth 132 on each of the two ratchet wheels 131, preventing rotation of the ratchet wheels 131 and the hub crossbars 134, while the lever pivoting pawl bracket 151, secured to the lever 121, pivots back and forth, free to follow the respective edge profiles on the two stationary ratchet wheels 131. The rotation of the lever 121 in alternating directions 185 results in a ratcheting action where both ratchet wheels 131 and both hub crossbars 134 rotate in a singular direction, as a singular unit.

The presence and orientation of the torsion spring 194 attached to the chassis pawl pivot pin 191, and the torsion spring 195 attached to lever pawl pivot pin 192 secured to the lever 121, provide motive forces to bias the tooth detail 153 on the chassis pivoting pawl bracket, and the tooth detail 143 on the lever pivoting pawl bracket 151, to maintain continual contact with the edge faces 139 along the toothed profile of the ratchet wheels 131. FIG. 2*a*, FIG. 2*b*, FIG. 3, FIG. 6.

As shown in FIG. 11*a* through FIG. 16*g*, the capture-frame assembly 170 is used to removably attach Enhanced Ratchet 100, in a securely fixed position, anywhere along a length of webbing 240. To attach Enhanced Ratchet 100 to the webbing, the lever 121 is first rotated to an open position, followed by sliding and rotating the capture-frame assembly 170 to an open position 182 (FIG. 2*a*, FIG. 11*c*).

A short section of the webbing 240 is folded over onto itself and inserted into the bottom of Enhanced Ratchet 100 through the gap 114 between the two forward positioned swaged lower shoulder pins 112, 113. In some places, pin 113 is referred to as a first pin and pin 112 is referred to as fourth pin. The webbing guide 199 will direct the end of the folded over webbing upwards to then pass through a second gap 115 between the forward positioned swaged lower shoulder pin 113 and the swaged center shoulder pin 173. In some places herein, gap 115 which is also an aperture and may be referred to as a first gap. The user then directs the folded section of webbing to pass under the free-standing post 175 swaged to side-plate A 171, currently residing in an open position 182. The end loop formed in the folded section of webbing is then positioned around the end of the free-standing post 175. Returning the capture frame assembly, now constraining the end loop of the folded section of webbing, to a locked position 180 secures and positionally locks Enhanced Ratchet 100 onto the section of webbing 240 (FIG. 2*b*, FIG. 12*a*-*c*, FIG. 15*a*-*h*, FIG. 16*a*-*g*).

When webbing is configured in the capture frame assembly 170 of Enhanced Ratchet 100, and the capture frame assembly resides in a locked position 180, and an overlying section of webbing 242 is stressed to a greater tensile state than an underlying section of webbing 241, movement of the embodiment along the webbing in the direction indicated by the arrow 284 is prevented (FIG. 13, FIG. 14*a*, FIG. 14*b*, FIG. 15*h*, FIG. 16*g*).

After affixing Enhanced Ratchet 100 to a section of webbing 240, slack in the webbing can be removed by pulling excess webbing back through the two swaged lower shoulder pins 112, 113. The smooth cylindrical shape of each of the swaged lower shoulder pins protects the webbing, preventing damage to the webbing as tension in the webbing is increased by means of the ratcheting action (FIG. 2*b*).

To remove Enhanced Ratchet 100 from the webbing 240, the attachment process shown in FIG. 15*a* through 15*f* and FIG. 16*a* through 16*g* is reversed. In many scenarios, like at least a portion of those about, tension in the webbing must be released (FIG. 18*a* through 18*e*) prior to detaching Enhanced Ratchet from the webbing.

One method of inducing ratchet tension into a strap 251 involves attaching Enhanced Ratchet 100 to the strap by means of the capture-frame assembly 170. The strap, spanning a fixed distance between two anchor locations, has one end securely attached to one anchor location 253, the other end routed around the second anchor location 254 and back to Enhanced Ratchet 100. That end of the strap is subsequently constrained and tensioned by means of the ratchet portion of Enhanced Ratchet 100 (FIG. 19).

Another method of inducing tension into a strap 252 involves attaching Enhanced Ratchet 100 to the strap by means of the capture-frame assembly 170. One end of that strap is secured to an anchor location 253. A second strap 258, having one end attached to a second anchor location 254, is subsequently constrained and tensioned by means of the ratchet portion of Enhanced Ratchet 100 secured to the first strap 252 (FIG. 23).

In either method, the ratchet portion of Enhanced Ratchet 100 is utilized to induce tension into the strap.

To utilize the ratcheting means of Enhanced Ratchet 100, the strap in many scenarios may be initially introduced into the ratchet portion of the embodiment. The end, or a folded over section of the strap 250, is inserted through the gap 137 between the two hub crossbars 134 on Enhanced Ratchet 100 (FIG. 17*a*). The webbing is then drawn through the gap until all the slack is removed from the strap (FIG. 17*b*). Subsequent rotation of the lever 121 in alternating directions 185 will cause the hub cross bars 134 to rotate in a singular direction, winding the webbing onto the hub crossbars (FIG. 17*c*). As the webbing is wound onto the hub crossbars, newly wound webbing will overlap the underlying webbing layer, securing the webbing to the hub crossbars. Rotation of the lever in alternating directions is continued until the desired level of tension is achieved (FIG. 17*a*-17*d*).

Engagement of the singular tooth 143 on each sidewall 142 of the chassis pivoting pawl bracket 141 with a singular tooth 132 on each ratchet wheel 131 preserves the tension induced in the strap and prevents the hub crossbars 134 and ratchet wheels 131 from rotating in a direction that would release the tension from the strap and the strap from Enhanced Ratchet 100 (FIG. 6).

The ratcheting action is similar to current art ratchet devices, in that a lever 121 on the ratchet device is rotated in alternating directions 185 to induce strap tension. Also, in similar fashion to the blade ends on the sliding brackets in current art ratchet devices, the individual tooth elements 143, 153 on the pivoting pawl brackets 141, 151 engage singular teeth 132 located on the perimeter of the ratchet wheels 131 (FIG. 6). When the lever is rotated, this engagement of teeth 153 on the lever pivoting pawl bracket 151 with teeth on the ratchet wheels 132, induces rotation 189 to the hub crossbars 134 and ratchet wheels 131. And by means of teeth 153 on chassis pivoting pawl bracket, prevents rotation in the reverse direction of the hub crossbars 134 and ratchet wheels 131. FIG. 6, FIG. 17.

The length of the lever 121 provides a mechanical advantage that enables a significant amount of tension to be induced in the strap as the lever is rotated. Upon completion of the tension inducing ratchet action, the lever 121 is rotated back to a closed position (FIG. 17*d*). An embossment 128 on side-plate B 172 engages a complimentary recess 127 molded into the underside of the lever handle 129, to releasably secure the lever in the closed position (FIG. 2*a*).

Several advantages arise through the use of the pivoting pawl brackets 141, 151. In terms of component durability and integrity of tooth engagement, the pivoting pawl brackets 141, 151 afford advantages unavailable to inferior sliding brackets of current art devices. Two of these advantages are minimal part distortion and minimal part misalignment. These advantages arise from the combined synergism of the pivot pins 191, 192, folds in the pivoting pawl bracket sidewalls 142, 152, and close physical proximity of the load bearing components involved (FIG. 6).

Folds along the sidewalls and along the outward facing surfaces of the pivoting pawl brackets 141, 151 create stiffness at locations where the highest stresses in the pawl brackets are encountered. And even though folds, from a manufacturing perspective, are sometimes considered a tolerance liability, the folds in both pivoting pawl brackets 141, 151 do not lie in the tolerance path from the bracket pivot pin locations 103, 124 to the contact areas between the pivoting pawl bracket teeth and the ratchet wheel teeth. For both the ratchet wheels 131 and the pivoting pawl brackets 141, 151, the tolerance stack-ups arise from stamped-hole to stamped-edge geometries; the most economical and easily attainable tolerance controls available to manufacturers. The folds in the pivoting pawl brackets 141, 151 add strength and stiffness without incurring tolerance liability. Additionally, as the pivoting pawl brackets 141, 151 wear, there is less risk of destroying the means for tension release as is possible in current art.

In current art devices, wear to either the eccentric shaped end of the lever, or actual cuts induced in the blade ends through repeated tension release at or near the rated working load of the ratchet device, will eventually limit the travel of the sliding chassis bracket such that disengagement of the sliding bracket from the ratchet wheel teeth is no longer possible. In Enhanced Ratchet 100 described herein, wear to either the ratchet wheel teeth or to the chassis pivoting pawl bracket will only result in those components moving closer to each other before the initiation of tension release.

As previously described, sliding brackets in a current art ratchet device can pivot somewhat about their spring constraints, which are typically located a comparatively large distance away from the engagement interface at the load bearing blade ends. This exacerbates both the misalignment potential and the damage potential for the load bearing blade ends on the sliding brackets.

The pivoting pawl brackets 141, 151 on the other hand, are significantly constrained from extraneous movement. The pivot pins 191, 192 are in close proximity to where the load bearing tooth engagements occur, significantly diminishing any potential for damage arising from misalignment between the load bearing teeth 132, 143, 153 (FIG. 6).

Secondly, the pivot pin 191 securing the chassis pivoting pawl bracket 141 to the chassis sidewalls A and B 101, 102 ensures that the contact engagement between the ratchet wheel teeth 132, and each tooth 143 on opposing sidewalls 142 of the chassis pivoting pawl bracket 141 occur simultaneously. Thus, load imbalances are virtually eliminated. Contrast this with current art ratchet devices where damage prone load imbalances are prevalent between the ratchet wheel teeth and the sliding bracket blade ends. This holds true for the lever 121, the lever pivot pin 192, and the lever pivoting pawl bracket 151 as well.

Finally, side-to-side movement of the pivoting pawl brackets 141, 151 is confined between the sidewalls of the lever 122 and the chassis sidewalls A and B 101, 102. The ratchet wheels 131 are to be fabricated from material having a thickness greater than that used for the pivoting pawl brackets 141, 151. This ensures the tooth detail 143, 153 on each pivoting pawl bracket sidewall 142, 152 will make reliable contact with the ratchet wheel teeth 132. Such an arrangement allows fold tolerance issues arising from the manufacture of the pivoting pawl brackets 141, 151 to be easily accommodated.

The ratcheting action employed by Enhanced Ratchet 100 is used to induce tension into webbing. The webbing 250, 251, while confined within the embodiment, is also in some fashion secured to, or around, anchor locations a distance away from the embodiment. As previously mentioned, a typical current art ratchet device, in a fixed-end configuration 256, has one of two straps used in the configuration permanently affixed to the device. Securing the webbing to an anchor location, by default, means securing the ratchet device to the same anchor location. Enhanced Ratchet 100 is not permanently affixed to the straps used in the configuration, and as such, provides a much-varied means for positioning the embodiment on a strap and configuring straps lengths for subsequent tensioning (FIG. 19 through FIG. 29).

FIG. 18 shows a sequence of isometric views depicting a step-wise progression for releasing tension from webbing 250 configured in Enhanced Ratchet 100. Rotating the lever pivoting pawl bracket 151, using a thumb on the thumb edge 164 (FIG. 3), while moving the lever 121 towards an open position (FIG. 5), allows the tab 155 and semi-pierced embossment 156 on the backend of the lever pivoting pawl bracket 151 to be rotated to a position to engage the cutout 147 located on the top surface of the chassis pivoting pawl bracket 141. Slightly reversing the rotation direction of the lever 121 will allow the tab 155 and semi-pierced embossment 156 on the lever pivoting pawl bracket 151 to fully engage the cutout 147 in the chassis pivoting pawl bracket 141. Releasing the thumb from the lever pivoting pawl bracket 151 permits the spring-biased lever pivoting pawl bracket 151 to seat against the relief edge 148 on the cutout 147 of the chassis pivot pawl bracket 141. At this point the two pivoting pawl brackets 141, 151 are interlocked by means of a tab-in-slot arrangement (FIGS. 7a, 7b and FIGS. 9a, 9b).

Actual tension release now occurs by drawing the lever 121 and chassis sidewalls A and B 101, 102 together. With the lever pivoting pawl bracket 151 engaged with chassis pivoting pawl bracket 141 as described above, movement of the lever towards the chassis sidewalls A and B will cause the lever pivoting pawl bracket 141 to move the chassis pivoting pawl bracket 151 away from the ratchet wheels 131, disengaging the tooth on each chassis pivoting pawl bracket sidewall 143 from the engaged tooth 132 on each ratchet wheel 131 (FIG. 10a, FIG. 10b).

With the lever pivoting pawl bracket 151 having previously been disengaged from the ratchet wheels 131 (FIG. 5, FIG. 9b) and now with the chassis pivoting pawl bracket 141 disengaged from the ratchet wheels 131, no means remain to prevent rotational movement of the hub crossbars 134 and the ratchet wheels 131 (FIG. 10b). The existing tension in the webbing will cause the hub crossbars and ratchet wheels to rotate in the direction opposite the direction from the prior ratcheting action, thus releasing stored tension from the webbing. The mechanical advantage afforded by the lever and the two pivoting pawl bracket geometries require only a modest input of force to release hundreds of pounds of induced webbing tension. The entire release action, start to finish, is easily accomplished using a single hand.

FIGS. 8a, 8b and FIGS. 10a, 10b reveal a major difference between a current art ratchet tensioning device, utilizing sliding brackets for ratchet tensioning and tension release, and Enhanced Ratchet 100, utilizing pivoting pawl brackets 141, 151. As described elsewhere, releasing tension from a sliding bracket current art ratchet device can be particularly frustrating. A key contributor to this frustration is the lever in a sliding bracket ratchet device has to open approximately 170° to execute tension release, FIG. 36 Prior Art. At tension release, the lever is moving away rotationally from the device chassis rather than towards the device chassis. At higher tension levels, the mechanical advantage afforded the lever action in the webbing tension release scheme is compromised if the ratchet device is not physically restrained while engaging the lever to release the induced webbing tension. Thus, the analogy of the bow and arrow apparatus referred to earlier.

When releasing ratchet induced webbing tension from Enhanced Ratchet 100, the lever 121 is moved toward the chassis 101 rather than away from the chassis (FIG. 7*a*). This creates an improved ergonomic arrangement for the user, and a major advantage when compared to current art devices. In releasing webbing tension, compromises to the mechanical advantage afforded by the lever 121 are virtually eliminated as the lever 121 and chassis sidewalls A and B 101, 102 are drawn together rather than pushed apart. Forces in the lever and the chassis sidewalls A and B are self-contained, moving toward each other through a small angular displacement, rather than moving away from each other in an unbounded manner (FIG. 18*c*, FIG. 18*d*, FIG. 18*e*).

In the released state, the hub crossbars 134 are free to rotate in either direction 189, allowing webbing configured in Enhanced Ratchet 100 to be easily withdrawn from the hub crossbars 134. The area around the hub crossbars 134 is unobstructed, enabling convenient access when removing webbing from Enhanced Ratchet 100. FIG. 10*b*, FIG. 18*e*.

Releasing stored energy from a ratchet tensioned strap configuration can be quite an event. The recoil from the release of the energy is significant. The counterintuitive direction of lever travel to execute tension release in the current art sliding-bracket-based ratchet designs can easily put a user at risk. Having to push on the lever to execute the release of hundreds of pounds of stored energy is precarious to say the least. At the moment of release, a user has little control as to where the ratchet device moves. The device literally jumps. Many instances of physical injury have occurred in trying to release webbing tension from devices common in the current art. This especially can be the case when user access to the ratchet device is restricted by close confines of the immediate environment. Here, the positional restriction on placement of the ratchet device by means of being sewn to the anchoring hook via a short webbing segment exacerbates the situation greatly.

Contrast this to Enhanced Ratchet 100, which enables a safer and far more natural means of moving lever to chassis through a small angular displacement to release webbing tension (FIG. 7*a*, FIG. 8*a*).

The semi-pierce embossment 156 on the tab 155 of the lever pivoting pawl bracket 151 provides an additional safeguard during tension release. The semi-pierce embossment will catch on the edge of the cutout relief 148 in the chassis pivoting pawl bracket, absorbing much of the recoil energy, while also preventing disengagement of the lever pivoting pawl bracket 141 from the chassis pivoting pawl bracket 151 (FIG. 10*a*, FIG. 10*b*). Furthermore, the release action as described above is self-contained, held in one hand and confined to hand action only, no pushing involved. This enables the user to control the tension release event rather than having the tension release event control the user.

Current art ratchet devices utilizing soft metal die-casted levers are susceptible to excessive wear occurring on the lever-end eccentric. Current art ratchet devices utilizing thin stamped sheet metal levers, particularly at webbing tensions close to rated load limits, are susceptible to either deformation of the lever-end eccentric or the lever-end eccentric cutting into the blade ends on the chassis sliding bracket. In these cases, the ability of the lever-end eccentric to actuate tension release can be readily compromised, rendering the device useless.

At the initiation of webbing tension release in Enhanced Ratchet 100, wear occurring on the pivoting pawl bracket teeth 143, 153 and the ratchet wheel teeth 132, will cause the angle of separation between the lever 121 and the chassis sidewalls A and B 101, 102 to decrease slightly. This will not compromise the ability of the embodiment to affect tension release, even at higher tension levels. Thus, the user-friendly release action will remain reliably effective as component wear occurs throughout the life of the embodiment. FIG. 7*a* through FIG. 10*b*.

FIG. 5 depicts Enhanced Ratchet 100 in free-spin. Free-spin enables the lever 121 to be rotated in either direction 185 without engaging the hub crossbars 134 and ratchet wheels 131, which would otherwise induce ratchet tension into the webbing. The first part of the progression in FIG. 18 depicts the steps to position Enhanced Ratchet 100 in free-spin. Free-spin is enabled by rotating 186 the lever pivoting pawl bracket 151 away from the ratchet wheels 131, disengaging the teeth 153 on the lever pivoting pawl bracket 151 from the teeth 132 on the ratchet wheels 131. Free-spin serves two purposes. The first purpose is to enable positioning of the lever 121 and lever pivoting pawl bracket 151 to initiate webbing tension release, as shown in FIG. 7*a* and FIG. 7*b*. The second purpose is to allow repositioning of the lever 121 to a more favorable position when ratcheting tension into the webbing, as shown in FIG. 5. This is of particular importance at higher webbing tension levels.

Configurations of Enhanced Ratchet

FIG. 19 through FIG. 29 depict various progressions using Enhanced Ratchet 100 in configuring webbing and straps. The Figures are self-explanatory and reveal the versatility of Enhanced Ratchet 100 in terms of usability. Such versatility is unmatched in ratchet devices populating the art today.

In FIGS. 19*a* and 19*b* a flat strap having a looped end is shown affixed to an anchor position 253, by passing the flat strap through the looped end. The configuration is pulled tight in FIG. 19*c*. In 19*d*, a portion of the flat strap 251 is doubled ahead of the Enhanced Ratchet 100. The doubled portion of the flat strap is then passed through the space between swaged lower shoulder pin 113 and shoulder pin 173 in FIG. 19*e*. In FIG. 19*f*, the doubled portion is then placed around free-standing post 175. In FIG. 19*g*, the Enhanced Ratchet 100 may be slid up and down the flat strap 251 until free-standing post 175 is rotated into open slot 177 at which point the flat strap is held in position. The opposite end of flat strap 251 is then passed around anchor position 254 and into the Enhanced Ratchet and ratcheted tight in FIGS. 19*h* and 19*i*.

A similar procedure is used in FIGS. 20*a*-20*h*, where instead of having a looped end flat strap, an unlooped flat strap 250 is used. In this configuration, flat strap 250 is looped around anchor location 253. Then in FIG. 20*b*, two layers of the flat strap are both doubled together and then passed through the space between swaged lower shoulder pin 113 and shoulder pin 173 in FIG. 20*c*. In FIG. 20*d* the doubled portion is this placed around free-standing post 175. In FIG. 20*e*, the Enhanced Ratchet 100 may be slid up and down the flat strap 251 until free-standing post 175 is rotated into open slot 177 in FIG. 20*f* at which point the flat strap is held in position. The opposite end of flat strap 251 is then passed around anchor position 254 and into the Enhanced Ratchet and ratcheted tight in FIGS. 20*g* and 20*h*.

In the configuration of FIGS. 21*a*-21*h*, flat strap 251 is fixed to Enhanced Ratchet 100. In FIG. 21*b*, the looped end of the flat strap 251 is passed through the space between swaged lower shoulder pin 113 and shoulder pin 173 in FIG. 21*c*. In FIG. 21*d* the loop portion is this placed around free-standing post 175. In FIGS. 21*e* and 21*f*, the free-standing post 175 is rotated into open slot 177 in FIG. 20*f* at which point the free-standing post 175 is held in position. The opposite end of flat strap 251 is then passed around anchor positions 253, 254, 259 and into the Enhanced Ratchet and ratcheted tight in FIGS. 21g and 21h.

In the configuration of FIGS. 22a-22h, flat strap 250 is fixed to Enhanced Ratchet 100. In FIG. 22a the flat strap is looped/folded. In FIG. 22b, the looped end of the flat strap 251 is passed through the space between swaged lower shoulder pin 113 and shoulder pin 173 in FIG. 22c. In FIG. 22d the loop portion is this placed around free-standing post 175. In FIGS. 22e and 22f, the free-standing post 175 is rotated into open slot 177 as in FIG. 20f at which point the flat strap is held in position. The opposite end of flat strap 251 is then passed around anchor positions 253, 254, 259 and into the Enhanced Ratchet and ratcheted tight in FIGS. 22g and 22h.

In FIGS. 23a and 23b a flat strap having a looped end is show affixed to an anchor position 253, by passing the flat strap through the looped end. The configuration is pulled tight in FIG. 23c. In 23d, a portion of the flat strap 251 is doubled ahead of the Enhanced Ratchet 100. The doubled portion of the flat strap is then passed through the space between swaged lower shoulder pin 113 and shoulder pin 173 in FIG. 23e. In FIG. 23f, the doubled portion is this placed around free-standing post 175. In FIG. 23g, the free-standing post 175 is rotated into open slot 177 at which point the flat strap is held in position. In 23h a second flat strap 258 is hooked to an anchor location 254 and then ratcheted into Enhanced Ratchet 100.

In FIGS. 24a and 24b a flat strap having a looped end is show affixed to hook 255, by passing the flat strap through the looped end. The configuration is pulled tight in FIG. 23c and the hook hooked around anchor location 253. In 24d, a portion of the flat strap 251 is doubled ahead of the Enhanced Ratchet 100. The doubled portion of the flat strap is then passed through the space between swaged lower shoulder pin 113 and shoulder pin 173 in FIG. 24e. In FIG. 24f, the doubled portion is this placed around free-standing post 175. In FIG. 24g, the free-standing post 175 is rotated into open slot 177 at which point the free-standing post 175 is held in position. In 24h a second flat strap 258 is hooked to an anchor location 254 and then ratcheted into Enhanced Ratchet 100.

In FIGS. 25a-25h, where instead of having a looped end flat strap, an unlooped flat strap 250 is used. In this configuration, flat strap 250 is looped around anchor location 253. Then in FIG. 25b, two layers of the flat strap are both doubled together and then passed through the space between swaged lower shoulder pin 113 and shoulder pin 173 in FIG. 25c. In FIG. 25d the doubled portion is this placed around free-standing post 175. In FIG. 25e, the free-standing post 175 is rotated into open slot 177 at which point the flat strap is held in position. A second flat strap 258 is then hooked around anchor position 254 and into the Enhanced Ratchet and ratcheted tight in FIG. 25f.

In FIGS. 26a and 26b a flat strap having a looped end is show affixed to hook 255, by passing the flat strap through the looped end. The configuration is pulled tight in FIG. 23c and the hook hooked around anchor location 253. In 26d, a portion of the flat strap 251 is doubled ahead of the Enhanced Ratchet 100. The doubled portion of the flat strap is then passed through the space between swaged lower shoulder pin 113 and shoulder pin 173 in FIG. 26e. In FIG. 26f, the doubled portion is this placed around free-standing post 175. In FIG. 26g, the free-standing post 175 is rotated into open slot 177 at which point the flat strap is held in position. In FIG. 26h flat strap 251 is looped around hook 255, which is hooked to an anchor location 254 and then ratcheted into Enhanced Ratchet 100.

In FIGS. 27a and 27b, the looped end of a flat strap 251 is overlapped with the flat strap and then passed through the space between swaged lower shoulder pin 113 and shoulder pin 173. In FIG. 27c, the doubled portion is this placed around free-standing post 175 and the remaining flat strap is passed through. In FIG. 27d, the free-standing post 175 is rotated into open slot 177 at which point the flat strap is held in position. In 27e the webbing 251 is passed around anchor location 253 and anchor location 254 and back into Enhanced Ratchet 100 and ratcheted tight. The force 515 upwards and downwards is twice the force 510 on each area of the flat strap.

In FIGS. 28a and 28b, the looped end of a flat strap 252 is overlapped with itself, wrapped around anchor point 253 and then passed through the space between swaged lower shoulder pin 113 and shoulder pin 173. In FIG. 28c, the doubled portion is this placed around free-standing post 175. In FIG. 28d, the free-standing post 175 is rotated into open slot 177 at which point the flat strap is held in position. In 28e the webbing 258 is hooked around anchor location 254 and into Enhanced Ratchet 100. In FIG. 28f, the webbing is ratcheted tight.

In FIGS. 29a and 29b, the looped end of a flat strap 252 is overlapped with itself, wrapped around s-hook 255 which is hung on anchor point 253 and then flat strap is passed through the space between swaged lower shoulder pin 113 and shoulder pin 173. In FIG. 29c, the doubled portion is this placed around free-standing post 175. In FIG. 29d, the free-standing post 175 is rotated into open slot 177 at which point the flat strap is held in position. In 29e the webbing 258 is hooked around anchor location 254 and into Enhanced Ratchet 100. In FIG. 28f, the webbing is ratcheted tight.

Many current art ratchet devices, having a permanently attached hook, locate the hook close to the device. When anchored in confined quarters, operation of the ratchet lever can become quite challenging. Of particular importance is the ability to add Enhanced Ratchet 100 into the strap setup after the strap has been positioned for use. It is often much easier to work with straps without having to deal with the size and weight of a permanently attached ratchet device.

Enhanced Ratchet 100 completely alters the landscape of ratchet devices. Ratchet devices are specifically intended to induce high levels of tension into secured straps. A single strap fixed-end configuration 256 (FIG. 19), enabled by the capture-frame assembly 170, effectively doubles the tensioning capacity of the ratcheting action of the device (FIG. 17d). This capability alone enables the fabrication of ratchet devices smaller in size and lighter in weight, equaling or exceeding the performance of larger, heavier, current art devices.

Combined with the ability to easily and adjustably position the ratchet device anywhere along the length of a strap (FIG. 12d), to use straps interchangeably and specifically suited to the task at hand, to selectively switch between fixed-end 256 or loop 257 configurations, having the ability to reliably secure to whatever anchor situations are presented—all testify to the advanced capabilities of the embodiments presented herein.

FIG. 30a through FIG. 32b depict alternative embodiments utilizing various means to duplicate the functional attributes of the capture-frame assembly 170 of Enhanced Ratchet 100.

Figure 38A:
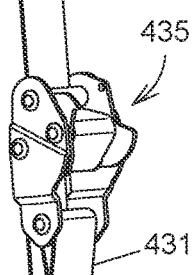
Figure 38B:
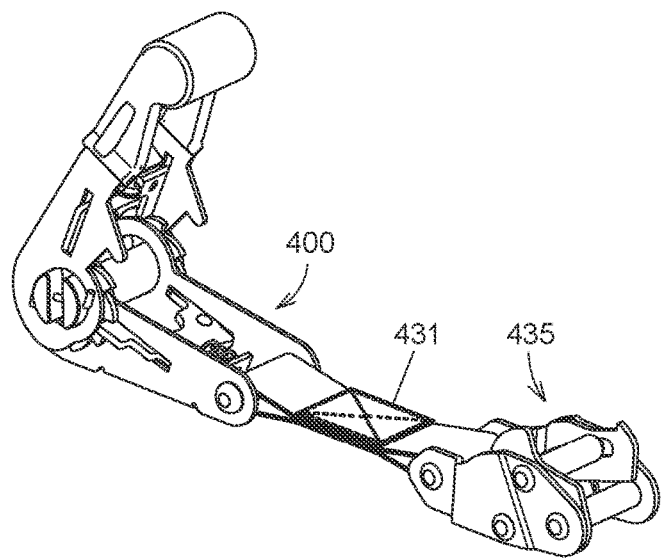

FIG. 38a and FIG. 38b depict an alternative embodiment comprised of a hybrid chassis 435, incorporating a capture-frame assembly 170, permanently connected to a current art style ratchet device by means of a short length of webbing sewn to the device. While somewhat unwieldly, the embodiment does show that modifying a current art ratchet device accordingly would enable many of the webbing configurations made possible in the new art by means of the capture-frame assembly 170.

The embodiment 380 as shown in FIG. 33 and FIG. 34 incorporates the capture-frame assembly 170 into a cam-lock style webbing tensioning device. While not specifically a ratchet device, the embodiment is a tensioning device and shows how a typical cam-lock device could be improved by means of the capture-frame assembly.

In some embodiments of the capture frame assembly 170, the device may be used in an alternative configuration not with a ratchet, or with a more traditional ratchet. The capture frame assembly 170 is usable in a variety of contexts.

Although embodiments of the Enhanced Ratchet are in many contexts deployed in the context of webbing flat straps, the principles and designing of the ratcheting lever arms and rotating brackets may deployed in a variety of contexts not including flat straps. Additionally, in some contexts, the rotational mating of the brackets in order to release tension on the flat straps need not be enabled and a user may be required to push the brackets in unison or separately to release the flat straps. Although this may be less convenient, it may provide for a usable alternative.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A ratchet device, comprising:
   a ratchet wheel;
   a first lever, the first lever rotatably interconnected with the ratchet wheel;
   a second lever, the second lever rotatably interconnected with the ratchet wheel;
   a first pivoting bracket, the first pivoting bracket pivotally interconnected with the first lever; and
   a second pivoting bracket, the second pivoting bracket pivotally interconnected with the second lever;
   wherein the first pivoting bracket has a first position where the first pivoting bracket is rotated to engage the ratchet wheel and a second position where the first pivoting bracket is rotated to disengage from the ratchet wheel,
   wherein the second pivoting bracket has a third position where the second pivoting bracket is rotated to engage the ratchet wheel and a fourth position where the second pivoting bracket is rotated to disengage from the ratchet wheel, and
   wherein the first pivoting bracket is configured to engage the second pivoting bracket and when the first pivoting bracket and the second pivoting bracket are engaged, the first pivoting bracket is held in the second position and the second pivoting bracket is held in the fourth position.

2. The ratchet device of claim 1, wherein when the first pivoting bracket is in the second position and the second pivoting bracket is in the fourth position, the ratchet wheel freely rotates.

3. The ratchet device of claim 1, wherein the ratchet wheel includes a plurality of teeth and the first pivoting bracket includes a first tooth that is shaped to interface with the plurality of teeth.

4. The ratchet device of claim 3, wherein the second pivoting bracket includes a second tooth and the second tooth is shaped to interface with the plurality of teeth.

5. The ratchet device of claim 4, wherein the first tooth is shaped to fit between a third and fourth tooth of the plurality of teeth, such that the first tooth entirely fills the void between the third and fourth tooth.

6. The ratchet device of claim 1, wherein the first pivoting bracket includes a tab on a first end opposite the second end, the second end engaging the ratchet wheel, the tab shaped to engage an area in the second pivoting bracket such that the first and second pivoting bracket hold together when the ratchet wheel freely rotates.

7. The ratchet device of claim 1, further comprising:
   a capture assembly, the capture assembly configured to capture a flat strap in a secure fashion.

8. The ratchet device of claim 7, wherein the second lever includes a first and second side plate, the capture assembly located between the first and second side plate.

9. The ratchet device of claim 8, wherein the capture assembly includes a third side plate and a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate.

10. The ratchet device of claim 9, wherein the fourth side plate is interconnected to the second pin via a slotted opening allowing the fourth side plate to rotate and slide about the second pin.

11. The ratchet device of claim 10, wherein the third side plate includes a slotted capture area, the slotted capture area configured to removably capture the third pin when the fourth side plate is slid to a first end of the slotted opening.

12. The ratchet device of claim 11, wherein the third side plate further includes a curved area, adjacent to the slotted capture area, oriented to guide the third pin.

13. The ratchet device of claim 12, wherein a flat strap oriented in a first gap between the first and second pin, around the third pin, and back through the first gap is held when the third pin is in the slotted capture area.

14. A method of using the ratchet device of claim 1, the method comprising:
   inserting a flat strap into the ratchet device;
   ratcheting the ratchet device to increase tension by moving at least one of the first lever and the second lever;
   pivoting the first pivoting bracket and the second pivoting bracket to release tension on the flat strap; and
   removing the flat strap.

15. The method of claim 14, wherein the ratchet device further includes a capture assembly, the capture assembly configured to capture a flat strap in a secure fashion, wherein the second lever includes a first and second side plate, the capture assembly located between the first and second side plate and the capture assembly includes a third side plate, a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate, the fourth side plate is interconnected to the second pin via a slotted opening allowing the fourth side plate to rotate and slide about the second pin.

16. A ratchet device, comprising:

a ratchet wheel;

a first lever, the first lever rotatably interconnected with the ratchet wheel;

a second lever, the second lever rotatably interconnected with the ratchet wheel;

a first pivoting bracket, the first pivoting bracket pivotally interconnected with the first lever;

a second pivoting bracket, the second pivoting bracket pivotally interconnected with the second lever; and a capture assembly, the capture assembly configured to capture a flat strap in a secure fashion, wherein the second lever includes a first and second side plate, the capture assembly located between the first and second side plate and the capture assembly includes a third side plate, a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate, the fourth side plate is interconnected to the second pin via a slotted opening allowing the fourth side plate to rotate and slide about the second pin;

wherein the first pivoting bracket has a first position where the first pivoting bracket is rotated to engage the ratchet wheel and a second position where the first pivoting bracket is rotated to disengage from the ratchet wheel and the second pivoting bracket has a third position where the second pivoting bracket is rotated to engage the ratchet wheel and a fourth position where the second pivoting bracket is rotated to disengage from the ratchet wheel.

17. The ratchet device of claim 16, wherein the third side plate includes a slotted capture area, the slotted capture area configured to removably capture the third pin when the fourth side plate is slid to a first end of the slotted opening and the third side plate further includes a curved area, adjacent to the slotted capture area, oriented to guide the third pin.

18. The ratchet device of claim 16, wherein the first pivoting bracket is configured to engage the second pivoting bracket and when the first pivoting bracket and the second pivoting bracket are engaged, the first pivoting bracket is held in the second position and the second pivoting bracket is held in the fourth position.

19. A ratchet device, comprising:

a ratchet wheel;

a first lever, the first lever rotatably interconnected with the ratchet wheel;

a second lever, the second lever rotatably interconnected with the ratchet wheel;

a first pivoting bracket, the first pivoting bracket pivotally interconnected with the first lever; and a second pivoting bracket, the second pivoting bracket pivotally interconnected with the second lever;

wherein the first pivoting bracket is configured to engage the second pivoting bracket and when the first pivoting bracket and the second pivoting bracket are engaged, the first pivoting bracket and the second pivoting bracket are held in a position disengaged from the ratchet wheel.

20. The ratchet device of claim 19, further comprising:

a capture assembly configured to capture a flat strap in a secure fashion, wherein the second lever includes a first and second side plate, the capture assembly located between the first and second side plate and the capture assembly includes a third side plate, a fourth side plate, a first pin, a second pin, and a third pin, the first pin interconnecting the first and second side plate and the third side plate, the second pin interconnecting the first and second side plate, the third side plate, and the fourth side plate, the third pin mounted on the fourth side plate, the fourth side plate is interconnected to the second pin via a slotted opening allowing the fourth side plate to rotate and slide about the second pin.

* * * * *